US012701236B2

(12) United States Patent
Zhang et al.

(10) Patent No.: US 12,701,236 B2
(45) Date of Patent: Aug. 4, 2026

(54) VIDEO CODING METHOD AND RELATED APPARATUS THEREOF

(71) Applicant: Huawei Technologies Co., Ltd., Shenzhen (CN)

(72) Inventors: Libin Zhang, Beijing (CN); Luheng Jia, Beijing (CN); Chang Liu, Shenzhen (CN); Xiaodong Guo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 60 days.

(21) Appl. No.: 18/671,301

(22) Filed: May 22, 2024

(65) Prior Publication Data

US 2024/0314326 A1 Sep. 19, 2024

Related U.S. Application Data

(63) Continuation of application No. PCT/CN2021/132307, filed on Nov. 23, 2021.

(51) Int. Cl.
*H04N 19/136* (2014.01)
*H04N 19/176* (2014.01)

(52) U.S. Cl.
CPC ......... *H04N 19/136* (2014.11); *H04N 19/176* (2014.11)

(58) Field of Classification Search
None
See application file for complete search history.

(56) References Cited

U.S. PATENT DOCUMENTS

| | | |
|---|---|---|
| 2013/0191550 A1 | 7/2013 | Hannuksela |
| 2019/0200046 A1* | 6/2019 | Lucas ................. H04N 19/176 |
| 2020/0349972 A1* | 11/2020 | Deora .................... G06V 20/46 |

FOREIGN PATENT DOCUMENTS

| | | |
|---|---|---|
| CN | 103678702 B | 1/2018 |
| WO | 2011159605 A1 | 12/2011 |

OTHER PUBLICATIONS

Jan De Cock et al., "Architectures for Fast Transcoding of H.264/AVC to Quality-Scalable SVC Streams," IEEE Transactions on Multimedia, vol. 11, No. 7, Nov. 2009, 16 pages.

(Continued)

*Primary Examiner* — Christopher G Findley
(74) *Attorney, Agent, or Firm* — Conley Rose, P.C.

(57) ABSTRACT

A video coding method includes: obtaining a first video file and a second video file that are different; separately decoding the first video file and the second video file to obtain first information of a first image block in the first video file and second information of a second image block in the second video file; obtaining, based on the first information and the second information, difference information indicating a difference between the first information and the second information; and encoding the difference information to obtain encoded data. The difference information may be used to replace an original decoding result in the second video file. It is equivalent to reducing storage resources for video storage and bandwidth for video transmission while ensuring that the complete second video file can be restored.

20 Claims, 18 Drawing Sheets

Obtain a first coding parameter of a first image block and a second coding parameter of a second image block, where the first image block is an image block in a first video file, the second image block is an image block in a second video file, the first video file and the second video file are different video files, and the first coding parameter and the second coding parameter include a motion vector and/or a residual — 601

Obtain difference information based on the first coding parameter and the second coding parameter, where the difference information indicates a difference between the first coding parameter and the second coding parameter — 602

Encode the difference information to obtain encoded data — 603

(56)     References Cited

OTHER PUBLICATIONS

H.264, Series H: Audiovisual and Multimedia Systems Infrastructure of audiovisual services, Coding of moving video, Advanced video coding for generic audiovisual services, Jun. 2019, total 836 pages.

H.265, Series H: Audiovisual and Multimedia Systems Infrastructure of audiovisual services, Coding of moving video, High efficiency video coding, Nov. 2019, total 712 pages.

H.266, Series H: Audiovisual and Multimedia Systems Infrastructure of audiovisual services, Coding of moving video, Versatile video coding, Aug. 2020, total 516 pages.

Auxten, Understand video codec technology from scratch, Nov. 28, 2024, total 86 pages.

Chapin666, Video encapsulation format and video protocol, Mar. 22, 2020, total 14 pages.

Crazydiode, Principle of H.264/AVC encoder, Mar. 18, 2018, total 20 pages.

* cited by examiner

400

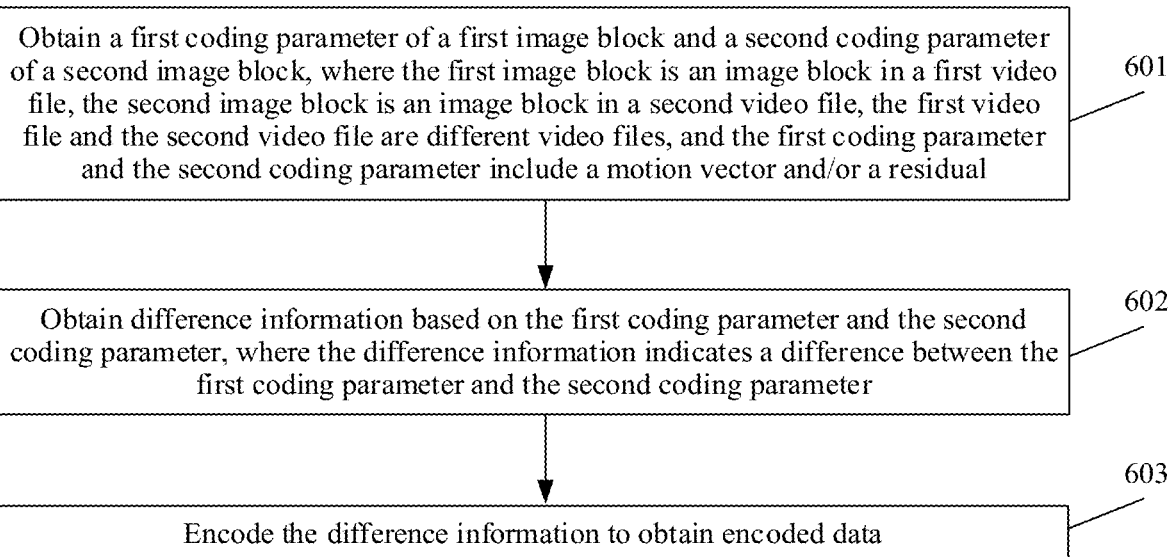

Obtain a first coding parameter of a first image block and a second coding parameter of a second image block, where the first image block is an image block in a first video file, the second image block is an image block in a second video file, the first video file and the second video file are different video files, and the first coding parameter and the second coding parameter include a motion vector and/or a residual

601

Obtain difference information based on the first coding parameter and the second coding parameter, where the difference information indicates a difference between the first coding parameter and the second coding parameter

602

Encode the difference information to obtain encoded data

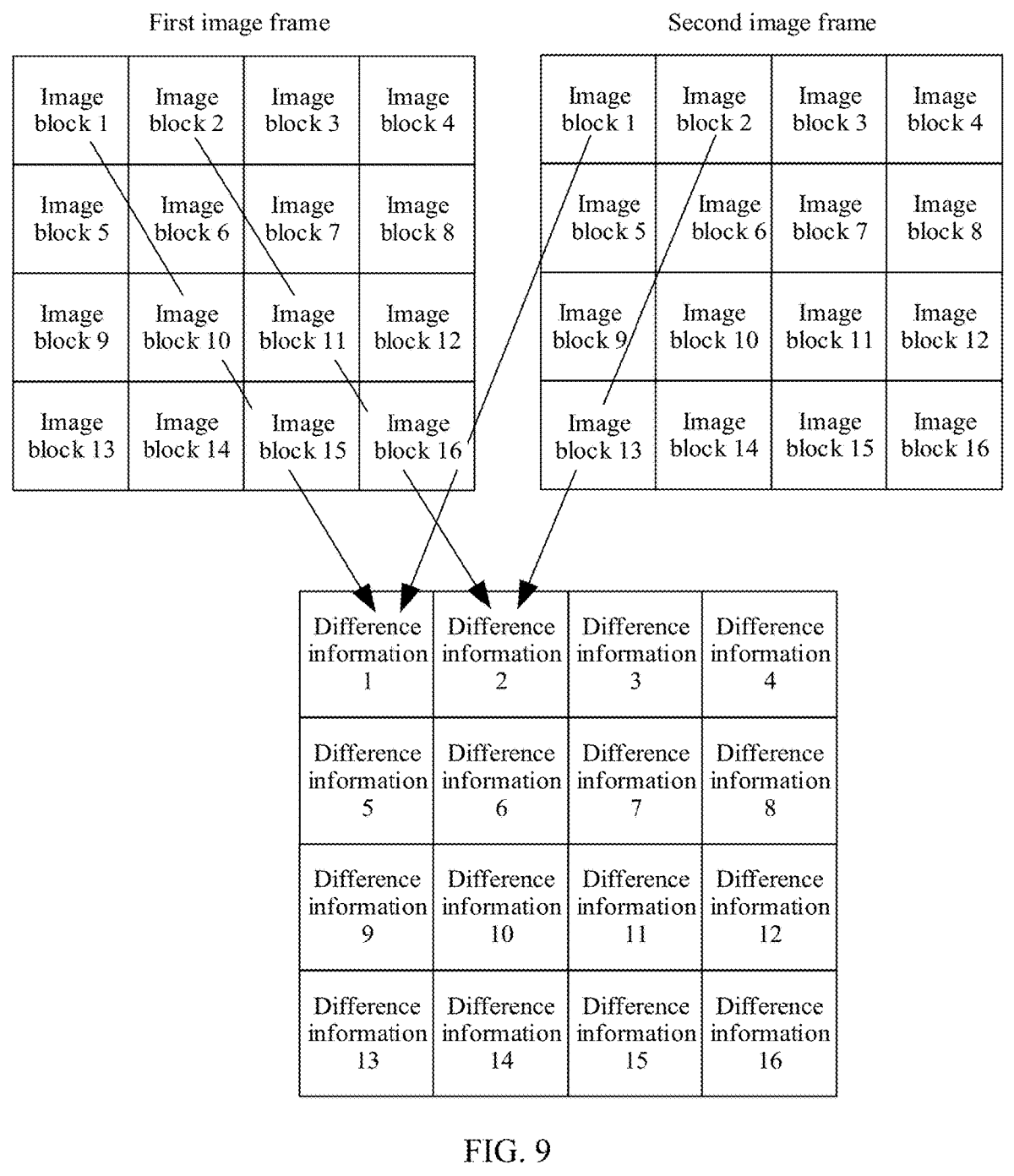

First image frame

| Image block 1 | Image block 2 | Image block 3 | Image block 4 |
|---|---|---|---|
| Image block 5 | Image block 6 | Image block 7 | Image block 8 |
| Image block 9 | Image block 10 | Image block 11 | Image block 12 |
| Image block 13 | Image block 14 | Image block 15 | Image block 16 |

Second image frame

| Image block 1 | Image block 2 | Image block 3 | Image block 4 |
|---|---|---|---|
| Image block 5 | Image block 6 | Image block 7 | Image block 8 |
| Image block 9 | Image block 10 | Image block 11 | Image block 12 |
| Image block 13 | Image block 14 | Image block 15 | Image block 16 |

| Difference information 1 | Difference information 2 | Difference information 3 | Difference information 4 |
|---|---|---|---|
| Difference information 5 | Difference information 6 | Difference information 7 | Difference information 8 |
| Difference information 9 | Difference information 10 | Difference information 11 | Difference information 12 |
| Difference information 13 | Difference information 14 | Difference information 15 | Difference information 16 |

FIG. 9

First image frame

| Image block 1 | Image block 2 | Image block 3 | Image block 4 |
|---|---|---|---|
| Image block 5 | Image block 6 | Image block 7 | Image block 8 |
| Image block 9 | Image block 10 | Image block 11 | Image block 12 |
| Image block 13 | Image block 14 | Image block 15 | Image block 16 |

Second image frame

| Image block 1 | Image block 2 | Image block 3 | Image block 4 |
|---|---|---|---|
| Image block 5 | Image block 6 | Image block 7 | Image block 8 |
| Image block 9 | Image block 10 | Image block 11 | Image block 12 |
| Image block 13 | Image block 14 | Image block 15 | Image block 16 |

| Difference information 1 | Difference information 2 | Image block 3 | Image block 4 |
|---|---|---|---|
| Difference information 5 | Difference information 6 | Image block 7 | Image block 8 |
| Image block 9 | Image block 10 | Image block 11 | Image block 12 |
| Image block 13 | Image block 14 | Image block 15 | Image block 16 |

FIG. 10

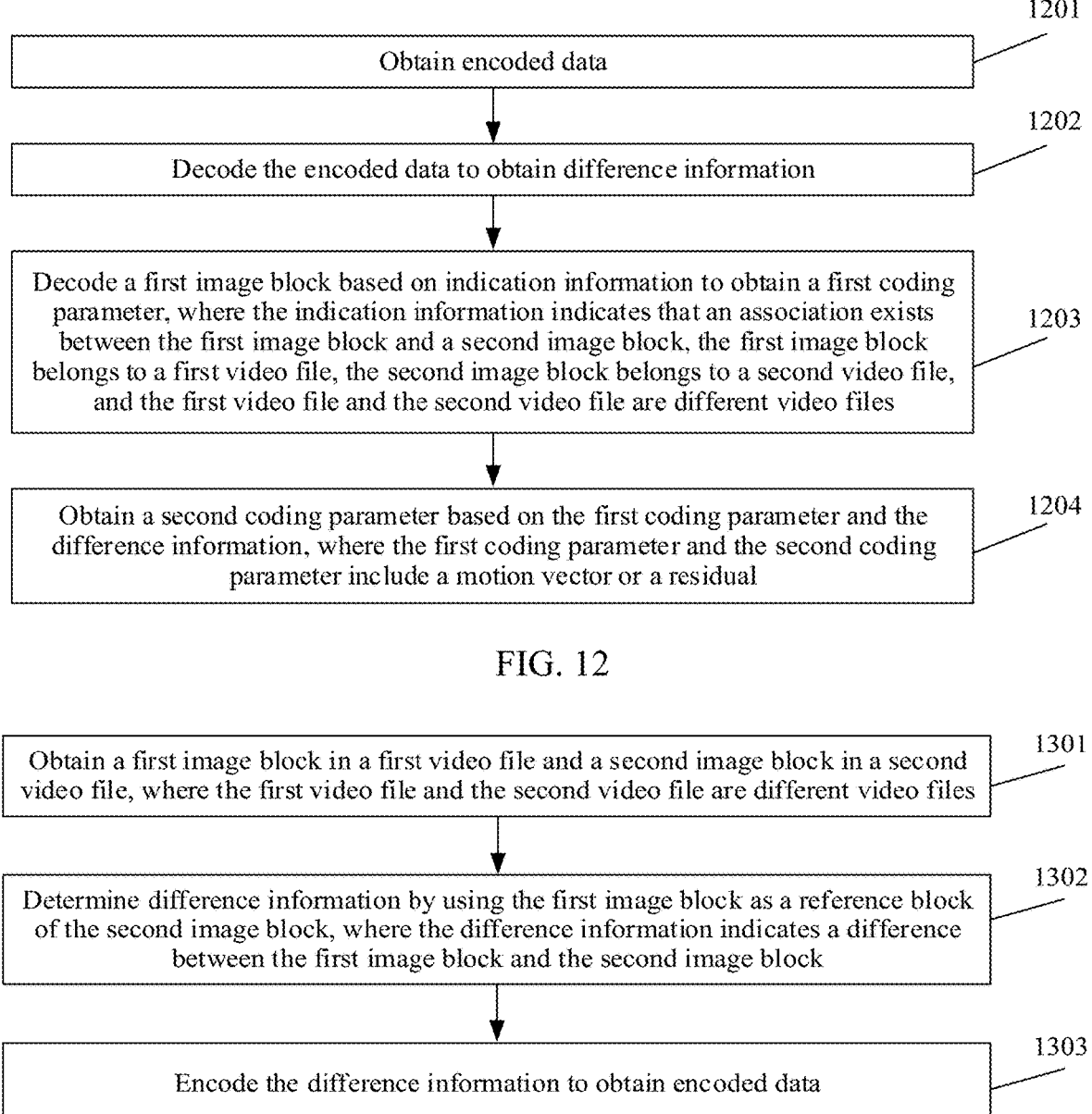

1201

Obtain encoded data

1202

Decode the encoded data to obtain difference information

1203

Decode a first image block based on indication information to obtain a first coding parameter, where the indication information indicates that an association exists between the first image block and a second image block, the first image block belongs to a first video file, the second image block belongs to a second video file, and the first video file and the second video file are different video files

1204

Obtain a second coding parameter based on the first coding parameter and the difference information, where the first coding parameter and the second coding parameter include a motion vector or a residual

Obtain a first image block in a first video file and a second image block in a second video file, where the first video file and the second video file are different video files

1302

Determine difference information by using the first image block as a reference block of the second image block, where the difference information indicates a difference between the first image block and the second image block

1303

Encode the difference information to obtain encoded data

FIG. 13

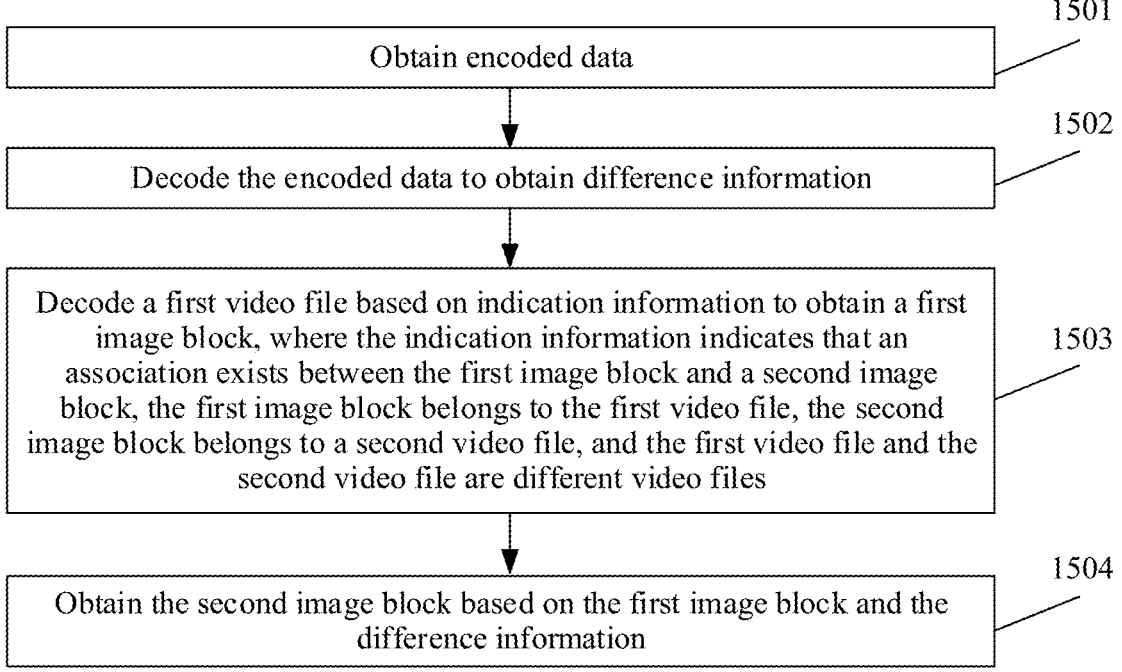

1501

Obtain encoded data

1502

Decode the encoded data to obtain difference information

1503

Decode a first video file based on indication information to obtain a first image block, where the indication information indicates that an association exists between the first image block and a second image block, the first image block belongs to the first video file, the second image block belongs to a second video file, and the first video file and the second video file are different video files

1504

Obtain the second image block based on the first image block and the difference information

FIG. 15

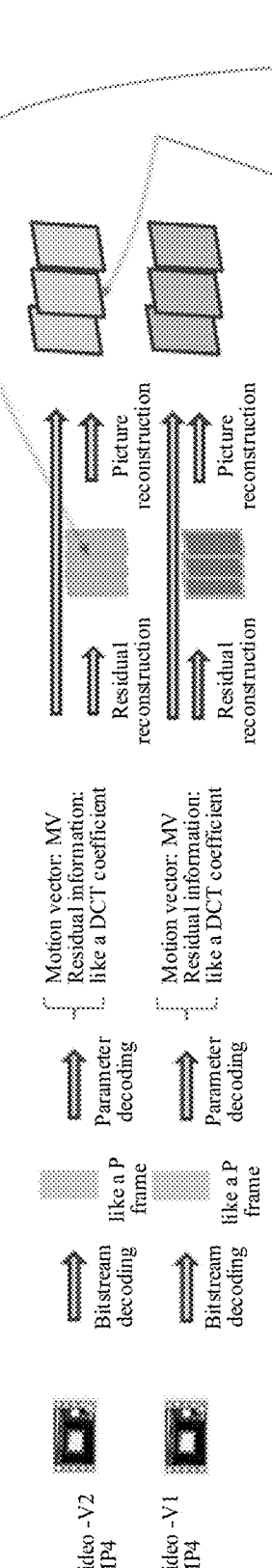

A residual picture indicates a prediction residual obtained by an I frame or a P frame through prediction; and during decoding, the residual picture is obtained by inversely transforming the DCT coefficient A reconstructed picture is a reconstructed picture obtained by an I frame or a P frame based on a combination between a prediction reference frame and a residual picture; and during decoding, the reconstructed picture is restored based on the MV and the residual picture

FIG. 16B

VIDEO CODING METHOD AND RELATED APPARATUS THEREOF

CROSS-REFERENCE TO RELATED APPLICATIONS

This is a continuation of International Patent Application No. PCT/CN2021/132307 filed on Nov. 23, 2021, which is hereby incorporated by reference in its entirety.

TECHNICAL FIELD

This disclosure relates to the field of video coding, and in particular, to a video coding method and a related apparatus thereof.

BACKGROUND

Video coding (encoding and decoding) is widely used in digital video applications, for example, a broadcast digital television, video transmission over the internet and mobile networks, real-time conversational applications such as video chat and video conferencing, high-density DIGITAL VERSATILE DISC (DVD) that is also referred to as BLU-RAY discs, video content capturing and editing systems, and security applications of camcorders.

With the development of a block-based hybrid video coding approach in the H.261 standard in 1990, new video coding technologies and tools are developed and form a basis for new video coding standards. Other video coding standards include MPEG-1 video, MPEG-2 video, ITU-TH.262/MPEG-2, ITU-TH.263, ITU-TH.264/MPEG-4 Part 10: advanced video coding (AVC), ITU-TH.265/high efficiency video coding (HEVC), and extensions, for example, scalability and/or 3D (three-dimensional) extensions, of these standards. As videos are created and used more widely, video traffic is the biggest burden on communication networks and data storage. Therefore, one of goals of most of the video coding standards is to reduce a bit rate without sacrificing picture quality in comparison with a previous standard.

In some scenarios, a plurality of videos with similar or even repeated content exist. When the videos are stored or transmitted to another device (for example, another terminal device or a server on a cloud side), a large quantity of storage resources are wasted, and a large amount of bandwidth is wasted during transmission.

SUMMARY

This disclosure provides a video encoding method, a video decoding method, and a related apparatus thereof, to reduce storage resources for video storage and bandwidth for video transmission while ensuring that a complete second image block can be restored.

According to a first aspect, this disclosure provides a video encoding method. The method includes obtaining a first coding parameter of a first image block and a second coding parameter of a second image block, where the first image block is an image block in a first video file, the second image block is an image block in a second video file, the first video file and the second video file are different video files, and the first coding parameter and the second coding parameter include a motion vector or a residual.

"Or" in embodiments of this disclosure may be understood as "and/or". In other words, A or B may be understood as A, B, or A and B.

Further, the first coding parameter and the second coding parameter may include the motion vector, the first coding parameter and the second coding parameter include the residual, or the first coding parameter and the second coding parameter include the motion vector and the residual.

In a possible implementation, for the encapsulated first video file and the encapsulated second video file, whether a first video and a second video are videos with similar or even repeated content may be determined based on comparison between image features of all (or some) image frames in the first video file and the second video file (or comparison between coding parameters of image blocks obtained through decoding). The coding parameter may be a residual, a motion vector, a discrete cosine transform (DCT) coefficient, or the like. Further, the first image block and the second image block are selected (or a first image frame and a second image frame are selected, where the first image frame includes the first image block, and the second image frame includes the second image block).

In a possible implementation, for the encapsulated first video file and the encapsulated second video file, whether the first video and the second video are videos with similar or even repeated content (then, comparison between image features and/or coding parameters may be performed) may be determined based on comparison between subtitle information and/or audio information in the first video file and the second video file, and then the first image block and the second image block are selected (or the first image frame and the second image frame are selected, where the first image frame includes the first image block, and the second image frame includes the second image block).

In a possible implementation, for the encapsulated first video file and the encapsulated second video file, preliminary screening of the image frames may be performed based on comparison between the subtitle information and/or the audio information in the first video file and the second video file. An image frame with similar subtitle information and/or audio information may be first selected as a candidate, and then the first image block and the second image block are selected based on comparison between the image features and/or the coding parameters (or the first image frame and the second image frame are selected, where the first image frame includes the first image block, and the second image frame includes the second image block). The foregoing manner can be used to accelerate a speed of determining a similar video, a similar image frame, and a similar image block, and further reduce computing overheads.

In a possible implementation, for the encapsulated first video file and the encapsulated second video file, whether the first video file and the second video file are videos with similar or even repeated content may be determined based on sources of the first video file and the second video file (for example, whether the first video file and the second video file are same-source videos is determined, whether the first video file and the second video file are obtained by editing based on a same video file, and in comparison with the second video file, the first video file is only added with a subtitle, special effect, or enables beauty processing), and then the first image block and the second image block are selected based on comparison between the image features and/or the coding parameters (or the first image frame and the second image frame are selected, where the first image frame includes the first image block, and the second image frame includes the second image block).

In a possible implementation, for the encapsulated first video file and the encapsulated second video file, whether image frames with similar or even repeated content exist in the first video file and the second video file may be determined based on comparison between the image features of all the (or some) image frames in the first video file and the second video file.

In a possible implementation, for the encapsulated first video file and the encapsulated second video file, whether image blocks with similar or even repeated content exist in the first video file and the second video file may be determined based on comparison between image features of the image blocks in all the (or some) image frames in the first video file and the second video file.

In a possible implementation, the first video file and the second video file may be video files with similar or repeated content. Content similar may be understood as that image frames with similar pixel values and distribution exist (or pixel values exceeding a specific quantity or proportion exists) in the video files.

It should be understood that the first video file and the second video file may be different video files, or may be different parts of a same video file (for example, if a large quantity of repeated video clips exist in some video files, the first video file and the second video file may be two repeated video clips in the video files). This is not limited herein.

It should be understood that the first video file and the second video file may be video files with same video file content but belong to different video file encapsulation files.

In a possible implementation, the first video file may include the first image frame, the second video file may include the second image frame, the first image frame may include a plurality of image blocks (including the first image block), and the second image frame may include a plurality of image blocks (including the second image block). The first image block and the second image block may be block units such as a macroblock (MB), a prediction block (partition), a coding unit (CU), a prediction unit (PU), and a transform unit (TU). This is not limited herein. For description of the image blocks, refer to description in the foregoing embodiments. Details are not described herein again.

A similarity between image features of the first image block and the second image block is high, and an image feature of an image block may be one or more of a color feature, a texture feature, a shape feature, and the like of the image block. The color feature and the texture feature are used to describe a surface property of an object corresponding to the image block. The shape feature includes a contour feature and a region feature. The contour feature includes an outer boundary feature of the object, and the region feature includes a shape region feature of the object.

A similarity between coding parameters of the first image block and the second image block is high, and the coding parameter may be at least one of the residual, the DCT coefficient, and the motion vector.

In embodiments of this disclosure, the first coding parameter of the first image block and the second coding parameter of the second image block may be obtained. The first coding parameter and the second coding parameter may be motion vectors, the first coding parameter and the second coding parameter may be residuals, or the first coding parameter and the second coding parameter may be motion vectors and residuals.

The residual may be obtained through calculation based on the image block and the prediction block. For example, a sample value of the prediction block may be subtracted from a sample value of the picture image block sample by sample (pixel by pixel), to obtain the residual in a sample domain. The residual herein may be residual coding.

Optionally, the coding parameter may further include syntax information. For example, the syntax information may be but is not limited to any one or all of an inter prediction parameter, an intra prediction parameter, a loop filter parameter, and/or another syntax element (decoded).

Difference information is obtained based on the first coding parameter and the second coding parameter, where the difference information indicates a difference between the first coding parameter and the second coding parameter.

In a possible implementation, a subtraction operation may be performed on the first coding parameter and the second coding parameter to obtain the difference information. In addition, the difference information may be obtained through calculation based on another operation for quantizing the difference between the first coding parameter and the second coding parameter. This is not limited herein.

When the first coding parameter and the second coding parameter are residuals, the difference information may be a difference picture.

It should be understood that the first image block and the second image block may be image blocks with similar image features in the first image frame and the second image frame, and the foregoing processing on the first image block and the second image block may be performed on some or all image blocks in the first image frame and the second image frame. In this way, difference information of a plurality of groups of image blocks can be obtained. The difference information is encoded to obtain encoded data. The encoded data may be used by a decoding side to obtain the second coding parameter through restoration.

In an implementation, the difference information may be used as a coding parameter of the second image block (to replace the original second coding parameter), and data of a second video including the coding parameter of the second image block is encoded.

It should be understood that the first image block and the second image block may be image blocks with similar image features in the first image frame and the second image frame, and the foregoing processing on the first image block and the second image block may be performed on some or all image blocks in the first image frame and the second image frame.

It should be understood that the first image frame and the second image frame may be image frames with similar image features in the first video and the second video, and the foregoing processing on the first image block and the second image block may be performed on image blocks in some or all the image frames in a first video and the second video.

Embodiments of this disclosure provide the video encoding method. The method includes obtaining a first coding parameter of a first image block and a second coding parameter of a second image block, where the first image block is an image block in a first video file, the second image block is an image block in a second video file, the first video file and the second video file are different video files, and the first coding parameter and the second coding parameter include a motion vector and/or a residual, obtaining difference information based on the first coding parameter and the second coding parameter, where the difference information indicates a difference between the first coding parameter and the second coding parameter, and encoding the difference information to obtain encoded data, where the encoded data is used by a decoding side to obtain the second coding parameter through restoration. The difference information is used to replace the original second coding parameter. Because a similarity between image features of the first image block and the second image block is greater than a threshold, a size of bitstream data obtained by encoding the difference information is less than a size of bitstream data obtained by encoding the second coding parameter, and the second coding parameter can be obtained through restoration based on the difference information and the first coding parameter. This is equivalent to reducing storage resources for video storage and bandwidth for video transmission while ensuring that the complete second image block can be restored.

In a possible implementation, obtaining a first coding parameter of a first image block and a second coding parameter of a second image block includes decoding the first video file and the second video file to obtain the first coding parameter of the first image block and the second coding parameter of the second image block.

In a possible implementation, a similarity between image features of the first image block and the second image block is greater than a threshold, a similarity between the first coding parameter and the second coding parameter is greater than a threshold, a similarity between subtitle information or audio information in the first video file and the second video file is greater than a threshold, and/or a similarity between DCT coefficients of the first image block and the second image block is greater than a threshold.

The first coding parameter may include a first motion vector, the second coding parameter includes a second motion vector, the difference information includes first difference information, and the first difference information is a difference between the first motion vector and the second motion vector.

For example, in a possible implementation, the first coding parameter may include a first residual, the second coding parameter includes a second residual, the difference information includes second difference information, and the second difference information is a difference between the first residual and the second residual.

In a possible implementation, the first coding parameter may include a first motion vector and a first residual, the second coding parameter includes a second motion vector and a second residual, the difference information includes first difference information and second difference information, the first difference information is a difference between the first motion vector and the second motion vector, and the second difference information is a difference between the first residual and the second residual.

In a possible implementation, the first coding parameter includes a first residual, the second coding parameter includes a second residual, the difference information includes second difference information, and the second difference information indicates a difference between the first residual and the second residual, and encoding the difference information includes encoding the second difference information through lossless compression coding or lossy compression coding.

Because the first difference information represents the difference between the motion vectors, and the motion vector is used during inter prediction, if the first difference information is compressed through lossy compression, inter prediction effect is poor (for example, an artifact occurs) during decoding. In embodiments of this disclosure, the first difference information is compressed through lossless compression. This can improve inter prediction precision and effect.

In a possible implementation, the first coding parameter includes a first motion vector, the second coding parameter includes a second motion vector, the difference information includes first difference information, and the first difference information indicates a difference between the first motion vector and the second motion vector, and encoding the difference information includes encoding the first difference information through lossless compression coding.

In a possible implementation, the first difference information (the first difference information indicates a difference between the first motion vector and the second motion vector) may be encoded through lossless compression coding.

In a possible implementation, the second difference information (the second difference information indicates a difference between the first residual and the second residual) may be encoded through lossless compression coding or lossy compression coding.

Lossless compression may be lossless compression including transform (reserving all coefficients), scanning, and entropy coding, and lossy compression may be lossy compression including transform (reserving a low frequency coefficient), quantization, scanning, and entropy coding.

In a possible implementation, after a bitstream is obtained, the encoded data and the first coding parameter may be sent to the decoding side, so that the decoding side obtains the second coding parameter based on the encoded data and the first coding parameter, or the encoded data may be locally stored for later transmission or retrieval.

It should be understood that, to enable the decoding side to obtain the second coding parameter based on the encoded data, the bitstream of the first video further needs to be sent to the decoding side, so that the decoding side can decode the bitstream of the first video to obtain the first coding parameter, and obtain the second coding parameter based on the first coding parameter and the difference information.

It should be understood that the encoded data may be encapsulated (optionally, if the second video file further includes other information such as audio information and subtitle information, to enable the decoding side to obtain the second video file through restoration, the other information such as the audio information and the subtitle information may also be encapsulated). Correspondingly, encapsulated encoded data may be sent to the decoding side, so that the decoding side obtains the second coding parameter based on the encapsulated encoded data, or encapsulated encoded data may be locally stored for later transmission or retrieval.

It should be understood that the first indication information may be further encoded. The first indication information may indicate that an association exists between the first image block and the second image block (optionally, may indicate that the difference information is obtained based on the difference between the first image block and the second image block). Further, the decoding side may obtain the first coding parameter of the first image block and the difference information based on the first indication information, and obtain the second coding parameter based on the first coding parameter and the difference information. The first indication information includes an identifier of the first image block and an identifier of the second image block, and/or the first indication information includes an identifier of the first video file and an identifier of the second video file.

The indication information in this disclosure may also be referred to as an index (index information).

According to a second aspect, this disclosure provides a video decoding method. The method includes obtaining encoded data, decoding the encoded data to obtain difference information, decoding a first image block based on indication information (for example, the first indication information described in the first aspect) to obtain a first coding parameter, where the indication information indicates that an association exists between the first image block and a second image block (optionally, the indication information may indicate that the difference information is obtained based on a difference between the first image block and the second image block), the first image block belongs to a first video file, the second image block belongs to a second video file, the first video file and the second video file are different video files, and the first coding parameter and a second coding parameter include a motion vector and/or a residual, and obtaining the second coding parameter based on the first coding parameter and the difference information.

Optionally, the indication information is obtained by decoding the encoded data. Optionally, the indication information is stored in an object associated with the second video file. When the second video file is decoded, the indication information may be obtained by decoding the second video file only once.

Optionally, the indication information may include an identifier indicating the first image block and an identifier indicating the second image block.

In a possible implementation, when a second video needs to be restored, encoded data of the second video and a coding parameter of a first video (for example, including the first coding parameter of the first image block) may be obtained.

In a possible implementation, encoded data of the first video may be decapsulated and decoded, to obtain the coding parameter of the first video (for example, including the first coding parameter of the first image block).

The encoded data is decoded to obtain the difference information, where the difference information indicates a difference between the first coding parameter and the second coding parameter, the second coding parameter is a coding parameter of the second image block, and the first coding parameter and the second coding parameter include a motion vector and/or a residual.

The second coding parameter is obtained based on the first coding parameter and the difference information.

In a possible implementation, a sum operation may be performed on the first coding parameter and the difference information, to obtain the second coding parameter.

For example, the first coding parameter may include a first motion vector, and the second coding parameter includes a second motion vector. The difference information includes first difference information, and the first difference information indicates a difference between the first motion vector and the second motion vector. A sum operation may be performed on the first motion vector and the first difference information to obtain the second motion vector.

For another example, the first coding parameter may include a first residual, and the second coding parameter includes a second residual. The difference information includes second difference information, and the second difference information indicates a difference between the first residual and the second residual. A sum operation may be performed on the first residual and the second difference information to obtain the second residual.

Then, the obtained second coding parameter through restoration may be encoded and encapsulated to obtain the original encoded data of the second video.

Embodiments of this disclosure provide the video decoding method. The method includes obtaining encoded data, decoding the encoded data to obtain difference information, decoding a first image block based on indication information to obtain a first coding parameter, where the indication information indicates that an association exists between the first image block and a second image block, the first image block belongs to a first video file, the second image block belongs to a second video file, and the first video file and the second video file are different video files, and obtaining a second coding parameter based on the first coding parameter and the difference information, where the first coding parameter and the second coding parameter include a motion vector and/or a residual. The difference information is used to replace the original second coding parameter. Because a similarity between image features of the first image block and the second image block is greater than a threshold, a size of the encoded data obtained by encoding the difference information is far less than a size of encoded data obtained by encoding the second coding parameter, and the second coding parameter can be obtained through restoration based on the difference information and the first coding parameter. This is equivalent to reducing storage resources for video storage and bandwidth for video transmission while ensuring that the complete second image block can be restored.

In a possible implementation, a similarity between image features of the first image block and the second image block is greater than a threshold, a similarity between the first coding parameter and the second coding parameter is greater than a threshold, a similarity between subtitle information and/or audio information in the first video file and the second video file is greater than a threshold, and/or a similarity between DCT coefficients of the first image block and the second image block is greater than a threshold.

In a possible implementation, the image feature includes at least one of the following: a color feature, a texture feature, a shape feature, and a spatial relationship feature.

In a possible implementation, the first image block is included in a first image frame, the second image block is included in a second image frame, and the first image frame and the second image frame are different image frames.

In a possible implementation, the first image block is included in a first image frame in a first video, the second image block is included in a second image frame in a second video, and the first video and the second video are different video files.

According to a third aspect, this disclosure provides a video encoding method. The method includes obtaining a first image block in a first video file and a second image block in a second video file, where the first video file and the second video file are different video files.

In a possible implementation, a decoder may decode encoded data of a first video and encoded data of a second video, to obtain a video signal of the first video and a video signal of the second video. The video signal of the first video may include the first image block, and the video signal of the second video may include the second image block.

It should be understood that before decoding the encoded data of the first video and the encoded data of the second video, the decoder may decapsulate a video file of the first video and a video file of the second video.

In a possible implementation, for the encapsulated first video file and the encapsulated second video file, it may be determined, based on comparison between image features of all (or some) image frames in the first video file and the second video file (or comparison between coding parameters of image blocks obtained through decoding), whether the first video and the second video are videos with similar or even repeated content. The coding parameter may be a residual, a motion vector, a DCT coefficient, or the like, to select the first image block and the second image block (or select a first image frame and a second image frame, where the first image frame includes the first image block, and the second image frame includes the second image block).

In a possible implementation, for the encapsulated first video file and the encapsulated second video file, it may be determined, based on comparison between subtitle information and/or audio information in the first video file and the second video file, whether the first video and the second video are videos with similar or even repeated content (then, comparison between image features and/or coding parameters may be performed), and then the first image block and the second image block are selected (or the first image frame and the second image frame are selected, where the first image frame includes the first image block, and the second image frame includes the second image block).

In a possible implementation, for the encapsulated first video file and the encapsulated second video file, preliminary screening of the image frames may be performed based on comparison between the subtitle information and/or the audio information in the first video file and the second video file. An image frame with similar subtitle information and/or audio information may be first selected as a candidate, and then comparison between the image features and/or the coding parameters are performed, to select the first image block and the second image block (or select the first image frame and the second image frame, where the first image frame includes the first image block, and the second image frame includes the second image block). In the foregoing manner, a speed of determining a similar video, a similar image frame, and a similar image block can be accelerated, and further, computing overheads can be reduced.

In a possible implementation, for the encapsulated first video file and the encapsulated second video file, it may be determined, based on sources of the first video file and the second video file (for example, whether the first video file and the second video file are same-source videos is determined, whether the first video file and the second video file are obtained by editing based on a same video file, and in comparison with the second video file, the first video file is only added with a subtitle, special effect, or enables beauty processing), whether the first video file and the second video file are videos with similar or even repeated content, and then the first image block and the second image block are selected based on comparison between the image features and/or the coding parameters (or the first image frame and the second image frame are selected, where the first image frame includes the first image block, and the second image frame includes the second image block).

In a possible implementation, the first video may include the first image frame, the second video may include the second image frame, the first image frame may include a plurality of image blocks (including the first image block), and the second image frame may include a plurality of image blocks (including the second image block). The first image block and the second image block may be block units such as an MB, a prediction block (partition), a CU, a PU, and a TU. This is not limited herein. For description of the image blocks, refer to description in the foregoing embodiments. Details are not described herein again.

A similarity between image features of the first image block and the second image block is high, and the image feature of the image block may be one or more of a color feature, a texture feature, a shape feature, and the like of the image block. The color feature and the texture feature are used to describe a surface property of an object corresponding to the image block. The shape feature includes a contour feature and a region feature. The contour feature includes an outer boundary feature of the object, and the region feature includes a shape region feature of the object.

In a possible implementation, the first image block may be an image block in an I frame, and the second image block is an image block in a P frame or a B frame, or the first image block may be an image block in a P frame, and the second image block is an image block in a P frame or a B frame.

Difference information is determined by using the first image block as a reference block of the second image block, where the difference information indicates a difference between the first image block and the second image block.

The difference information is encoded to obtain encoded data. The encoded data may be used by a decoding side to obtain the second image block through restoration.

After the video signal of the second video is obtained, the video signal of the second video may be encoded based on the video signal of the first video. Further, a coding parameter of the second image block may be determined by using the first image block as the reference block of the second image block.

In a possible implementation, obtaining a first image block in a first video file and a second image block in a second video file includes obtaining a plurality of image blocks in the first video file and the second image block in the second video file, and determining an image block from the plurality of image blocks as the first image block, where a similarity between image features of the image block and the second image block is greater than a threshold, determining an image block from the plurality of image blocks as the first image block, where a similarity between coding parameters of the image block and the second image block is greater than a threshold, and the coding parameter includes a motion vector, a residual, and/or a DCT coefficient, and/or determining an image block from the plurality of image blocks as the first image block, where a similarity between subtitle information and/or audio information corresponding to the image block and the second image block is greater than a threshold.

In this embodiment of this disclosure, image blocks (all or some image blocks) in the first video file may be traversed, and an image block with a high similarity between image features of the image block and the second image block is selected from the traversed image blocks (or an image block with a high similarity between coding parameters of the image block and the second image block is selected, or an image block with a high similarity between subtitle information and/or audio information corresponding to the image block and the second image block is selected).

In a possible implementation, the first image frame in the first video and the second image frame in the second video may be obtained, where a similarity between image features of the first image frame and the second image frame is greater than a threshold, and the first video and the second video are different videos, and a second coding parameter of the second image frame is determined by using the first image frame as a reference frame of the second image frame.

In a possible implementation, the first image block may be an image block in an I frame of the first video, and the second image block may be an image block in a P frame or a B frame of the second video.

In a possible implementation, the first image block may be an image block in a P frame of the first video, and the second image block may be an image block in a P frame or a B frame of the second video.

The first coding parameter may be a residual, a motion vector, and other syntax information. This is not limited herein.

Optionally, in a process of encoding the second image block (or a current frame in this embodiment of this disclosure), the first image block may be used as a reference block, and the first image frame having the reference block is used as a reference frame to predict the second image block in the current frame (that is, the second image frame including the second image block). Optionally, the first image frame may be temporally after the current frame, or the current frame is temporally located between a previous reference frame that appears before the current frame in a video sequence and a subsequent reference frame that appears after the current frame in the video sequence (the first image frame may be one of the previous reference frame or the subsequent reference frame).

In some implementations, a high similarity exists between image content of only some image regions of the first image frame and the second image frame, and therefore, an image block, in the first image frame, with a high similarity between image content of the image block and an image block in the second image frame, may be used as a reference block when the image block in the second image frame is encoded.

Because the second image block is encoded by using the first image block as the reference block, related information that is in a group of pictures (GOP) in which the second image block is located and that is originally used as the reference block of the second image block may not be encoded into the encoded data. This reduces a size of the encoded data, storage space for second video storage, and a size of bandwidth for second video transmission.

In some implementations, an encoding module is further configured to encode the difference information and second indication information, where the second indication information indicates that an association exists between the first image block and the second image block (optionally, the second indication information may indicate that the first image block is used as a reference block of the second image block).

The second indication information includes an identifier of the first image block and an identifier of the second image block, and/or the first indication information includes an identifier of the first video file and an identifier of the second video file.

In some implementations, an obtaining module is further configured to obtain a third image block in a third video file and a fourth image block in the second video file, where the second image block and the fourth image block belong to a same image frame in the second video file, a similarity between image features of the third image block and the fourth image block is greater than a threshold, and the third video file and the second video file are different video file.

A difference determining module is further configured to determine the difference information by using the first image block as a reference block of the second image block and by using the third image block as a reference block of the fourth image block.

According to a fourth aspect, this disclosure provides a video decoding method. The method includes obtaining encoded data, decoding the encoded data to obtain a first coding parameter of a second image block in a second video, decoding a first video file based on indication information (for example, the second indication information described in the third aspect) to obtain a first image block, where the indication information indicates that an association exists between the first image block and the second image block (optionally, the indication information may indicate that a reference block of the second image block is the first image block in a first video), and the first video and the second video are different video files, and reconstructing the second image block based on the first coding parameter and the first image block.

Because the second image block is encoded by using the first image block as the reference block, related information that is in a GOP in which the second image block is located and that is originally used as the reference block of the second image block may not be encoded into the encoded data. This reduces a size of the encoded data, storage space for second video storage, and a size of bandwidth for second video transmission.

In a possible implementation, a similarity between image features of the first image block and the second image block is greater than a threshold, a similarity between the first coding parameter and a second coding parameter is greater than a threshold, a similarity between subtitle information and/or audio information in the first video file and a second video file is greater than a threshold, and/or a similarity between DCT coefficients of the first image block and the second image block is greater than a threshold.

In a possible implementation, the indication information includes an identifier of the first image block and an identifier of the second image block, and/or the indication information includes an identifier of the first video file and an identifier of the second video file.

In a possible implementation, the first image block is an image block in an I frame, and the second image block is an image block in a P frame or a B frame, or the first image block is an image block in a P frame, and the second image block is an image block in a P frame or a B frame.

In a possible implementation, the method further includes decoding the encoded data to obtain a fourth image block in the second video, obtaining a third image block based on second indication information, where the second indication information indicates that a reference block of the fourth image block is the third image block in a third video (or an association exists between image blocks), and the third video and the second video are different video files, and reconstructing the fourth image block based on the second coding parameter and the third image block.

In a possible implementation, the method further includes decoding the encoded data to obtain a sixth image block in the second video, obtaining a fifth image block based on third indication information, where the third indication information indicates that a reference block of the sixth image block is the fifth image block in the first video (or an association exists between image blocks), the first image block and the fifth image block belong to a same image frame or different image frames in the first video, and reconstructing the sixth image block based on a third coding parameter and the fifth image block.

According to a fifth aspect, this disclosure provides a video encoding method. The method includes obtaining a first video file and a second video file, where the first video file and the second video file are different video files, decoding the first video file and the second video file to obtain first information of a first image block in the first video file and second information of a second image block in the second video file, obtaining difference information based on the first information and the second information, where the difference information indicates a difference between the first information and the second information, and encoding the difference information to obtain encoded data. The encoded data may be used by a decoding side to obtain the second information through restoration.

In this disclosure, the difference information may be used to replace an original decoding result in a second video.

Because a size of bitstream data obtained by encoding the difference information is less than a size of bitstream data obtained by encoding the decoding result in the second video, it is equivalent to reducing storage resources for video storage and bandwidth for video transmission while ensuring that the complete second video file can be restored.

In a possible implementation, a similarity between image features of the first image block and the second image block is greater than a threshold. The difference information is used to replace the original second coding parameter. Because a similarity between the first image block and the second image block is greater than a threshold, a size of the encoded data obtained by encoding the difference information is far less than a size of encoded data obtained by encoding the second information, and the second information can be obtained through restoration based on the difference information and the first information. This is equivalent to reducing storage resources for video storage and bandwidth for video transmission while ensuring that the complete second video can be restored.

In a possible implementation, a similarity between the first information and the second information is greater than a threshold. The difference information is used to replace the original second coding parameter. Because the similarity between the first information and the second information is greater than the threshold, a size of the encoded data obtained by encoding the difference information is far less than a size of encoded data obtained by encoding the second information, and the second information can be obtained through restoration based on the difference information and the first information. This is equivalent to reducing storage resources for video storage and bandwidth for video transmission while ensuring that the complete second video can be restored.

It should be understood that the threshold herein may be a value indicating a high similarity between image blocks (a specific value is not limited in this disclosure).

In a possible implementation, the first information includes a first coding parameter of the first image block, the second information includes a second coding parameter of the second image block, and the first coding parameter and the second coding parameter include a motion vector and/or a residual.

In a possible implementation, a first video may include a first image frame, a second video may include a second image frame, the first image frame may include a plurality of image blocks (including the first image block), and the second image frame may include a plurality of image blocks (including the second image block). The first image block and the second image block may be block units such as an MB, a prediction block (partition), a CU, a PU, and a TU. This is not limited herein.

A similarity between image features of the first image block and the second image block is high, and the image feature of the image block may be one or more of a color feature, a texture feature, a shape feature, and the like of the image block. The color feature and the texture feature are used to describe a surface property of an object corresponding to the image block. The shape feature includes a contour feature and a region feature. The contour feature includes an outer boundary feature of the object, and the region feature includes a shape region feature of the object.

In this embodiment of this disclosure, the first coding parameter of the first image block and the second coding parameter of the second image block may be obtained. The first coding parameter and the second coding parameter may be motion vectors, the first coding parameter and the second coding parameter may be residuals, or the first coding parameter and the second coding parameter may be motion vectors and residuals.

The residual may be obtained through calculation based on the image block and the prediction block. For example, a sample value of the prediction block may be subtracted from a sample value of the picture image block sample by sample (pixel by pixel), to obtain the residual in a sample domain.

Optionally, the coding parameter may further include syntax information. For example, the syntax information may be but is not limited to any one or all of an inter prediction parameter, an intra prediction parameter, a loop filter parameter, and/or another syntax element (decoded).

In a possible implementation, a subtraction operation may be performed on the first coding parameter and the second coding parameter to obtain the difference information. In addition, the difference information may be obtained through calculation based on another operation used to quantize a difference between the first coding parameter and the second coding parameter. This is not limited herein.

It should be understood that the first image block and the second image block may be image blocks with similar image features in the first image frame and the second image frame, and the foregoing processing on the first image block and the second image block may be performed on some or all image blocks in the first image frame and the second image frame. In this way, difference information of a plurality of groups of image blocks can be obtained.

In an implementation, the difference information may be used as a coding parameter of the second image block (to replace the original second coding parameter), and data of the second video including the coding parameter of the second image block is encoded, to obtain a bitstream of the second video.

It should be understood that the first image block and the second image block may be image blocks with similar image features in the first image frame and the second image frame, and the foregoing processing on the first image block and the second image block may be performed on some or all image blocks in the first image frame and the second image frame.

It should be understood that the first image frame and the second image frame may be image frames with similar image features in the first video and the second video, and the foregoing processing on the first image block and the second image block may be performed on image blocks in some or all the image frames in the first video and the second video.

In a possible implementation, the first image block is included in the first image frame, the second image block is included in the second image frame, and the first image frame and the second image frame are different image frames.

In a possible implementation, the first coding parameter may include a first motion vector, the second coding parameter includes a second motion vector, the difference information includes first difference information, and the first difference information is a difference between the first motion vector and the second motion vector.

For example, in a possible implementation, the first coding parameter may include a first residual, the second coding parameter includes a second residual, the difference information includes second difference information, and the second difference information is a difference between the first residual and the second residual.

In a possible implementation, the first coding parameter may include a first motion vector and a first residual, the second coding parameter includes a second motion vector and a second residual, the difference information includes first difference information and second difference information, the first difference information is a difference between the first motion vector and the second motion vector, and the second difference information is a difference between the first residual and the second residual.

In a possible implementation, the first coding parameter includes a first residual, the second coding parameter includes a second residual, the difference information includes second difference information, and the second difference information indicates a difference between the first residual and the second residual, and encoding the difference information includes encoding the second difference information through lossless compression coding or lossy compression coding.

Because the first difference information represents a difference between motion vectors, and the motion vector is used during inter prediction, if lossy compression is employed to compress the first difference information, inter prediction effect is poor (for example, an artifact occurs) during decoding. In this embodiment of this disclosure, lossless compression is employed to compress the first difference information, to improve inter prediction precision and effect.

In a possible implementation, the first coding parameter includes a first motion vector, the second coding parameter includes a second motion vector, the difference information includes first difference information, and the first difference information indicates a difference between the first motion vector and the second motion vector, and encoding the difference information includes encoding the first difference information through lossless compression coding.

In a possible implementation, the first difference information (the first difference information indicates a difference between the first motion vector and the second motion vector) may be encoded through lossless compression coding.

In a possible implementation, the second difference information (the second difference information indicates a difference between the first residual and the second residual) may be encoded through lossless compression coding or lossy compression coding.

Lossless compression may be lossless compression including transform (reserving all coefficients), scanning, and entropy coding, and lossy compression may be lossy compression including transform (reserving a low frequency coefficient), quantization, scanning, and entropy coding.

In a possible implementation, after a bitstream is obtained, the encoded data and the first coding parameter may be sent to the decoding side, so that the decoding side obtains the second coding parameter based on the encoded data and the first coding parameter, or the encoded data may be locally stored for later transmission or retrieval.

It should be understood that, to enable the decoding side to obtain the second coding parameter based on the encoded data, the bitstream of the first video further needs to be sent to the decoding side, so that the decoding side can decode the bitstream of the first video to obtain the first coding parameter, and obtain the second coding parameter based on the first coding parameter and the difference information.

It should be understood that the encoded data may be encapsulated. Correspondingly, encapsulated encoded data may be sent to the decoding side, so that the decoding side obtains the second coding parameter based on the encapsulated encoded data, or encapsulated encoded data may be locally stored for later transmission or retrieval.

It should be understood that the first indication information may be further encoded. The first indication information may indicate that an association exists between the first image block and the second image block. Further, the decoding side may obtain the first coding parameter of the first image block and the difference information based on the first indication information, and obtain the second coding parameter based on the first coding parameter and the difference information. The first indication information includes an identifier of the first image block and an identifier of the second image block, and/or the first indication information includes an identifier of the first video file and an identifier of the second video file.

In a possible implementation, the first information includes a first image block, and the second information includes a second image block, and obtaining difference information based on the first information and the second information includes determining the difference information by using the first image block as a reference block of the second image block, where the difference information includes a third coding parameter of the second image block.

In a possible implementation, a decoder may decode encoded data of the first video and encoded data of the second video, to obtain a video signal of the first video and a video signal of the second video. The video signal of the first video may include the first image block, and the video signal of the second video may include the second image block.

It should be understood that before decoding the encoded data of the first video and the encoded data of the second video, the decoder may decapsulate a video file of the first video and a video file of the second video.

It should be understood that the first video and the second video may be different videos, or may be different parts of a same video (for example, if a large quantity of repeated video clips exist in some videos, the first video and the second video may be two repeated video clips in the videos). This is not limited herein.

A similarity between image features of the first image block and the second image block is high, and the image feature of the image block may be one or more of a color feature, a texture feature, a shape feature, and the like of the image block. The color feature and the texture feature are used to describe a surface property of an object corresponding to the image block. The shape feature includes a contour feature and a region feature. The contour feature includes an outer boundary feature of the object, and the region feature includes a shape region feature of the object.

In a possible implementation, the first image block may be an image block in an I frame, and the second image block is an image block in a P frame or a B frame, or the first image block may be an image block in a P frame, and the second image block is an image block in a P frame or a B frame.

After the video signal of the second video is obtained, the video signal of the second video may be encoded based on the video signal of the first video. Further, the third coding parameter of the second image block may be determined by using the first image block as the reference block of the second image block.

In a possible implementation, the first image frame in the first video and the second image frame in the second video may be obtained, where a similarity between image features of the first image frame and the second image frame is greater than a threshold, and the first video and the second video are different videos, and the third coding parameter of the second image frame is determined by using the first image frame as a reference frame of the second image frame.

The third coding parameter may be a residual, a motion vector, and other syntax information. This is not limited herein.

Optionally, in a process of encoding the second image block (which may also be referred to as a current frame in this embodiment of this disclosure), the first image block may be used as a reference block, and the first image frame having the reference block is used as a reference frame to predict the second image block in the current frame (that is, the second image frame including the second image block). Optionally, the first image frame may be temporally after the current frame, or the current frame is temporally located between a previous reference frame that appears before the current frame in a video sequence and a subsequent reference frame that appears after the current frame in the video sequence (the first image frame may be one of the previous reference frame or the subsequent reference frame).

In some implementations, a high similarity exists between image content of only some image regions of the first image frame and the second image frame, and therefore, an image block, in the first image frame, with a high similarity between image content of the image block and an image block in the second image frame, may be used as a reference block when the image block in the second image frame is encoded.

Because the second image block is encoded by using the first image block as the reference block, related information that is in a GOP in which the second image block is located and that is originally used as the reference block of the second image block may not be encoded into the encoded data. This reduces a size of the encoded data, storage space for second video storage, and a size of bandwidth for second video transmission.

It should be understood that, to enable the decoder to obtain a complete and accurate video signal of the second video through decoding, second indication information further needs to be encoded into the encoded data. The second indication information indicates that the reference block of the second image block is the first image block. Further, when performing decoding, the decoder may learn that the reference block of the second image block is the first image block. The second indication information may include an identifier of the first image block and an identifier of the second image block.

It should be understood that if the first image frame is used as the reference frame of the second image frame, the second indication information may indicate that the reference frame of the second image frame is the first image frame. Further, the first image frame may be obtained based on the second indication information, and the second image frame is reconstructed based on the coding parameter of the second image frame and the first image frame.

In a possible implementation, the method further includes decoding the second video file to obtain a fourth image block, obtaining a third video file, where the third video file and the second video file are different video files, decoding the third video file to obtain a third image block in the third video file, where a similarity between image features of the third image block and the fourth image block is greater than a threshold, and the second image block and the fourth image block belong to a same image frame in the second video file, and determining the difference information by using the third image block as a reference block of the fourth image block, where the difference information includes a fourth coding parameter of the fourth image block.

In some implementations, a high similarity exists between image content of only some image regions of the first image frame and the second image frame, and a region with a high similarity between image content of the region and some regions of the second image frame exists in another image frame in the third video (that is, a video other than the first video and the second video). In this case, an image block, in the other image frame, with a high similarity between image content of the image block and an image block of the second image frame, may be used as a reference block when the image block in the second image frame is encoded.

Further, the second image frame may further include an image block (for example, the fourth image block) other than the second image block. In a process of encoding the fourth image block, one image block in the third video may be used as a reference block (the third image block) of the fourth image block.

In a possible implementation, the second coding parameter and second indication information may be encoded, and the second indication information indicates that the reference block of the fourth image block is the third image block.

In a possible implementation, the method further includes decoding the first video file to obtain a fifth image block, decoding the second video file to obtain a sixth image block, where the second image block and the sixth image block belong to a same image frame in the second video file, a similarity between image features of the fifth image block and the sixth image block is greater than a threshold, and the first image block and the fifth image block belong to a same image frame or different image frames in the first video file, and determining the difference information by using the fifth image block as a reference block of the sixth image block, where the difference information includes a fifth coding parameter of the fifth image block.

In some implementations, a high similarity exists between image content of only some image regions of the first image frame and the second image frame, and a region with a high similarity between image content of the region and some regions of the second image frame exists in another image frame in the first video. In this case, an image block, in the other image frame, with a high similarity between image content of the image block and an image block in the second image frame, may be used as a reference block when the image block in the second image frame is encoded.

Further, the second image frame may further include an image block (for example, the sixth image block) other than the second image block. In a process of encoding the sixth image block, one image block in the first video may be used as a reference block (the fifth image block) of the sixth image block. The reference block may be an image block in the first image frame (the image frame in which the first image block is located), or the reference block may be an image block in an image frame other than the first image frame in the first video (the image frame in which the first image block is located). This is not limited herein.

In a possible implementation, the image feature includes at least one of the following: a color feature, a texture feature, a shape feature, and a spatial relationship feature.

According to a sixth aspect, this disclosure provides a video decoding method. The method includes obtaining encoded data, decoding the encoded data to obtain difference information, decoding a first video file based on indication information to obtain first information, where the indication information indicates that an association exists between the first information and second information (optionally, the indication information indicates that the difference information is obtained based on a difference between the first information and the second information), the first information corresponds to a first image block in the first video file, the second information corresponds to a second image block in a second video file, and the first video file and the second video file are different video files, and obtaining the second information based on the first information and the difference information.

It should be understood that the indication information may be further encoded. The indication information may indicate that the difference information is obtained based on a difference between the first image block and the second image block. Further, a decoding side may obtain a first coding parameter of the first image block and the difference information based on the indication information, and obtain a second coding parameter based on the first coding parameter and the difference information. The indication information may include an identifier indicating the first image block and an identifier indicating the second image block.

In this disclosure, the difference information may be used to replace an original decoding result in a second video. Because a size of bitstream data obtained by encoding the difference information is less than a size of bitstream data obtained by encoding the decoding result in the second video, it is equivalent to reducing storage resources for video storage and bandwidth for video transmission while ensuring that the complete second video file can be restored.

In a possible implementation, the first information includes a first coding parameter of the first image block, the second information includes a second coding parameter of the second image block, and the first coding parameter and the second coding parameter include a motion vector and/or a residual.

In a possible implementation, the first image block is included in a first image frame, the second image block is included in a second image frame, and the first image frame and the second image frame are different image frames.

In a possible implementation, the first information includes the first image block, and the second information includes the second image block.

In a possible implementation, the indication information indicates that a reference block of the second image block is the first image block.

Because the second image frame is encoded by using the first image frame as a reference frame, related information that is in a GOP in which the second image frame is located and that is originally used as the reference frame of the second image frame may not be encoded into the encoded data. This reduces a size of the encoded data, storage space for second video storage, and a size of bandwidth for second video transmission.

In a possible implementation, the first image block is an image block in an I frame, and the second image block is an image block in a P frame or a B frame, or the first image block is an image block in a P frame, and the second image block is an image block in a P frame or a B frame.

In a possible implementation, a similarity between image features of the first image block and the second image block is greater than a threshold, and the image feature includes at least one of the following: a color feature, a texture feature, a shape feature, and a spatial relationship feature.

According to a seventh aspect, this disclosure provides a video encoding method. The method includes obtaining a first image frame in a first video and a second image frame in a second video (optionally, a similarity between image features of the first image frame and the second image frame is greater than a threshold), where the first video and the second video are different video files, determining difference information by using the first image frame as a reference frame of the second image frame, where the difference information indicates a difference between the first image frame and the second image frame, and encoding the difference information to obtain encoded data. The encoded data may be used by a decoding side to obtain the second image frame through restoration.

Because the second image frame is encoded by using the first image frame as a reference frame, related information that is in a GOP in which the second image frame is located and that is originally used as the reference frame of the second image frame may not be encoded into the encoded data. This reduces a size of the encoded data, storage space for second video storage, and a size of bandwidth for second video transmission.

In a possible implementation, obtaining a first image frame in a first video file and a second image frame in a second video file includes obtaining a plurality of image frames in the first video file and the second image frame in the second video file, determining, from the plurality of image frames, an image frame when a similarity between image features of the image frame and the second image frame is greater than a threshold as the first image frame, determining, from the plurality of image frames, an image frame when a similarity between coding parameters of the image frame and the second image frame is greater than a threshold as the first image frame, where the coding parameter includes a motion vector, a residual, and/or a DCT coefficient, and/or determining, from the plurality of image frames, an image frame when a similarity between subtitle information and/or audio information corresponding to the image frame and the second image frame is greater than a threshold as the first image frame.

The image feature includes at least one of the following: a color feature, a texture feature, a shape feature, and a spatial relationship feature.

In a possible implementation, the first image frame is an I frame, and the second image frame is a P frame or a B frame, or the first image frame is a P frame, and the second image frame is a P frame or a B frame.

In a possible implementation, a first coding parameter includes a first motion vector, a second coding parameter includes a second motion vector, the difference information includes first difference information, and the first difference information indicates a difference between the first motion vector and the second motion vector.

Encoding the difference information includes encoding the first difference information through lossless compression coding.

In a possible implementation, the first coding parameter includes a first residual, the second coding parameter includes a second residual, the difference information includes second difference information, and the second difference information indicates a difference between the first residual and the second residual.

Encoding the difference information includes encoding the second difference information through lossless compression coding or lossy compression coding.

In a possible implementation, encoding the difference information includes encoding the difference information and first indication information, where the first indication information indicates that an association exists between the first image frame and the second image frame.

In a possible implementation, the first indication information includes an identifier of the first image frame and an identifier of the second image frame.

According to an eighth aspect, this disclosure further provides a video decoding method. The method includes obtaining encoded data, decoding the encoded data to obtain difference information, decoding a first video file based on indication information to obtain a first image frame, where the indication information indicates that an association exists between the first image frame and a second image frame, the first image frame belongs to the first video file, the second image frame belongs to a second video file, and the first video file and the second video file are different video files, and obtaining the second image frame based on the first image frame and the difference information.

In a possible implementation, a similarity between image features of the first image frame and the second image frame is greater than a threshold, a similarity between a first coding parameter and a second coding parameter is greater than a threshold, a similarity between subtitle information and/or audio information in the first video file and the second video file is greater than a threshold, and/or a similarity between DCT coefficients of the first image frame and the second image frame is greater than a threshold.

In a possible implementation, the first image frame is an I frame, and the second image frame is a P frame or a B frame, or the first image frame is a P frame, and the second image frame is a P frame or a B frame.

According to a ninth aspect, this disclosure provides a video encoding apparatus. The apparatus includes an obtaining module configured to obtain a first coding parameter of a first image block and a second coding parameter of a second image block, where the first image block is an image block in a first video file, the second image block is an image block in a second video file, the first video file and the second video file are different video files, and the first coding parameter and the second coding parameter include a motion vector and/or a residual, a difference determining module configured to obtain difference information based on the first coding parameter and the second coding parameter, where the difference information indicates a difference between the first coding parameter and the second coding parameter, and an encoding module configured to encode the difference information to obtain encoded data. The encoded data may be used by a decoding side to obtain the second coding parameter through restoration. In this disclosure, the difference information is used to replace the original second coding parameter. Because a similarity between image features of the first image block and the second image block is greater than a threshold, a size of the encoded data obtained by encoding the difference information is far less than a size of encoded data obtained by encoding the second coding parameter, and the second coding parameter can be obtained through restoration based on the difference information and the first coding parameter. This is equivalent to reducing storage resources for video storage and bandwidth for video transmission while ensuring that the complete second image block can be restored.

An embodiment of this disclosure provides a video encoding method. The method includes obtaining a first coding parameter of a first image block and a second coding parameter of a second image block, where the first image block is an image block in a first video file, the second image block is an image block in a second video file, the first video file and the second video file are different video files, and the first coding parameter and the second coding parameter include a motion vector and/or a residual, obtaining difference information based on the first coding parameter and the second coding parameter, where the difference information indicates a difference between the first coding parameter and the second coding parameter, and encoding the difference information to obtain encoded data. The encoded data is used by a decoding side to obtain the second coding parameter through restoration. The difference information is used to replace the original second coding parameter. Because a similarity between image features of the first image block and the second image block is greater than a threshold, a size of bitstream data obtained by encoding the difference information is less than a size of bitstream data obtained by encoding the second coding parameter, and the second coding parameter can be obtained through restoration based on the difference information and the first coding parameter. This is equivalent to reducing storage resources for video storage and bandwidth for video transmission while ensuring that the complete second image block can be restored.

BRIEF DESCRIPTION OF DRAWINGS

To describe technical solutions in some embodiments of the present disclosure more clearly, the following describes accompanying drawings for describing embodiments of the present disclosure.

FIG. 6 is a schematic flowchart of a video encoding method according to an embodiment of this disclosure;

FIG. 9 is a schematic diagram of video encoding according to an embodiment of this disclosure;

FIG. 10 is a schematic diagram of video encoding according to an embodiment of this disclosure;

FIG. 12 is a schematic flowchart of a video decoding method according to an embodiment of this disclosure;

FIG. 13 is a schematic flowchart of a video encoding method according to an embodiment of this disclosure;

FIG. 15 is a schematic flowchart of a video decoding method according to an embodiment of this disclosure;

FIG. 16B is a schematic flowchart of a video encoding method according to this disclosure;

DESCRIPTION OF EMBODIMENTS

Figure 1A:
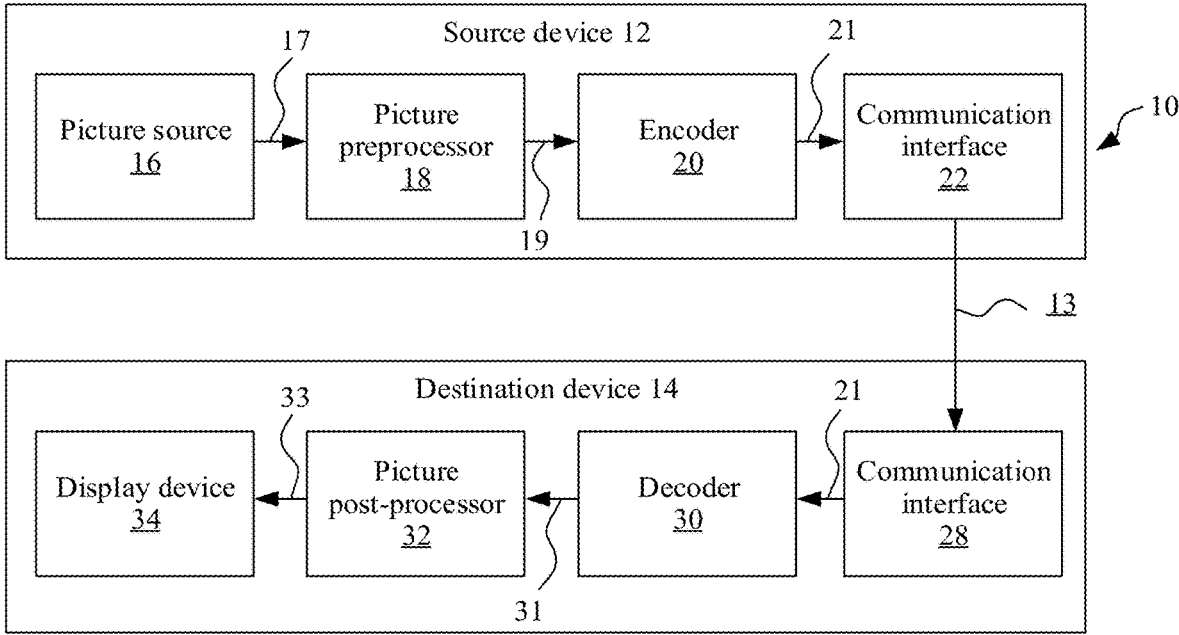
FIG. 1A is a block diagram of an example of a video coding system for implementing an embodiment of the present disclosure.

The following describes embodiments of the present disclosure with reference to the accompanying drawings in embodiments of the present disclosure. In the following description, specific aspects of embodiments of the present disclosure or specific aspects in which embodiments of the present disclosure may be used are shown by the accompanying drawings. It should be understood that embodiments of the present disclosure may be used in other aspects, and may include structural or logical changes not depicted in the accompanying drawings. The following detailed description, therefore, is not to be taken in a limiting sense, and the scope of the present disclosure is defined by the appended claims. For example, it should be understood that the disclosure with reference to the described method may also be applied to a corresponding device or system for performing the method, and vice versa. For example, if one or more specific method steps are described, a corresponding device may include one or more units such as functional units for performing the described one or more method steps (for example, one unit performs the one or more steps, or a plurality of units, each of which performs one or more of the plurality of steps), even if such one or more units are not explicitly described or illustrated in the accompanying drawings. In addition, for example, if a specific apparatus is described based on one or more units such as a functional unit, a corresponding method may include one step for implementing functionality of one or more units (for example, one step for implementing functionality of one or more units, or a plurality of steps, each of which is for implementing functionality of one or more units in a plurality of units), even if such one or more of steps are not explicitly described or illustrated in the accompanying drawings. Further, it should be understood that features of example embodiments and/or aspects described herein may be combined with each other, unless expressly stated otherwise.

In embodiments of the present disclosure, "at least one" means one or more, and "a plurality of" means two or more. "And/or" describes an association relationship between associated objects, and represents that three relationships may exist. For example, A and/or B may represent the following cases: only A exists, both A and B exist, and only B exists, where A and B may be singular or plural. The character "/" generally indicates an "or" relationship between the associated objects. "At least one item (piece) of the following" or a similar expression thereof means any combination of these items, including a singular item (piece) or any combination of plural items (pieces). For example, at least one of a, b, or c may indicate: a; b; c; a and b; a and c; b and c; or a, b, and c, where a, b, and c may be singular or plural.

Terms used in embodiments of the present disclosure are merely used to explain specific embodiments of the present disclosure, but are not intended to limit the present disclosure. The following first briefly describes some concepts that may be mentioned in embodiments of the present disclosure.

Video coding usually indicates processing of a sequence of pictures, where the sequence of pictures forms a video or a video sequence. In the field of video coding, the terms "picture", "frame", or "image" may be used as synonyms. Video coding used in this specification indicates video encoding or video decoding. Video encoding is performed on a source side, and usually includes processing (for example, through compressing) an original video picture to reduce an amount of data for representing the video picture, for more efficient storage and/or transmission. Video decoding is performed on a destination side, and usually includes inverse processing relative to an encoder, to reconstruct the video picture. Video picture "coding" in embodiments should be understood as "encoding" or "decoding" of a video sequence. A combination of an encoding part and a decoding part is also referred to as coding (encoding and decoding).

A video sequence includes a series of pictures, a picture is further partitioned into slices, and a slice is further partitioned into blocks. In video coding, coding processing is performed per block. In some new video coding standards, a concept "block" is further extended. For example, an MB is introduced in the H.264 standard. The macroblock may be further split into a plurality of prediction blocks for predictive coding. In the High Efficiency Video Coding (HEVC) standard, a plurality of block units are functionally divided by using basic concepts such as a CU, a PU, and a TU, and are described by employing a new tree-based structure. For example, a CU may be split into smaller CUs based on a quadtree, and a smaller CU may continue to be split to generate a quadtree structure. The CU is a basic unit for splitting and coding a to-be-coded image. A PU and a TU also have a similar tree structure. The PU may correspond to a prediction block and is a basic unit of predictive coding. The CU is further split into a plurality of PUs in a split mode. The TU may correspond to a transform block, and is a basic unit for transforming a prediction residual. However, in essence, all of the CU, the PU, and the TU are conceptually blocks (or image blocks). For a concept of an image block (for example, a first image block and a second image block) in embodiments of this disclosure, refer to description herein for details.

For example, in HEVC, a coding tree unit (CTU) is split into a plurality of CUs by using a quadtree structure represented as a coding tree. A decision on whether to code a picture area using inter-picture (temporal) or intra-picture (spatial) prediction is made at a CU level. Each CU may be further split into one, two, or four PUs based on a PU splitting type. Inside one PU, a same prediction process is applied, and related information is transmitted to a decoder on a PU basis. After a residual block is obtained by applying the prediction process based on the PU splitting type, the CU may be partitioned into transform units (TUs) based on another quadtree structure similar to the coding tree used for the CU. In the recent development of video compression technologies, a quadtree plus binary tree (QTBT) partition frame is used for partitioning an encoding block. In a QTBT block structure, a CU may have a square or rectangular shape.

In this specification, for ease of description and understanding, a to-be-processed image block (or a to-be-processed image block) in a current coding image may be referred to as a current block, for example, in encoding, the to-be-processed image block refers to a block currently being encoded, and in decoding, the to-be-processed image block refers to a block currently being decoded. A decoded image block that is in a reference image and that is for predicting the current block is referred to as a reference block. In other words, the reference block is a block that provides a reference signal for the current block, where the reference signal indicates a pixel value in the image block. A block that provides a prediction signal for a current block in a reference image may be referred to as a prediction block. The prediction signal indicates a pixel value, a sampling value, or a sampling signal in the prediction block. For example, after a plurality of reference blocks are traversed, an optimal reference block is found, and the optimal reference block will provide prediction for the current block, and may be referred to as a prediction block.

In a case of lossless video coding, original video pictures can be reconstructed. In other words, reconstructed video pictures have same quality as the original video pictures (assuming that no transmission loss or other data loss occurs during storage or transmission). In a case of lossy video coding, further compression is performed through, for example, quantization, to reduce an amount of data for representing video pictures, and the video pictures cannot be completely reconstructed on a decoder side. In other words, quality of reconstructed video pictures is lower or poorer than that of the original video pictures.

Several H.261 video coding standards are for "lossy hybrid video codecs" (in other words, spatial and temporal prediction in a sample domain is combined with two-dimensional (2D) transform coding for applying quantization in a transform domain). Each picture of a video sequence is usually split into a set of non-overlapping blocks, and coding is usually performed at a block level. In other words, at an encoder side, a video is usually processed, namely, encoded, at a block (video block) level, for example, using spatial (intra-picture) prediction and temporal (inter-picture) prediction to generate a prediction block, subtracting the prediction block from a current block (a block that is currently being processed or to be processed) to obtain a residual block, and transforming the residual block and quantizing the residual block in the transform domain to reduce an amount of data to be transmitted (compressed). At a decoder side, inverse processing relative to the encoder is applied to the encoded or compressed block to reconstruct the current block for representation. Furthermore, the encoder duplicates a decoder processing loop, so that the encoder and the decoder generate same prediction (for example, intra prediction and inter prediction) and/or reconstruction, for processing, that is, for coding subsequent blocks.

The following describes a system architecture to which embodiments of the present disclosure are applied. FIG. 1A is a schematic block diagram of an example of a video encoding and decoding system 10 to which an embodiment of the present disclosure is applied. As shown in FIG. 1A, the video encoding and decoding system 10 may include a source device 12 and a destination device 14. The source device 12 generates encoded video data, and therefore the source device 12 may be referred to as a video encoding apparatus. The destination device 14 may decode the encoded video data generated by the source device 12, and therefore the destination device 14 may be referred to as a video decoding apparatus. In various implementation solutions, the source device 12, the destination device 14, or both the source device 12 and the destination device 14 may include one or more processors and a memory coupled to the one or more processors. The memory may include but is not limited to a random-access memory (RAM), a read-only memory (ROM), an electrically erasable programmable ROM (EEPROM), a flash memory, or any other medium that can be used to store desired program code in a form of instructions or a data structure accessible to a computer, as described in this specification. The source device 12 and the destination device 14 may include various apparatuses, including a desktop computer, a mobile computing apparatus, a notebook (for example, a laptop) computer, a tablet computer, a set-top box, a telephone handset such as a "smart" phone, a television, a camera, a display apparatus, a digital media player, a video game console, a vehicle-mounted computer, a wireless communication device, or the like.

Although FIG. 1A depicts the source device 12 and the destination device 14 as separate devices, in a device embodiment, both the source device 12 and the destination device 14 or functionalities of both the source device 12 and the destination device 14, that is, the source device 12 or a corresponding functionality and the destination device 14 or a corresponding functionality, may alternatively be included. In such an embodiment, the source device 12 or the corresponding functionality and the destination device 14 or the corresponding functionality may be implemented by using same hardware and/or software or by using separate hardware and/or software or any combination thereof.

A communication connection between the source device 12 and the destination device 14 may be implemented through a link 13, and the destination device 14 may receive encoded video data from the source device 12 through the link 13. The link 13 may include one or more media or apparatuses capable of moving the encoded video data from the source device 12 to the destination device 14. In an example, the link 13 may include one or more communication media that enable the source device 12 to transmit the encoded video data directly to the destination device 14 in real time. In this example, the source device 12 may modulate the encoded video data according to a communication standard (for example, a wireless communication protocol), and may transmit modulated video data to the destination device 14. The one or more communication media may include a wireless communication medium and/or a wired communication medium, for example, a radio frequency (RF) spectrum or one or more physical transmission lines. The one or more communication media may form a part of a packet-based network, and the packet-based network is, for example, a local area network, a wide area network, or a global network (for example, the internet). The one or more communication media may include a router, a switch, a base station, or another device that facilitates communication from the source device 12 to the destination device 14.

The source device 12 includes an encoder 20. Optionally, the source device 12 may further include a picture source 16, a picture preprocessor 18, and a communication interface 22. In a specific implementation form, the encoder 20, the picture source 16, the picture preprocessor 18, and the communication interface 22 may be hardware components in the source device 12, or may be software programs in the source device 12. The following describes the components separately.

The picture source 16 may include or be any type of picture capturing device configured to, for example, capture a real-world picture, and/or any type of device for generating a picture or comment (for screen content encoding, some text on a screen is also considered as a part of a to-be-encoded picture or image), for example, a computer graphics processor configured to generate a computer animation picture, or any type of device configured to obtain and/or provide a real-world picture or a computer animation picture (for example, screen content or a virtual reality (VR) picture), and/or any combination thereof (for example, an augmented reality (AR) picture). The picture source 16 may be a camera configured to capture a picture or a memory configured to store a picture. The picture source 16 may further include any type of (internal or external) interface through which a previously captured or generated picture is stored and/or a picture is obtained or received. When the picture source 16 is a camera, the picture source 16 may be, for example, a local camera, or an integrated camera integrated into the source device. When the picture source 16 is a memory, the picture source 16 may be a local memory or, for example, an integrated memory integrated into the source device. When the picture source 16 includes an interface, the interface may be, for example, an external interface for receiving a picture from an external video source. The external video source is, for example, an external picture capturing device such as a camera, an external memory, or an external picture generation device. The external picture generation device is, for example, an external computer graphics processor, a computer, or a server. The interface may be any type of interface, for example, a wired or wireless interface or an optical interface, according to any proprietary or standardized interface protocol.

A picture may be considered as a two-dimensional array or matrix of picture elements. A pixel in the array may also be referred to as a sample. A quantity of samples in horizontal and vertical directions (or axes) of the array or the picture defines a size and/or resolution of the picture. For representation of a color, three color components are usually employed. To be specific, the picture may be represented as or include three sample arrays. For example, in an red, green, and blue (RBG) format or color space, a picture includes a corresponding red, green, and blue sample array. However, in video coding, each sample is usually represented in a luminance/chrominance format or color space. For example, a picture in a YUV format includes a luminance component indicated by Y (or sometimes L) and two chrominance components indicated by U and V. The luminance (luma) component Y represents luminance or gray level intensity (for example, both are the same in a gray-scale picture), and the two chrominance (chroma) components U and V represent chrominance or color information components. Accordingly, the picture in the YUV format includes a luminance sample array of luminance sample values (Y) and two chrominance sample arrays of chrominance values (U and V). A picture in an RGB format may be transformed or converted to a picture in a YUV format and vice versa. This process is also referred to as color conversion or transform. If a picture is monochrome, the picture may include only a luminance sample array. In this embodiment of the present disclosure, a picture transmitted by the picture source 16 to the picture processor may also be referred to as raw picture data 17.

The picture preprocessor 18 is configured to receive raw picture data 17 and perform preprocessing on the raw picture data 17 to obtain a preprocessed picture 19 or preprocessed picture data 19. For example, the picture preprocessor 18 may perform preprocessing: trimming, color format transformation (for example, from the RGB format to the YUV format), color correction, or denoising.

Figure 2:
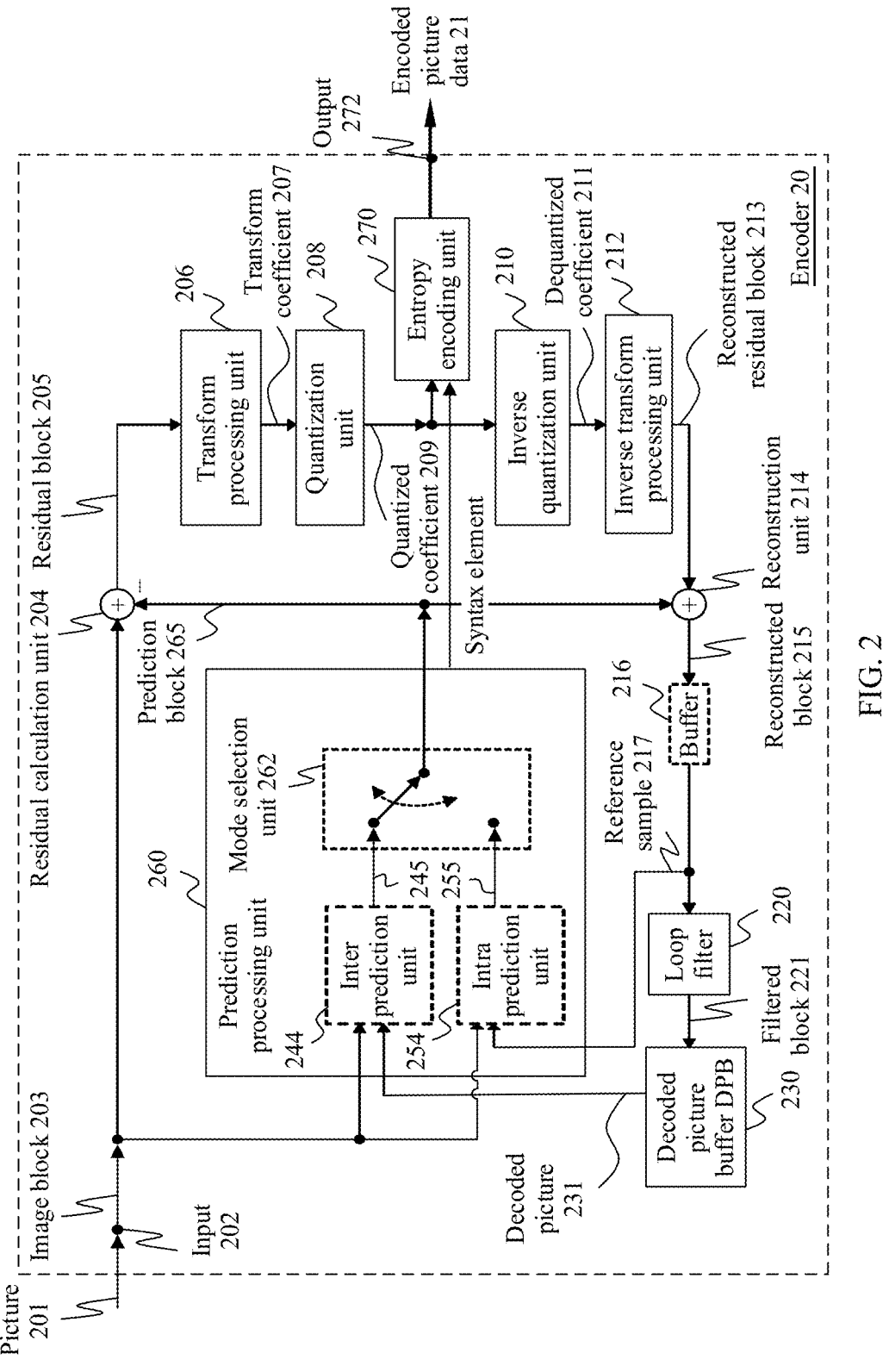
FIG. 2 is a block diagram of an example structure of an encoder for implementing an embodiment of the present disclosure.
Figure 4:
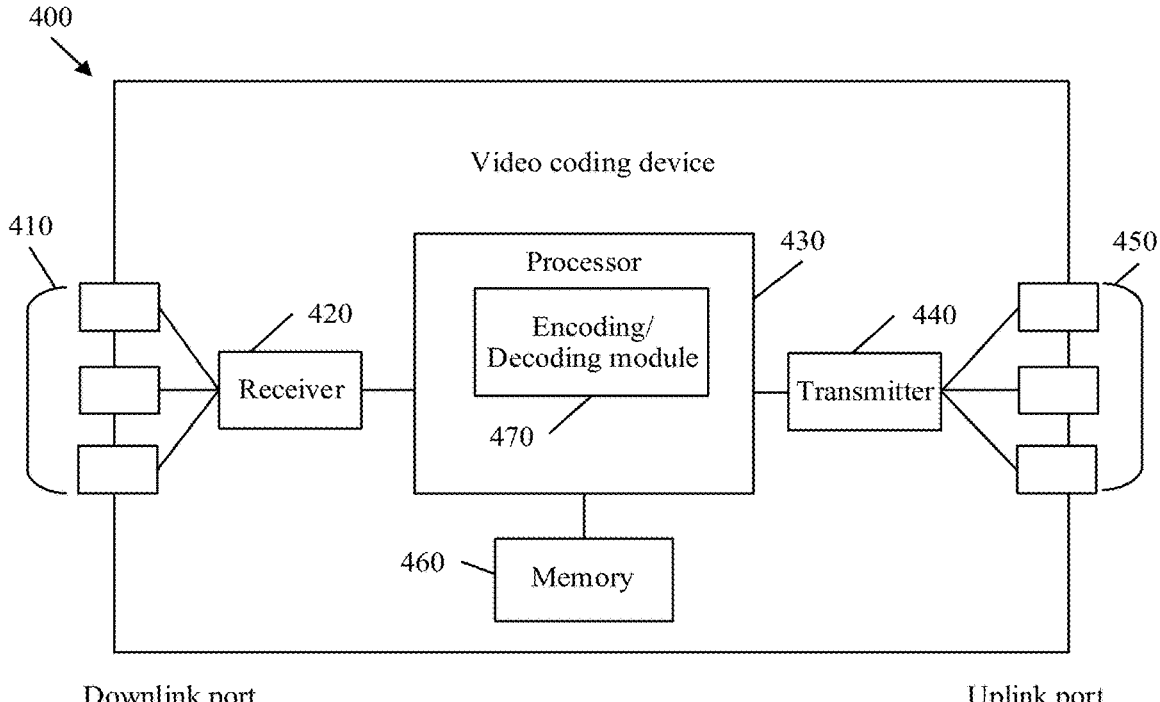
FIG. 4 is a block diagram of an example of a video coding device for implementing an embodiment of the present disclosure.
Figure 5A:
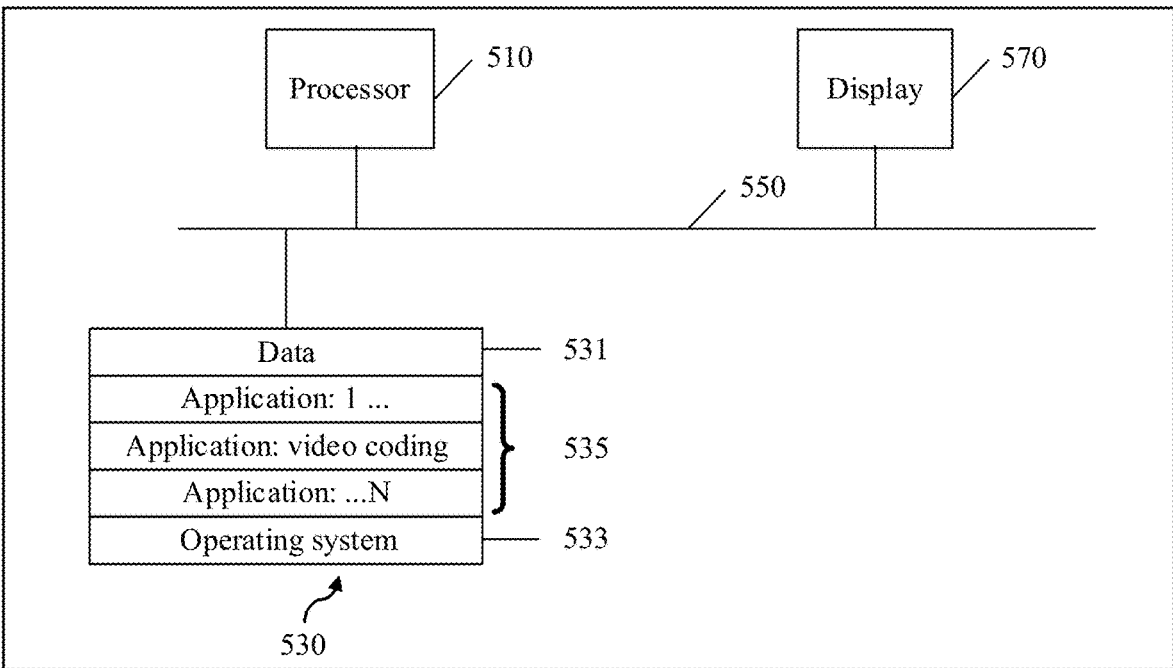
FIG. 5A is a block diagram of an example of another video coding device for implementing an embodiment of the present disclosure.

The encoder 20 is configured to receive the preprocessed picture data 19, and process the preprocessed picture data 19 in a related prediction mode, to provide the encoded picture data 21 (the following further describes structural details of the encoder 20 based on FIG. 2, FIG. 4, or FIG. 5A). In some embodiments, the encoder 20 may be configured to perform embodiments described below, to implement the video encoding method described in the present disclosure.

The communication interface 22 may be configured to receive the encoded picture data 21, and transmit the encoded picture data 21 to the destination device 14 or any other device (for example, a memory) through the link 13 for storage or direct reconstruction. The any other device may be any device configured for decoding or storage. The communication interface 22 may be, for example configured to encapsulate the encoded picture data 21 into an appropriate format, for example, a data packet, for transmission through the link 13.

The destination device 14 includes a decoder 30. Optionally, the destination device 14 may further include a communication interface 28, a picture post-processor 32, and a display device 34. The following describes the components separately.

The communication interface 28 may be configured to receive the encoded picture data 21 from the source device 12 or any other source. The any other source is, for example, a storage device. The storage device is, for example, an encoded picture data storage device. The communication interface 28 may be configured to transmit or receive the encoded picture data 21 through the link 13 between the source device 12 and the destination device 14 or through any type of network. The link 13 is, for example, a direct wired or wireless connection, and the any type of network is, for example, a wired or wireless network or any combination thereof, or any type of private or public network, or any combination thereof. The communication interface 28 may be, for example configured to decapsulate the data packet transmitted through the communication interface 22, to obtain the encoded picture data 21.

Both the communication interface 28 and the communication interface 22 may be configured as unidirectional communication interfaces or bidirectional communication interfaces, and may be configured to, for example, send and receive messages to establish a connection, and acknowledge and exchange any other information related to a communication link and/or data transmission such as encoded picture data transmission.

Figure 3:
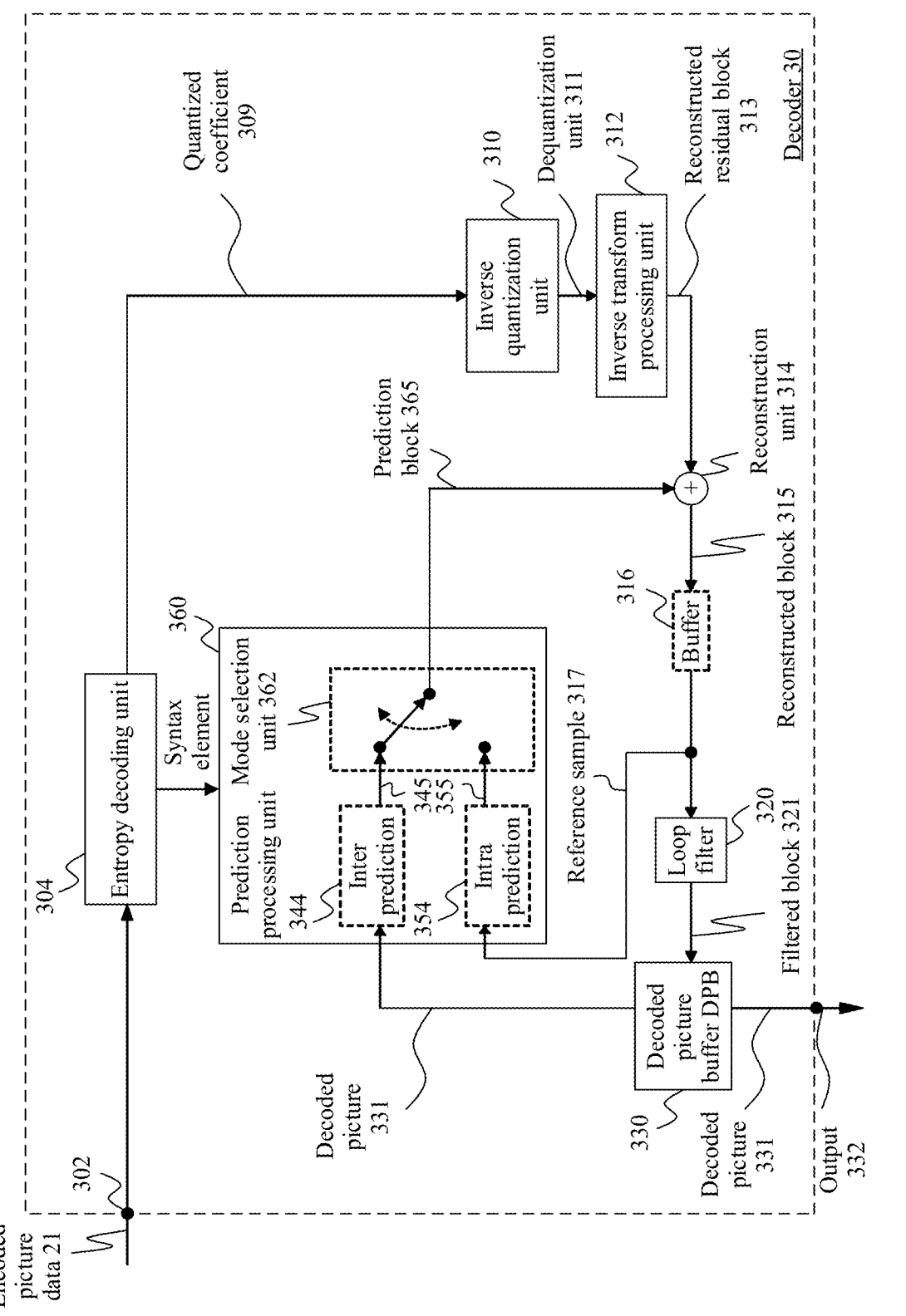
FIG. 3 is a block diagram of an example structure of a decoder for implementing an embodiment of the present disclosure.

The decoder 30 (or referred to as the decoder 30) is configured to receive the encoded picture data 21 and provide the decoded picture data 31 or the decoded picture 31 (the following further describes structural details of the decoder 30 based on FIG. 3, FIG. 4, or FIG. 5A). In some embodiments, the decoder 30 may be configured to perform embodiments described below, to implement the video decoding method described in the present disclosure.

The picture post-processor 32 is configured to post-process the decoded picture data 31 (also referred to as reconstructed picture data) to obtain post-processed picture data 33. The picture post-processor 32 may perform post-processing of color format transformation (for example, from a YUV format to an RGB format), color correction, trimming, re-sampling, or any other processing, and may be further configured to transmit the post-processed picture data 33 to the display device 34.

The display device 34 is configured to receive the post-processed picture data 33 to display a picture, for example, to a user or a viewer. The display device 34 may be or include any type of display configured to present a reconstructed picture, for example, an integrated or external display or monitor. For example, the display may include a liquid-crystal display (LCD), an organic light-emitting diode (LED) (OLED) display, a plasma display, a projector, a micro LED display, a liquid-crystal on silicon (LCoS), a digital light processor (DLP), or any type of other display.

Although FIG. 1A depicts the source device 12 and the destination device 14 as separate devices, in a device embodiment, both the source device 12 and the destination device 14 or functionalities of both the source device 12 and the destination device 14, that is, the source device 12 or a corresponding functionality and the destination device 14 or a corresponding functionality may alternatively be included. In such an embodiment, the source device 12 or the corresponding functionality and the destination device 14 or the corresponding functionality may be implemented by using same hardware and/or software or by using separate hardware and/or software or any combination thereof.

As will be apparent for a person skilled in the art based on the description, existence and (accurate) division of functionalities of the different units or functionalities of the source device 12 and/or the destination device 14 shown in FIG. 1A may vary with an actual device and application. The source device 12 and the destination device 14 each may include any one of a wide range of devices, including any type of handheld or stationary device, for example, a notebook or laptop computer, a mobile phone, a smartphone, a pad or a tablet computer, a video camera, a desktop computer, a set-top box, a television, a camera, a vehicle-mounted device, a display device, a digital media player, a video game console, a video streaming transmission device (such as a content service server or a content distribution server), a broadcast receiver device, and a broadcast transmitter device, and may not use or may use any type of operating system.

The encoder 20 and the decoder 30 each may be implemented as any one of various appropriate circuits, for example, one or more microprocessors, digital signal processors (DSP), application-specific integrated circuits (ASIC), field-programmable gate arrays (FPGA), discrete logic, hardware, or any combinations thereof. If the technologies are implemented partially by using software, a device may store software instructions in an appropriate and non-transitory computer-readable storage medium and may execute instructions by using hardware such as one or more processors, to perform the technologies of this disclosure. Any of the foregoing content (including hardware, software, a combination of hardware and software, and the like) may be considered as one or more processors.

In some cases, the video encoding and decoding system 10 shown in FIG. 1A is merely an example, and the technologies of the present disclosure may be applied to a video coding setting (for example, video encoding or video decoding) that does not need to include any data communication between encoding and decoding devices. In another example, data may be retrieved from a local memory, streamed over a network, or the like. A video encoding device may encode data and store data into the memory, and/or a video decoding device may retrieve and decode data from the memory. In some examples, encoding and decoding are performed by devices that do not communicate with each other but simply encode data into the memory and/or retrieve data from the memory and decode the data.

It should be understood that the encoder 20 may be deployed on a terminal device or a server on a cloud side, the decoder 30 may be deployed on a terminal device or a server on a cloud side, or the encoder 20 and the decoder 30 may be jointly deployed on a terminal device or a server on a cloud side.

In a scenario, the encoder 20 and the decoder 30 may be deployed on a terminal device. The encoder 20 may perform coding compression on a video on the terminal device, perform secondary compression (or incremental storage compression) in the video encoding method provided in embodiments of this disclosure, and store compressed data. When the video needs to be played back, the stored compressed data may be decoded.

In a scenario, the encoder 20 and the decoder 30 may be deployed on a plurality of terminal devices. The encoder 20 may perform coding compression on a video on the terminal device, perform secondary compression (or incremental storage compression) in the video encoding method provided in embodiments of this disclosure, and transmit compressed data to another terminal device. When the other device needs to play back the video, the other device may decode the stored compressed data.

In a scenario, the encoder 20 and the decoder 30 may be deployed on a terminal device and a server on a cloud side. The encoder 20 may perform coding compression on a video on the terminal device, perform secondary compression (or incremental storage compression) in the video encoding method provided in embodiments of this disclosure, and transmit compressed data to the server.

Figure 1B:
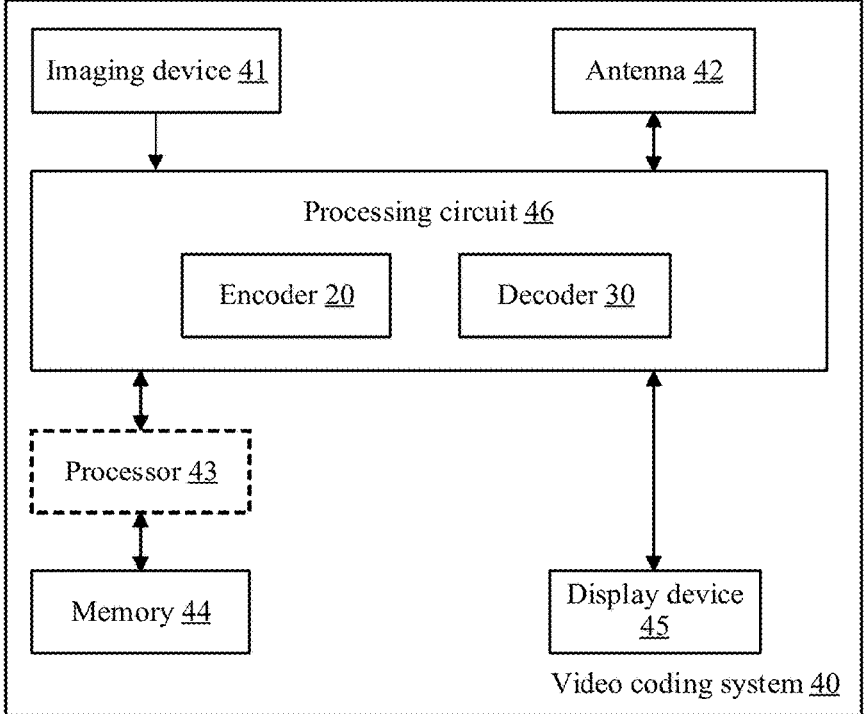
FIG. 1B is a block diagram of an example of another video coding system for implementing an embodiment of the present disclosure.

FIG. 1B is an illustrative diagram of an example of a video coding system 40 including the encoder 20 in FIG. 2 and/or the decoder 30 in FIG. 3 according to an example embodiment. The video coding system 40 can implement a combination of various techniques in embodiments of the present disclosure. In the illustrated implementation, the video coding system 40 may include an imaging device 41, the encoder 20, the decoder 30 (and/or a video encoder/decoder implemented by using a logic circuit 47 of a processing unit 46), an antenna 42, one or more processors 43, one or more memories 44, and/or a display device 45.

As shown in FIG. 1B, the imaging device 41, the antenna 42, the processing unit 46, the logic circuit 47, the encoder 20, the decoder 30, the processor 43, the memory 44, and/or the display device 45 can communicate with each other. As described, although the video coding system 40 is depicted by using the encoder 20 and the decoder 30, the video coding system 40 may include only the encoder 20 or only the decoder 30 in different examples.

In some examples, the antenna 42 may be configured to transmit or receive encoded data of video data. Further, in some examples, the display device 45 may be configured to present the video data. In some examples, the logic circuit 47 may be implemented by using the processing unit 46. The processing unit 46 may include ASIC logic, a graphics processor, a general-purpose processor, or the like. The video coding system 40 may alternatively include the optional processor 43. The optional processor 43 may similarly include ASIC logic, a graphics processor, a general-purpose processor, or the like. In some examples, the logic circuit 47 may be implemented by hardware, for example, video coding dedicated hardware, and the processor 43 may be implemented by general-purpose software, an operating system, or the like. In addition, the memory 44 may be any type of memory, for example, a volatile memory (for example, a static RAM (SRAM) or a dynamic RAM (DRAM)) or a non-volatile memory (for example, a flash memory). In a non-limitative example, the memory 44 may be implemented by using a cache memory. In some examples, the logic circuit 47 may access the memory 44

(for example, for implementation of an image buffer). In other examples, the logic circuit 47 and/or the processing unit 46 may include a memory (for example, a cache) for implementation of an image buffer or the like.

In some examples, the encoder 20 implemented by using the logic circuit may include an image buffer (for example, implemented by using the processing unit 46 or the memory 44) and a graphics processing unit (for example, implemented by using the processing unit 46). The graphics processing unit may be communicatively coupled to the image buffer. The graphics processing unit may include the encoder 20 implemented by using the logic circuit 47, to implement various modules that are described with reference to FIG. 2 and/or any other encoder system or subsystem described in this specification. The logic circuit may be configured to perform various operations described in this specification.

In some examples, the decoder 30 may be implemented by using the logic circuit 47 in a similar manner, to implement various modules that are described with reference to the decoder 30 in FIG. 3 and/or any other decoder system or subsystem described in this specification. In some examples, the decoder 30 implemented by using the logic circuit may include an image buffer (implemented by using the processing unit 2820 or the memory 44) and a graphics processing unit (for example, implemented by using the processing unit 46). The graphics processing unit may be communicatively coupled to the image buffer. The graphics processing unit may include the decoder 30 implemented by using the logic circuit 47, to implement various modules that are described with reference to FIG. 3 and/or any other decoder system or subsystem described in this specification.

In some examples, the antenna 42 may be configured to receive encoded data of video data. As described, the encoded data may include data, an indicator, an index value, mode selection data, or the like related to video frame encoding described in this specification, for example, data related to coding partitioning (for example, a transform coefficient or a quantized transform coefficient, an optional indicator (as described), and/or data defining coding partitioning). The video coding system 40 may further include the decoder 30 that is coupled to the antenna 42 and that is configured to decode the encoded data. The display device 45 is configured to present a video frame.

It should be understood that in this embodiment of the present disclosure, for the example described with reference to the encoder 20, the decoder 30 may be configured to perform a reverse process. With regard to a signaling syntax element, the decoder 30 may be configured to receive and parse such a syntax element and correspondingly decode related video data. In some examples, the encoder 20 may entropy encode the syntax element into encoded video encoded data. In such examples, the decoder 30 may parse such a syntax element and correspondingly decode related video data.

FIG. 2 is a schematic/conceptual block diagram of an example of an encoder 20 configured to implement an embodiment of the present disclosure. In the example of FIG. 2, the encoder 20 includes a residual calculation unit 204, a transform processing unit 206, a quantization unit 208, an inverse quantization unit 210, an inverse transform processing unit 212, a reconstruction unit 214, a buffer 216, a loop filter unit 220, a decoded picture buffer (DPB) 230, a prediction processing unit 260, and an entropy encoding unit 270. The prediction processing unit 260 may include an inter prediction unit 244, an intra prediction unit 254, and a mode selection unit 262. The inter prediction unit 244 may include a motion estimation unit and a motion compensation unit. The encoder 20 shown in FIG. 2 may also be referred to as a hybrid video encoder or a video encoder based on a hybrid video codec.

For example, the residual calculation unit 204, the transform processing unit 206, the quantization unit 208, the prediction processing unit 260, and the entropy encoding unit 270 form a forward signal path of the encoder 20, whereas, for example, the inverse quantization unit 210, the inverse transform processing unit 212, the reconstruction unit 214, the buffer 216, the loop filter 220, the DPB 230, and the prediction processing unit 260 form a backward signal path of the encoder, where the backward signal path of the encoder corresponds to a signal path of a decoder (refer to a decoder 30 in FIG. 3).

The encoder 20 receives, for example, via an input 202, a picture 201 or an image block 203 of the picture 201, for example, a picture in a sequence of pictures forming a video or a video sequence. The image block 203 may also be referred to as a current encoding block or a to-be-processed image block, and the picture 201 may be referred to as a current picture or a to-be-encoded picture (especially when the current picture is distinguished from another picture in video encoding, for example, the other picture is a previously encoded and/or decoded picture in a same video sequence, that is, a video sequence including the current picture).

An embodiment of the encoder 20 may include a partitioning unit (not depicted in FIG. 2) configured to partition the picture 201 into a plurality of blocks such as the image block 203. The picture 201 is usually partitioned into a plurality of non-overlapping blocks. The partitioning unit may be configured to use a same block size for all pictures in a video sequence and a corresponding grid defining the block size, or change a block size between pictures or subsets or picture groups and partition each picture into corresponding blocks.

In one example, the prediction processing unit 260 of the encoder 20 may be configured to perform any combination of the partitioning technologies described above.

Like the picture 201, the image block 203 is also or may be considered as a two-dimensional array or matrix of samples with sample values, although of a smaller size than the picture 201. In other words, the image block 203 may include, for example, one sample array (for example, a luminance array in a case of a monochrome picture 201), three sample arrays (for example, one luminance array and two chrominance arrays in a case of a color picture), or any other quantity and/or type of arrays depending on an applied color format. A quantity of samples in horizontal and vertical directions (or axes) of the image block 203 defines a size of the image block 203.

The encoder 20 shown in FIG. 2 is configured to encode the picture 201 block by block, for example, perform encoding and prediction on each image block 203.

The residual calculation unit 204 is configured to calculate a residual block 205 based on the picture image block 203 and a prediction block 265 (further details about the prediction block 265 are provided below), for example, obtain the residual block 205 in a sample domain by subtracting sample values of the prediction block 265 from sample values of the picture image block 203 sample by sample (pixel by pixel).

The transform processing unit 206 is configured to apply a transform, for example, a DCT or a discrete sine transform (DST), to sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as transform specified in HEVC/H.265. Compared with an orthogonal DCT transform, such integer approximations are usually scaled by a factor. To preserve a norm of a residual block which is processed by using forward transform and inverse transform, applying an additional scaling factor is a part of a transform process. The scaling factor is usually chosen based on some constraints, for example, the scaling factor being a power of two for a shift operation, a bit depth of the transform coefficient, or a tradeoff between accuracy and implementation costs. A specific scaling factor is, for example, specified for an inverse transform, for example, by the inverse transform processing unit 212 on the decoder side 30 (and the corresponding inverse transform, for example, by the inverse transform processing unit 212 on the encoder side 20), and a corresponding scaling factor for the forward transform, for example, by the transform processing unit 206 on the encoder side 20 may be specified accordingly.

The quantization unit 208 is configured to quantize the transform coefficients 207 to obtain quantized transform coefficients 209, for example, through scalar quantization or vector quantization. The quantized transform coefficients 209 may also be referred to as the quantized residual coefficients 209. A quantization process may reduce a bit depth related to a part or all of the transform coefficients 207. For example, an n-bit transform coefficient may be rounded down to an m-bit transform coefficient during quantization, where n is greater than m. A quantization degree may be modified by adjusting a quantization parameter (QP). For example, for scalar quantization, different scales may be applied to achieve finer or coarser quantization. A smaller quantization step size corresponds to finer quantization, and a larger quantization step size corresponds to coarser quantization. An appropriate quantization step size may be indicated by the QP. For example, the quantization parameter may be an index to a predefined set of appropriate quantization step sizes. For example, a smaller quantization parameter may correspond to finer quantization (a smaller quantization step size) and a larger quantization parameter may correspond to coarser quantization (a larger quantization step size), or vice versa. The quantization may include division by a quantization step size and corresponding quantization or inverse quantization, for example, performed through the inverse quantization 210, or may include multiplication by a quantization step size. Embodiments according to some standards such as HEVC may use a quantization parameter to determine the quantization step size. Generally, the quantization step size may be calculated based on a quantization parameter by using a fixed point approximation of an equation including division. Additional scaling factors may be introduced for quantization and dequantization, to restore the norm of the residual block, where the norm of the residual block may be modified because of a scale used in the fixed point approximation of the equation for the quantization step size and the quantization parameter. In one example implementation, a scale of the inverse transform may be combined with a scale of dequantization. Alternatively, a customized quantization table may be used and signaled from an encoder to a decoder, for example, in encoded data. The quantization is a lossy operation, where the loss increases with increasing of the quantization step size.

The inverse quantization unit 210 is configured to apply the inverse quantization of the quantization unit 208 to quantized coefficients to obtain dequantized coefficients 211, for example, apply, based on or by using a same quantization step size as the quantization unit 208, the inverse of a quantization scheme applied by the quantization unit 208. The dequantized coefficients 211 may also be referred to as dequantized residual coefficients 211, and correspond, although usually different from the transform coefficients due to a loss caused by quantization, to the transform coefficients 207.

The inverse transform processing unit 212 is configured to apply the inverse transform of the transform applied by the transform processing unit 206, for example, an inverse DCT or an inverse DST, to obtain an inverse transform block 213 in the sample domain. The inverse transform block 213 may also be referred to as an inverse transform dequantized block 213 or an inverse transform residual block 213.

The reconstruction unit 214 (for example, a summer 214) is configured to add the inverse transform block 213 (that is, a reconstructed residual block 213) to the prediction block 265 to obtain a reconstructed block 215 in the sample domain, for example, by adding sample values of the reconstructed residual block 213 and the sample values of the prediction block 265.

Optionally, a buffer unit 216 (or a "buffer" 216), for example, a line buffer 216, is configured to buffer or store the reconstructed block 215 and a corresponding sample value, for example, for intra prediction. In other embodiments, the encoder may be configured to use unfiltered reconstructed blocks and/or corresponding sample values stored in the buffer unit 216 for any type of estimation and/or prediction, for example, intra prediction.

For example, in an embodiment, the encoder 20 may be configured, so that the buffer unit 216 is used for storing the reconstructed block 215 for intra prediction 254 and also used for the loop filter unit 220, and/or so that, for example, the buffer unit 216 and the DPB unit 230 form one buffer. In other embodiments, filtered blocks 221 and/or blocks or samples from the DPB 230 (the blocks or samples are not shown in FIG. 2) are used as an input or a basis for intra prediction 254.

The loop filter unit 220 (or "loop filter" 220) is configured to filter the reconstructed block 215 to obtain the filtered block 221, to smooth pixel transition or improve video quality. The loop filter unit 220 is intended to represent one or more loop filters including a de-blocking filter, a sample-adaptive offset (SAO) filter, and another filter, for example, a bilateral filter, an adaptive loop filter (ALF), a sharpening or smoothing filter, or a collaborative filter. Although the loop filter unit is shown in FIG. 2 as an in-loop filter, the loop filter unit 220 may be implemented as a post-loop filter in other configurations. The filtered block 221 may also be referred to as a filtered reconstructed block 221. The DPB 230 may store a reconstructed encoded block after the loop filter unit 220 performs a filtering operation on the reconstructed encoded block.

In an embodiment, the encoder 20 (correspondingly, the loop filter unit 220) may be configured to output a loop filter parameter (such as sample adaptive offset information), for example, directly or after entropy encoding performed by the entropy encoding unit 270 or any other entropy encoding unit, so that, for example, the decoder 30 can receive the same loop filter parameter and apply the same loop filter parameter to decoding.

The DPB 230 may be a reference picture memory that stores reference picture data for use in video data encoding by the encoder 20. The DPB 230 may be formed by any one of a variety of memory devices, such as a DRAM (including a synchronous DRAM (SDRAM), a magnetoresistive RAM (MRAM), and a resistive RAM (RRAM)), or another type of memory devices. The DPB 230 and the buffer 216 may be provided by a same memory device or separate memory devices. In an example, the DPB 230 is configured to store the filtered block 221. The DPB 230 may be further configured to store other previously filtered blocks, for example, previously reconstructed and filtered blocks 221, of the same current picture or of different pictures, for example, previously reconstructed pictures, and may provide complete previously reconstructed, namely, decoded, pictures (and corresponding reference blocks and samples) and/or a partially reconstructed current picture (and corresponding reference blocks and samples), for example, for inter prediction. In an example, if the reconstructed block 215 is reconstructed without in-loop filtering, the DPB 230 is configured to store the reconstructed block 215.

The prediction processing unit 260, also referred to as a block prediction processing unit 260, is configured to receive or obtain the image block 203 (a current image block 203 of the current picture 201) and reconstructed picture data, for example, reference samples of the same (current) picture from the buffer 216 and/or reference picture data 231 of one or more previously decoded pictures from the DPB 230, and to process such data for prediction, namely, to provide the prediction block 265 that may be an inter prediction block 245 or an intra prediction block 255.

The mode selection unit 262 may be configured to select a prediction mode (for example, an intra or inter prediction mode) and/or a corresponding prediction block 245 or 255 to be used as the prediction block 265, for calculation of the residual block 205 and for reconstruction of the reconstructed block 215.

In an embodiment, the mode selection unit 262 may be configured to select the prediction mode (for example, from prediction modes supported by the prediction processing unit 260). The prediction mode provides an optimal match or a minimum residual (the minimum residual means better compression for transmission or storage), or provides minimum signaling overheads (the minimum signaling overheads mean better compression for transmission or storage), or considers or balances both. The mode selection unit 262 may be configured to determine the prediction mode based on rate-distortion optimization (RDO), that is, select a prediction mode that provides minimum rate-distortion optimization or select a prediction mode for which related rate distortion satisfies at least a prediction mode selection criterion.

In the following, prediction processing performed (for example, by using the prediction processing unit 260) and mode selection performed (for example, by using the mode selection unit 262) by an example of the encoder 20 are described in more detail.

As described above, the encoder 20 is configured to determine or select the optimal or optimum prediction mode from a set of (pre-determined) prediction modes. The set of prediction modes may include, for example, an intra prediction mode and/or an inter prediction mode.

In a possible implementation, a set of intra prediction modes may include a plurality of different intra prediction modes, for example, non-directional modes such as a direct current (DC) (or mean) mode and a planar mode, or directional modes as defined in H.265, or may include 67 different intra prediction modes, for example, non-directional modes such as a DC (or mean) mode and a planar mode, or directional modes as defined in developing H.266.

In a possible implementation, a set of inter prediction modes depends on available reference pictures (namely, for example, at least some decoded pictures stored in the DBP 230, as described above) and other inter prediction parameters, for example, depends on whether an entire reference picture or only a part of the reference picture, for example, a search window region around a region of the current block, is for searching for an optimal matching reference block, and/or for example, depends on whether pixel interpolation such as half-pel and/or quarter-pel interpolation is applied. The set of inter prediction modes may include, for example, an advanced motion vector prediction (AMVP) mode and a merge mode. In specific implementation, the set of inter prediction modes may include an affine motion model-based prediction mode described in this embodiment of the present disclosure, for example, an affine motion model-based AMVP mode (Affine AMVP mode) or an affine motion model-based merge mode (Affine Merge mode), a control point-based AMVP mode (inherited control point motion vector prediction method or constructed control point motion vector prediction method) and a control point-based merge mode (inherited control point motion vector prediction method or constructed control point motion vector prediction method), and an advanced temporal motion vector prediction (ATMVP) method, a planar method, and the like, or a subblock-based merge mode formed by combining the affine motion model-based merge mode, the ATMVP and/or the planar method, or the like. In this embodiment of the present disclosure, inter prediction for the to-be-processed image block may be applied to unidirectional prediction (forward or backward), bidirectional prediction (forward and backward), or multi-frame prediction. When inter prediction is applied to bidirectional prediction, bidirectional prediction block level generalized bi-prediction (GBi), referred to as a weighted prediction method, may be used. In an example, the intra prediction unit 254 may be configured to execute any combination of inter prediction technologies described below.

In addition to the foregoing prediction modes, a skip mode and/or a direct mode may be also applied in the embodiments of the present disclosure.

The prediction processing unit 260 may be further configured to partition the image block 203 into smaller block partitions or subblocks, for example, by iteratively using quadtree (QT) partitioning, binary-tree (BT) partitioning, triple-tree (TT) partitioning, or any combination thereof, and perform, for example, prediction on each of the block partitions or subblocks. Mode selection includes selection of a tree structure of the partitioned image block 203 and selection of a prediction mode used for each of the block partitions or subblocks.

The inter prediction unit 244 may include a motion estimation (ME) unit (not shown in FIG. 2) and a motion compensation (MC) unit. The motion estimation unit is configured to receive or obtain the picture image block 203 (the current picture image block 203 of the current picture 201) and the decoded picture 231, or at least one or more previously reconstructed blocks, such as one or more reconstructed blocks of other/different previously decoded pictures 231, to perform motion estimation based on the determined inter prediction mode. For example, a video sequence may include the current picture and the previously decoded pictures 31, or in other words, the current picture and the previously decoded pictures 31 may be a part of or form a sequence of pictures forming a video sequence.

For example, the encoder 20 may be configured to select a reference block from a plurality of reference blocks of a same picture or different pictures in a plurality of other pictures (reference images), and to provide a reference picture and/or an offset (spatial offset) between a position of the reference block (X and Y coordinates) and a position of a current block to the motion estimation unit (not shown in FIG. 2) as an inter prediction parameter. This offset is also referred to as a motion vector (MV).

The motion compensation unit is configured to obtain the inter prediction parameter, and perform inter prediction based on or by using the inter prediction parameter, to obtain the inter prediction block 245. Motion compensation performed by the motion compensation unit may include taking out or generating a prediction block (predictor) based on a motion/block vector determined by using motion estimation (by possibly performing interpolation of sub-pixel accuracy). Interpolation filtering may generate additional pixel samples from known pixel samples. This potentially increases a quantity of candidate prediction blocks that may be used for encoding a picture block. Upon receiving a motion vector for a PU of the current picture block, the motion compensation unit 246 may locate a prediction block to which the motion vector points in one reference picture list. The motion compensation unit 246 may further generate a syntax element associated with a block and a video slice, so that the decoder 30 uses the syntax element to decode the picture block in the video slice.

Further, the inter prediction unit 244 may transmit the syntax element to the entropy encoding unit 270, where the syntax element, for example, includes an inter prediction parameter (for example, indication information of an inter prediction mode that is used for prediction of the current block and that is selected after a plurality of inter prediction modes are traversed), and an index number of a candidate motion vector list, and optionally includes a GBi index number, a reference frame index, and the like. In a possible application scenario, if only one inter prediction mode exists, the inter prediction parameter may be alternatively not carried in the syntax element. In this case, the decoder side 30 may perform decoding directly in a default prediction mode. It can be understood that the inter prediction unit 244 may be configured to perform any combination of inter prediction technologies.

The intra prediction unit 254 is configured to obtain, for example, receive, the picture block 203 (the current picture block) and one or more previously reconstructed blocks, for example, reconstructed neighbor blocks, of the same picture for intra estimation. The encoder 20 may be, for example configured to select an intra prediction mode from a plurality of (predetermined) intra prediction modes.

In an embodiment, the encoder 20 may be configured to select the intra prediction mode based on an optimization criterion, for example, based on a minimum residual (for example, an intra prediction mode providing the prediction block 255 that is most similar to the current picture block 203) or minimum rate distortion.

The intra prediction unit 254 is further configured to determine the intra prediction block 255 based on, for example, an intra prediction parameter of the selected intra prediction mode. In any case, after selecting an intra prediction mode for a block, the intra prediction unit 254 is further configured to provide the intra prediction parameter, that is, information indicating the selected intra prediction mode for the block, to the entropy encoding unit 270. In an example, the intra prediction unit 254 may be configured to perform any combination of intra prediction technologies.

Further, the intra prediction unit 254 may transmit the syntax element to the entropy encoding unit 270. The syntax element includes the intra prediction parameter (such as indication information of selection of an intra prediction mode used for prediction of the current block after traversal of a plurality of intra prediction modes). In a possible application scenario, if only one intra prediction mode exists, the intra prediction parameter may be alternatively not carried in the syntax element. In this case, the decoder side 30 may perform decoding directly in a default prediction mode.

The entropy encoding unit 270 is configured to apply an entropy encoding algorithm or scheme (for example, a variable length coding (VLC) scheme, a context adaptive VLC (CAVLC) scheme, an arithmetic coding scheme, context adaptive binary arithmetic coding (CABAC), syntax-based CABAC (SBAC), probability interval partitioning entropy (PIPE) coding, or another entropy encoding method or technology) to a single one or all (or none) of the quantized residual coefficients 209, the inter prediction parameter, the intra prediction parameter, and/or the loop filter parameter to obtain encoded picture data 21 that can be output by an output 272, for example, in a form of an encoded data 21. The encoded data may be transmitted to the decoder 30 or archived for later transmission or retrieval by the decoder 30. The entropy encoding unit 270 may be further configured to entropy encode another syntax element for a current video slice being encoded.

Another structural variation of the encoder 20 may be used to encode a video stream. For example, a non-transform based encoder 20 may quantize a residual signal directly without the transform processing unit 206 for some blocks or frames. In another implementation, the encoder 20 may have the quantization unit 208 and the inverse quantization unit 210 combined into a single unit.

It should be understood that another structural change of the encoder 20 may be used to encode a video stream. For example, for some image blocks or image frames, the encoder 20 may directly quantize a residual signal without processing by the transform processing unit 206, and correspondingly without processing by the inverse transform processing unit 212. Alternatively, for some image blocks or image frames, the encoder 20 does not generate residual data, and correspondingly does not need processing by the transform processing unit 206, the quantization unit 208, the inverse quantization unit 210, and the inverse transform processing unit 212. Alternatively, the encoder 20 may store a reconstructed image block directly as a reference block without processing by the filter 220. Alternatively, the quantization unit 208 and the inverse quantization unit 210 in the encoder 20 may be combined together. The loop filter 220 is optional, and in a case of lossless compression encoding, the transform processing unit 206, the quantization unit 208, the inverse quantization unit 210, and the inverse transform processing unit 212 are optional. It should be understood that in different application scenarios, the inter prediction unit 244 and the intra prediction unit 254 may be used selectively.

FIG. 3 is a schematic/conceptual block diagram of an example of a decoder 30 configured to implement an embodiment of the present disclosure. The decoder 30 is configured to receive, for example, encoded picture data (for example, the encoded data) 21 encoded by the encoder 20 to obtain a decoded picture 231. During decoding, the decoder 30 receives video data from the encoder 20, for example, an encoded video encoded data representing a picture block of an encoded video slice and an associated syntax element.

In the example of FIG. 3, the decoder 30 includes an entropy decoding unit 304, an inverse quantization unit 310, an inverse transform processing unit 312, a reconstruction unit 314 (for example, a summer 314), a buffer 316, a loop filter 320, a DPB 330, and a prediction processing unit 360. The prediction processing unit 360 may include an inter prediction unit 344, an intra prediction unit 354, and a mode selection unit 362. In some examples, the decoder 30 may perform a decoding process substantially inverse to an encoding process performed by the encoder 20 described above with reference to FIG. 2.

The entropy decoding unit 304 is configured to perform entropy decoding on the encoded picture data 21 to obtain, for example, quantized coefficients 309 and/or decoded coding parameters, for example, any one or all of an inter prediction parameter, an intra prediction parameter, a loop filter parameter, and/or another syntax element (decoded). The entropy decoding unit 304 is further configured to forward the inter prediction parameter, the intra prediction parameter, and/or the other syntax element to the prediction processing unit 360. The decoder 30 may receive a syntax element at a video slice level and/or a video block level.

The inverse quantization unit 310 may have a same function as the inverse quantization unit 110, the inverse transform processing unit 312 may have a same function as the inverse transform processing unit 212, the reconstruction unit 314 may have a same function as the reconstruction unit 214, the buffer 316 may have a same function as the buffer 216, the loop filter 320 may have a same function as the loop filter 220, and the DPB 330 may have a same function as the DPB 230.

The prediction processing unit 360 may include an inter prediction unit 344 and an intra prediction unit 354. The inter prediction unit 344 may resemble the inter prediction unit 244 in function, and the intra prediction unit 354 may resemble the intra prediction unit 254 in function. The prediction processing unit 360 is usually configured to perform block prediction and/or obtain a prediction block 365 from the encoded data 21, and (explicitly or implicitly) receive or obtain a prediction-related parameter and/or information about a selected prediction mode, for example, from the entropy decoding unit 304.

When the video slice is encoded into an intra encoded (I) slice, the intra prediction unit 354 of the prediction processing unit 360 is configured to generate the prediction block 365 for a picture block of a current video slice based on a signaled intra prediction mode and data that is from a previously decoded block of a current frame or picture. When the video frame is encoded into an inter encoded (that is, B or P) slice, the inter prediction unit 344 (for example, a motion compensation unit) of the prediction processing unit 360 is configured to generate the prediction block 365 for a video block of a current video slice based on a motion vector and another syntax element that is received from the entropy decoding unit 304. For inter prediction, the prediction block may be generated from one of reference pictures in a reference picture list. The decoder 30 may construct reference frame lists: a list 0 and a list 1, based on a reference picture stored in the DPB 330 by using a default construction technology.

The prediction processing unit 360 is configured to determine prediction information for a video block of the current video slice by parsing the motion vector and the other syntax element, and use the prediction information to generate the prediction block for the current video block being decoded. In one example of the present disclosure, the prediction processing unit 360 uses some of the received syntax elements to determine a prediction mode (for example, intra or inter prediction) for encoding video blocks of the video slice, an inter prediction slice type (for example, a B slice, a P slice, or a generalized P/B (GPB) slice), construction information for one or more of the reference picture lists for the slice, a motion vector for each inter-encoded video block of the slice, an inter prediction status for each inter-encoded video block of the slice, and other information, to decode the video blocks in the current video slice. In another example of this disclosure, a syntax element received by the decoder 30 from encoded data includes a syntax element in one or more of an adaptive parameter set (APS), a sequence parameter set (SPS), a picture parameter set (PPS), or a slice header.

The inverse quantization unit 310 may be configured to inversely quantize (namely, dequantize) quantized transform coefficients provided in the encoded data and decoded by the entropy decoding unit 304. An inverse quantization process may include using a quantization parameter calculated by the encoder 20 for each video block in the video slice, to determine a degree of quantization to be applied and also determine a degree of inverse quantization to be applied.

The inverse transform processing unit 312 is configured to apply an inverse transform (for example, an inverse DCT, an inverse integer transform, or a conceptually similar inverse transform process) to transform coefficients to generate residual blocks in a pixel domain.

The reconstruction unit 314 (for example, the summer 314) is configured to add an inverse transform block 313 (that is, a reconstructed residual block 313) to the prediction block 365 to obtain a reconstructed block 315 in a sample domain, for example, by adding sample values of the reconstructed residual block 313 and sample values of the prediction block 365.

The loop filter unit 320 (in a coding loop or after the coding loop) is configured to filter the reconstructed block 315 to obtain a filtered block 321, to smooth pixel transition or improve video quality. In an example, the loop filter unit 320 may be configured to perform any combination of filtering technologies described below. The loop filter unit 320 is intended to represent one or more loop filters including a de-blocking filter, a SAO filter, and another filter, for example, a bilateral filter, an ALF, a sharpening or smoothing filter, or a collaborative filter. Although the loop filter unit 320 is shown in FIG. 3 as an in-loop filter, the loop filter unit 320 may be implemented as a post-loop filter in other configurations.

The decoded video blocks 321 in a given frame or picture are then stored in the DPB 330 that stores reference pictures used for subsequent motion compensation.

The decoder 30 is configured to, for example, output the decoded picture 31 by using an output 332, for presentation to a user or viewing by a user.

Another variation of the decoder 30 may be used to decode compressed encoded data. For example, the decoder 30 may generate an output video stream without the loop filter unit 320. For example, a non-transform based decoder 30 may inversely quantize a residual signal directly without the inverse transform processing unit 312 for some blocks or frames. In another implementation, the decoder 30 may have the inverse quantization unit 310 and the inverse transform processing unit 312 that are combined into a single unit.

In a specific embodiment, the decoder 30 may be configured to implement an inter prediction method described in the following embodiment in FIG. 11.

It should be understood that, in the encoder 20 and the decoder 30 in the present disclosure, a processing result of a specific phase may be further processed and then output to the next phase. For example, after interpolation filtering, motion vector derivation or loop filtering, a further operation, such as clip or shift, may be performed on the processing result of a corresponding phase.

FIG. 4 is a schematic diagram of a structure of a video coding device 400 (for example, a video encoding device 400 or a video decoding device 400) according to an embodiment of the present disclosure. The video coding device 400 is applicable to implementation of an embodiment described in this specification. In an embodiment, the video coding device 400 may be a video decoder (for example, the decoder 30 in FIG. 1A) or a video encoder (for example, the encoder 20 in FIG. 1A). In another embodiment, the video coding device 400 may be one or more components of the decoder 30 in FIG. 1A or the encoder 20 in FIG. 1A.

The video coding device 400 includes an ingress port 410 and a receiver unit (Rx) 420 for receiving data, a processor, a logic unit, or a central processing unit (CPU) 430 for processing the data, a transmitter unit (Tx) 440 and an egress port 450 for transmitting the data, and a memory 460 for storing the data. The video coding device 400 may further include an optical-to-electrical conversion component and an electrical-to-optical (EO) component that are coupled to the ingress port 410, the receiver unit 420, the transmitter unit 440, and the egress port 450, for egress or ingress of optical or electrical signals.

The processor 430 is implemented by hardware and software. The processor 430 may be implemented as one or more CPU chips, cores (for example, multi-core processors), FPGAS, ASICs, and DSPs. The processor 430 communicates with the ingress port 410, the receiver unit 420, the transmitter unit 440, the egress port 450, and the memory 460. The processor 430 includes a coding module 470 (for example, an encoding module 470 or a decoding module 470). The encoding/decoding module 470 implements the embodiment disclosed in this specification, to implement a chrominance block prediction method provided in the embodiment of the present disclosure. For example, the encoding/decoding module 470 implements, processes, or provides various coding operations. Therefore, the encoding/decoding module 470 substantially improves functions of the video coding device 400 and affects transform of the video coding device 400 to a different state. Alternatively, the encoding/decoding module 470 is implemented as instructions stored in the memory 460 and executed by the processor 430.

The memory 460 includes one or more disks, tape drives, and solid-state drives (SSDs) and may be used as an overflow data storage device, to store programs when such programs are selected for execution, and to store instructions and data that are read during program execution. The memory 460 may be volatile and/or non-volatile, and may be a ROM, a RAM), a ternary content-addressable memory (TCAM), and/or a SRAM.

FIG. 5A is simplified block diagram of an apparatus 500 that can be used as any one or two of the source device 12 and the destination device 14 in FIG. 1A according to an example embodiment. The apparatus 500 may implement the technologies of the present disclosure. In other words, FIG. 5A is a schematic block diagram of an implementation of an encoding device or a decoding device (or a coding device 500) according to an embodiment of the present disclosure. The coding device 500 may include a processor 510, a memory 530, and a bus system 550. The processor and the memory are connected through the bus system. The memory is configured to store instructions. The processor is configured to execute the instructions stored in the memory. The memory of the coding device stores program code, and the processor may invoke the program code stored in the memory to execute various video encoding or decoding methods described in the present disclosure. To avoid repetition, details are not described herein again.

In this embodiment of the present disclosure, the processor 510 may be a CPU, or the processor 510 may be another general-purpose processor, a DSP, an ASIC, an FPGA or another programmable logic device, a discrete gate or transistor logic device, a discrete hardware component, or the like. The general-purpose processor may be a microprocessor, or the processor may be another processor or the like.

The memory 530 may include a ROM device or a RAM device. Any other proper type of storage device may also be used as the memory 530. The memory 530 may include code and data 531 accessed by the processor 510 by using a bus 550. The memory 530 may further include an operating system 533 and an application program 535, and the application program 535 includes at least one program that allows the processor 510 to execute the video encoding or decoding method described in the present disclosure. For example, the application program 535 may include applications 1 to N, which further include a video encoding or decoding application (referred to as a video coding application) performing the video encoding or decoding method described in the present disclosure.

In addition to a data bus, the bus system 550 may further include a power bus, a control bus, a status signal bus, and the like. However, for clear description, various types of buses in the figure are marked as the bus system 550.

Optionally, the coding device 500 may further include one or more output devices, for example, a display 570. In an example, the display 570 may be a touch display that combines a display and a touch unit that operably senses a touch input. The display 570 may be connected to the processor 510 through the bus 550.

Although the processor 510 and the memory 530 of the apparatus 500 are depicted in FIG. 5A as integrated into a single unit, another configuration may be used. Running of the processor 510 may be distributed in a plurality of machines that can be directly coupled (each machine has one or more processors), or in a local area or another network. The memory 530 may be distributed in a plurality of machines, such as network-based memories or memories in a plurality of machines running the apparatus 500. Although only a single bus is depicted herein, the bus 550 of the apparatus 500 may be formed by a plurality of buses. Further, the memory 530 may be directly coupled to another component of the apparatus 500 or may be accessed through a network, and may include a single integrated unit such as a storage card, or a plurality of units such as a plurality of storage cards. Therefore, the apparatus 500 may be implemented in a plurality of configurations.

Figures 5B, 5C:
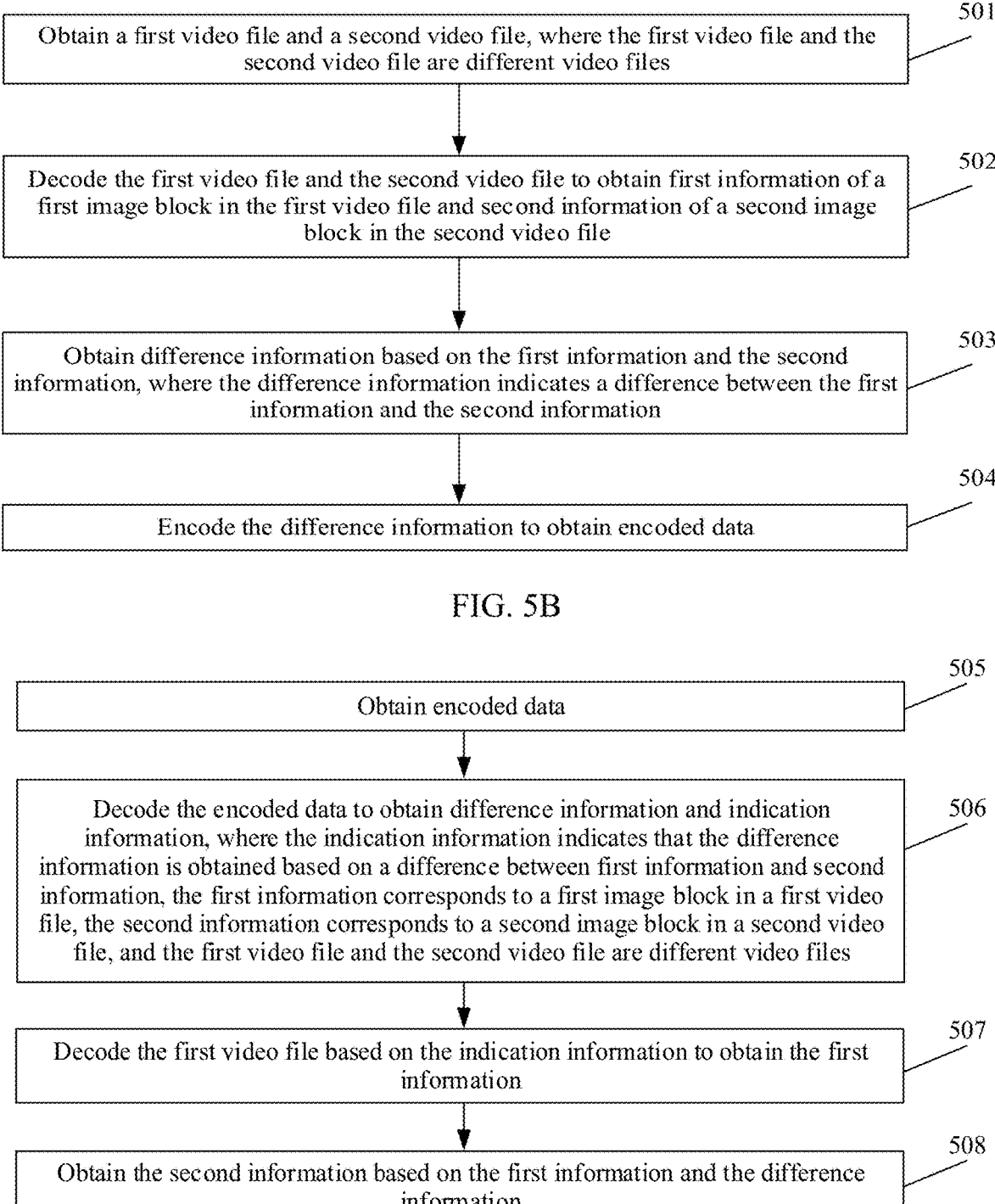
FIG. 5B is a schematic flowchart of a video encoding method according to an embodiment of this disclosure.
FIG. 5C is a schematic flowchart of a video decoding method according to an embodiment of this disclosure.

FIG. 5B is a schematic flowchart of a video encoding method according to an embodiment of this disclosure. As shown in FIG. 5B, the video encoding method provided in this embodiment of this disclosure may include the following steps.

501: Obtain a first video file and a second video file, where the first video file and the second video file are different video files.

502: Decode the first video file and the second video file to obtain first information of a first image block in the first video file and second information of a second image block in the second video file.

For description of step 501, refer to description of step 601 or description of step 1301. Details are not described herein again.

In a possible implementation, a similarity between image features of the first image block and the second image block is greater than a threshold. Difference information is used to replace an original second coding parameter. Because a similarity between the first image block and the second image block is greater than a threshold, a size of encoded data obtained by encoding the difference information is far less than a size of encoded data obtained by encoding the second information, and the second information can be obtained through restoration based on the difference information and the first information. This is equivalent to reducing storage resources for video storage and bandwidth for video transmission while ensuring that the complete second video can be restored.

In a possible implementation, a similarity between the first information and the second information is greater than a threshold. Difference information is used to replace an original second coding parameter. Because the similarity between the first information and the second information is greater than the threshold, a size of encoded data obtained by encoding the difference information is far less than a size of encoded data obtained by encoding the second information, and the second information can be obtained through restoration based on the difference information and the first information. This is equivalent to reducing storage resources for video storage and bandwidth for video transmission while ensuring that the complete second video can be restored.

It should be understood that the threshold herein may be a value indicating a high similarity between image blocks (a specific value is not limited in this disclosure).

503: Obtain the difference information based on the first information and the second information, where the difference information indicates a difference between the first information and the second information.

For description of step 503, refer to description of step 602 or description of step 1302. Details are not described herein again.

504: Encode the difference information to obtain encoded data.

For description of step 504, refer to description of step 603 or description of step 1303. Details are not described herein again.

In a possible implementation, the first information includes a first coding parameter of the first image block, the second information includes a second coding parameter of the second image block, and the first coding parameter and the second coding parameter include a motion vector and/or a residual.

In a possible implementation, a first video may include a first image frame, a second video may include a second image frame, the first image frame may include a plurality of image blocks (including the first image block), and the second image frame may include a plurality of image blocks (including the second image block). The first image block and the second image block may be block units such as an MB, a prediction block (partition), a CU, a PU, and a TU. This is not limited herein. For description of the image blocks, refer to description in the foregoing embodiments. Details are not described herein again.

A similarity between image features of the first image block and the second image block is high, and the image feature of the image block may be one or more of a color feature, a texture feature, a shape feature, and the like of the image block. The color feature and the texture feature are used to describe a surface property of an object corresponding to the image block. The shape feature includes a contour feature and a region feature. The contour feature includes an outer boundary feature of the object, and the region feature includes a shape region feature of the object.

In this embodiment of this disclosure, the first coding parameter of the first image block and the second coding parameter of the second image block may be obtained. The first coding parameter and the second coding parameter may be motion vectors, the first coding parameter and the second coding parameter may be residuals, or the first coding parameter and the second coding parameter may be motion vectors and residuals.

The residual may be obtained through calculation based on the image block and the prediction block. For example, a sample value of the prediction block may be subtracted from a sample value of the picture image block sample by sample (pixel by pixel), to obtain the residual in a sample domain.

Optionally, the coding parameter may further include syntax information. For example, the syntax information may be but is not limited to any one or all of an inter prediction parameter, an intra prediction parameter, a loop filter parameter, and/or another syntax element (decoded).

In a possible implementation, a subtraction operation may be performed on the first coding parameter and the second coding parameter to obtain the difference information. In addition, the difference information may be obtained through calculation based on another operation used to quantize a difference between the first coding parameter and the second coding parameter. This is not limited herein.

It should be understood that the first image block and the second image block may be image blocks with similar image features in the first image frame and the second image frame, and the foregoing processing on the first image block and the second image block may be performed on some or all image blocks in the first image frame and the second image frame. In this way, difference information of a plurality of groups of image blocks can be obtained.

In an implementation, the difference information may be used as a coding parameter of the second image block (to replace the original second coding parameter), and data of the second video including the coding parameter of the second image block is encoded, to obtain a bitstream of the second video.

It should be understood that the first image block and the second image block may be image blocks with similar image features in the first image frame and the second image frame, and the foregoing processing on the first image block and the second image block may be performed on some or all image blocks in the first image frame and the second image frame.

It should be understood that the first image frame and the second image frame may be image frames with similar image features in the first video and the second video, and the foregoing processing on the first image block and the second image block may be performed on image blocks in some or all the image frames in the first video and the second video.

In a possible implementation, the first image block is included in a first image frame, the second image block is included in a second image frame, and the first image frame and the second image frame are different image frames.

In a possible implementation, the first coding parameter may include a first motion vector, the second coding parameter includes a second motion vector, the difference information includes first difference information, and the first difference information is a difference between the first motion vector and the second motion vector.

For example, in a possible implementation, the first coding parameter may include a first residual, the second coding parameter includes a second residual, the difference information includes second difference information, and the second difference information is a difference between the first residual and the second residual.

In a possible implementation, the first coding parameter may include a first motion vector and a first residual, the second coding parameter includes a second motion vector and a second residual, the difference information includes first difference information and second difference information, the first difference information is a difference between the first motion vector and the second motion vector, and the second difference information is a difference between the first residual and the second residual.

In a possible implementation, the first coding parameter includes a first residual, the second coding parameter includes a second residual, the difference information includes second difference information, and the second difference information indicates a difference between the first residual and the second residual, and encoding the difference information includes: encoding the second difference information through lossless compression coding or lossy compression coding.

Because the first difference information represents a difference between motion vectors, and the motion vector is used during inter prediction, if lossy compression is employed to compress the first difference information, inter prediction effect is poor (for example, an artifact occurs) during decoding. In this embodiment of this disclosure, lossless compression is employed to compress the first difference information, to improve inter prediction precision and effect.

In a possible implementation, the first coding parameter includes a first motion vector, the second coding parameter includes a second motion vector, the difference information includes first difference information, and the first difference information indicates a difference between the first motion vector and the second motion vector, and encoding the difference information includes encoding the first difference information through lossless compression coding.

In a possible implementation, the first difference information (the first difference information indicates a difference between the first motion vector and the second motion vector) may be encoded through lossless compression coding.

In a possible implementation, the second difference information (the second difference information indicates a difference between the first residual and the second residual) may be encoded through lossless compression coding or lossy compression coding.

Lossless compression may be lossless compression including transform (reserving all coefficients), scanning, and entropy coding, and lossy compression may be lossy compression including transform (reserving a low frequency coefficient), quantization, scanning, and entropy coding.

In a possible implementation, after a bitstream is obtained, the encoded data and the first coding parameter may be sent to a decoding side, so that the decoding side obtains the second coding parameter based on the encoded data and the first coding parameter, or the encoded data may be locally stored for later transmission or retrieval.

It should be understood that, to enable the decoding side to obtain the second coding parameter based on the encoded data, the bitstream of the first video further needs to be sent to the decoding side, so that the decoding side can decode the bitstream of the first video to obtain the first coding parameter, and obtain the second coding parameter based on the first coding parameter and the difference information.

It should be understood that the encoded data may be encapsulated. Correspondingly, encapsulated encoded data may be sent to the decoding side, so that the decoding side obtains the second coding parameter based on the encapsulated encoded data, or encapsulated encoded data may be locally stored for later transmission or retrieval.

It should be understood that the first indication information may be further encoded. The first indication information may indicate that the difference information is obtained based on a difference between the first image block and the second image block. Further, the decoding side may obtain the first coding parameter of the first image block and the difference information based on the first indication information, and obtain the second coding parameter based on the first coding parameter and the difference information. The first indication information may include an identifier indicating the first image block and an identifier indicating the second image block.

In a possible implementation, the first information includes a first image block, the second information includes a second image block, and a similarity between image features of the first image block and the second image block is greater than a threshold, and obtaining the difference information based on the first information and the second information includes determining the difference information by using the first image block as a reference block of the second image block, where the difference information includes a third coding parameter of the second image block.

In a possible implementation, a decoder may decode encoded data of the first video and encoded data of the second video, to obtain a video signal of the first video and a video signal of the second video. The video signal of the first video may include the first image block, and the video signal of the second video may include the second image block.

It should be understood that before decoding the encoded data of the first video and the encoded data of the second video, the decoder may decapsulate a video file of the first video and a video file of the second video.

It should be understood that the first video and the second video may be different videos, or may be different parts of a same video (for example, if a large quantity of repeated video clips exist in some videos, the first video and the second video may be two repeated video clips in the videos). This is not limited herein.

In a possible implementation, the first video may include a first image frame, the second video may include a second image frame, the first image frame may include a plurality of image blocks (including the first image block), and the second image frame may include a plurality of image blocks (including the second image block). The first image block and the second image block may be block units such as an MB, a prediction block (partition), a CU, a PU, and a TU. This is not limited herein. For description of the image blocks, refer to description in the foregoing embodiments. Details are not described herein again.

A similarity between image features of the first image block and the second image block is high, and the image feature of the image block may be one or more of a color feature, a texture feature, a shape feature, and the like of the image block. The color feature and the texture feature are used to describe a surface property of an object corresponding to the image block. The shape feature includes a contour feature and a region feature. The contour feature includes an outer boundary feature of the object, and the region feature includes a shape region feature of the object.

In a possible implementation, the first image block may be an image block in an I frame, and the second image block is an image block in a P frame or a B frame, or the first image block may be an image block in a P frame, and the second image block is an image block in a P frame or a B frame.

After the video signal of the second video is obtained, the video signal of the second video may be encoded based on the video signal of the first video. Further, the third coding parameter of the second image block may be determined by using the first image block as a reference block of the second image block.

In a possible implementation, the first image frame in the first video and the second image frame in the second video may be obtained, where a similarity between image features of the first image frame and the second image frame is greater than a threshold, and the first video and the second video are different videos, and the third coding parameter of the second image frame is determined by using the first image frame as a reference frame of the second image frame.

The third coding parameter may be a residual, a motion vector, and other syntax information. This is not limited herein.

Optionally, in a process of encoding the second image block (or a current frame in this embodiment of this disclosure), the first image block may be used as a reference block, and the first image frame having the reference block is used as a reference frame to predict the second image block in the current frame (that is, the second image frame including the second image block). Optionally, the first image frame may be temporally after the current frame, or the current frame is temporally located between a previous reference frame that appears before the current frame in a video sequence and a subsequent reference frame that appears after the current frame in the video sequence (the first image frame may be one of the previous reference frame or the subsequent reference frame).

In some implementations, a high similarity exists between image content of only some image regions of the first image frame and the second image frame, and therefore, an image block, in the first image frame, with a high similarity between image content of the image block and an image block in the second image frame, may be used as a reference block when the image block in the second image frame is encoded.

Because the second image block is encoded by using the first image block as the reference block, related information that is in a GOP in which the second image block is located and that is originally used as the reference block of the second image block may not be encoded into the encoded data. This reduces a size of the encoded data, storage space for second video storage, and a size of bandwidth for second video transmission.

It should be understood that, to enable the decoder to obtain a complete and accurate video signal of the second video through decoding, second indication information further needs to be encoded into the encoded data. The second indication information indicates that the reference block of the second image block is the first image block. Further, when performing decoding, the decoder may learn that the reference block of the second image block is the first image block. The second indication information may include an identifier of the first image block and an identifier of the second image block.

It should be understood that if the first image frame is used as the reference frame of the second image frame, the second indication information may indicate that the reference frame of the second image frame is the first image frame. Further, the first image frame may be obtained based on the second indication information, and the second image frame is reconstructed based on the coding parameter of the second image frame and the first image frame.

In a possible implementation, the method may further include decoding the second video file to obtain a fourth image block, obtaining a third video file, where the third video file and the second video file are different video files, decoding the third video file to obtain a third image block in the third video file, where a similarity between image features of the third image block and the fourth image block is greater than a threshold, and the second image block and the fourth image block belong to a same image frame in the second video file, and determining the difference information by using the third image block as a reference block of the fourth image block, where the difference information includes a fourth coding parameter of the fourth image block.

In some implementations, a high similarity exists between image content of only some image regions of the first image frame and the second image frame, and a region with a high similarity between image content of the region and some regions of the second image frame exists in another image frame in the third video (that is, a video other than the first video and the second video). In this case, an image block, in the other image frame, with a high similarity between image content of the image block and an image block of the second image frame, may be used as a reference block when the image block in the second image frame is encoded.

Further, the second image frame may further include an image block (for example, the fourth image block) other than the second image block. In a process of encoding the fourth image block, one image block in the third video may be used as a reference block (the third image block) of the fourth image block.

In a possible implementation, the second coding parameter and second indication information may be encoded, and the second indication information indicates that the reference block of the fourth image block is the third image block.

In a possible implementation, the method may further include decoding the first video file to obtain a fifth image block, decoding the second video file to obtain a sixth image block, where the second image block and the sixth image block belong to a same image frame in the second video file, a similarity between image features of the fifth image block and the sixth image block is greater than a threshold, and the first image block and the fifth image block belong to a same image frame or different image frames in the first video file, and determining the difference information by using the fifth image block as a reference block of the sixth image block, where the difference information includes a fifth coding parameter of the fifth image block.

In some implementations, a high similarity exists between image content of only some image regions of the first image frame and the second image frame, and a region with a high similarity between image content of the region and some regions of the second image frame exists in another image frame in the first video. In this case, an image block, in the other image frame, with a high similarity between image content of the image block and an image block in the second image frame, may be used as a reference block when the image block in the second image frame is encoded.

Further, the second image frame may further include an image block (for example, the sixth image block) other than the second image block. In a process of encoding the sixth image block, one image block in the first video may be used as a reference block (the fifth image block) of the sixth image block. The reference block may be an image block in the first image frame (the image frame in which the first image block is located), or the reference block may be an image block in an image frame other than the first image frame in the first video (the image frame in which the first image block is located). This is not limited herein.

In a possible implementation, the image feature includes at least one of the following: a color feature, a texture feature, a shape feature, and a spatial relationship feature.

FIG. 5C is a schematic flowchart of a video decoding method according to an embodiment of this disclosure. As shown in FIG. 5C, the video decoding method provided in this embodiment of this disclosure may include the following steps.

505: Obtain encoded data.

For description of step 505, refer to description of step 1201 or description of step 1501. Details are not described herein again.

506: Decode the encoded data to obtain difference information and indication information, where the indication information indicates that the difference information is obtained based on a difference between first information of a first video file and second information of a second video file, and the first video file and the second video file are different video files.

For description of step 506, refer to description of step 1202 or description of step 1502. Details are not described herein again.

507: Decode the first video file based on the indication information to obtain the first information.

For description of step 507, refer to description of step 1201 or description of step 1503. Details are not described herein again.

508: Obtain the second information based on the first information and the difference information.

For description of step 508, refer to description of step 1203 or description of step 1505. Details are not described herein again.

It should be understood that the indication information may be further encoded. The indication information may indicate that the difference information is obtained based on a difference between the first image block and the second image block. Further, a decoding side may obtain a first coding parameter of the first image block and the difference information based on the indication information, and obtain a second coding parameter based on the first coding parameter and the difference information. The indication information may include an identifier indicating the first image block and an identifier indicating the second image block.

In a possible implementation, the first information includes a first coding parameter of the first image block, the second information includes a second coding parameter of the second image block, and the first coding parameter and the second coding parameter include a motion vector and/or a residual.

Because a second image frame is encoded by using a first image frame as a reference frame, related information that is in a GOP in which the second image frame is located and that is originally used as the reference frame of the second image frame may not be encoded into the encoded data. This reduces a size of the encoded data, storage space for second video storage, and a size of bandwidth for second video transmission.

In a possible implementation, the first image block is included in a first image frame, the second image block is included in a second image frame, and the first image frame and the second image frame are different image frames.

In a possible implementation, the indication information includes an identifier of the first image block and an identifier of the second image block.

In a possible implementation, the first information includes the first image block, and the second information includes the second image block.

In a possible implementation, the indication information indicates that a reference block of the second image block is the first image block.

In a possible implementation, the first image block is an image block in an I frame, and the second image block is an image block in a P frame or a B frame, or the first image block is an image block in a P frame, and the second image block is an image block in a P frame or a B frame.

In a possible implementation, a similarity between image features of the first image block and the second image block is greater than a threshold, and the image feature includes at least one of the following: a color feature, a texture feature, a shape feature, and a spatial relationship feature.

FIG. 6 is a schematic flowchart of a video encoding method according to an embodiment of this disclosure. As shown in FIG. 6, the video encoding method provided in this embodiment of this disclosure may include the following steps.

601: Obtain a first coding parameter of a first image block and a second coding parameter of a second image block, where the first image block is an image block in a first video file, the second image block is an image block in a second video file, the first video file and the second video file are different video files, and the first coding parameter and the second coding parameter include a motion vector and/or a residual.

The motion vector and/or the residual may be understood as that the first coding parameter and the second coding parameter include the motion vector, the first coding parameter and the second coding parameter include the residual, or the first coding parameter and the second coding parameter include the motion vector and the residual.

In a possible implementation, the first coding parameter of the first image block may be obtained by decoding encoded data (or a bitstream) of a first video, and the second coding parameter of the second image block may be obtained by decoding encoded data (or a bitstream) of a second video.

In a possible implementation, a coding parameter of a first image frame (including the first image block) may be obtained by decoding encoded data (or a bitstream) of a first video, and a coding parameter of a second image frame (including the second image block) may be obtained by decoding encoded data (or a bitstream) of a second video.

The following describes how to obtain the first coding parameter of the first image block and the second coding parameter of the second image block from a process of generating encoded data of the first video and encoded data of the second video and decoding the first video and the second video.

The first video is used as an example, in a process of generating encoded data of the first video, a video signal of the first video may be input into an encoder. For example, the video signal of the first video may be an uncompressed video file stored in a memory. In another example, the first video may be captured by a video capture device (such as a video camera) and encoded to support replay of the video. The video file may include both an audio component and a video component. The video component includes a series of image frames that, when viewed in a sequence, gives the visual impression of motion. These frames include pixels that are expressed in terms of light (or a luminance component) and color (or a chrominance component). In some examples, the frames may further include depth values to support three-dimensional viewing. Then, the video may be partitioned into blocks. Partitioning includes subdividing the pixels in each frame into square and/or rectangular blocks for compression. For example, coding trees may be employed to divide and then recursively subdivide blocks until configurations are achieved that support further encoding. For example, luminance components of a frame may be subdivided until the individual blocks include relatively homogenous lighting values. Further, chrominance components of a frame may be subdivided until the individual blocks include relatively homogenous color values. Therefore, partitioning mechanisms vary depending on the content of the video frames.

Various compression mechanisms are employed to compress the partitioned image blocks. For example, inter prediction and/or intra prediction may be employed. Inter prediction is designed to take advantage of the fact that objects in a common scene tend to appear in successive frames. Therefore, a block depicting an object in a reference frame need not be repeatedly described in adjacent frames. Further, an object (such as a table) may remain in a constant position over multiple frames. Therefore, the table is described once and adjacent frames can refer back to the reference frame. Pattern matching mechanisms may be employed to match objects over multiple frames. Further, moving objects may be represented across multiple frames, for example due to object movement or camera movement. In a particular example, a video may show an automobile that moves across the screen over multiple frames. A motion vector can be employed to describe such movement. The motion vector is a two-dimensional vector that provides an offset from the coordinates of an object in a frame to the coordinates of the object in a reference frame. Therefore, inter prediction can encode an image block in a current frame as a set of motion vectors indicating an offset from a corresponding block in a reference frame. Any differences between the current image block and the reference block are stored in residual blocks. Transform may be applied to the residual blocks to further compress the file.

Intra prediction encodes blocks in a common frame. Intra prediction takes advantage of the fact that luminance and chrominance components tend to cluster in a frame. For example, a patch of green in a portion of a tree tends to be positioned adjacent to similar patches of green. Intra prediction employs a plurality of directional prediction modes (for example, 33 modes in HEVC), a planar mode, and a direct current (DC) mode. The directional modes indicate that a current block is similar/the same as samples of a neighbor block in a corresponding direction. The planar mode indicates that a series of blocks along a row/column (for example, a plane) can be interpolated based on neighbor blocks at edges of the row. The planar mode, in effect, indicates a smooth transition of light/color across a row/column by employing a relatively constant slope in changing values. The DC mode is employed for boundary smoothing and indicates that a block is similar/the same as an average value associated with samples of all the neighbor blocks associated with angular directions of the directional prediction modes. Therefore, intra prediction blocks can represent image blocks as various relational prediction mode values instead of actual values. Further, inter prediction blocks can represent image blocks as motion vector values instead of actual values. In either case, the prediction blocks may not exactly represent the image blocks in some cases. Any differences are stored in residual blocks. Transform may be applied to the residual blocks to further compress the file.

Various filtering technologies can be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks. Once the video signal is partitioned, compressed, and filtered, the resulting data is encoded in encoded data. The encoded data includes the data discussed above as well as any signaling data desired to support proper video signal reconstruction at the decoder. For example, such data may include partition data, prediction data, residual blocks, and various flags providing coding instructions to the decoder. The encoded data may be stored in the memory for transmission toward the decoder upon request. The encoded data may also be broadcast and/or multicast to a plurality of decoders. Creation of the encoded data is an interactive procedure.

Based on the foregoing manner, the encoded data of the first video and the encoded data of the second video may be obtained, and then the encoded data of the first video and the encoded data of the second video may be decoded by the decoder.

It should be understood that before decoding the encoded data of the first video and the encoded data of the second video, the decoder may decapsulate a video file of the first video and a video file of the second video. Each video may have its own format (for example, Motion Picture Experts Group 4 (.MP4), RealMedia Variable Bitrate (.RMVB), Audio Video Interleave (.AVI), or Flash Video (.FLV)). These formats representing encapsulation formats are referred to as video formats for short, also referred as containers. The video encapsulation format is a specification for packaging video data and audio data into a file. A function of decapsulation is to separate input data in an encapsulation format into compressed audio stream encoding data and compressed video stream encoding data. For example, after a decapsulation operation is performed on data in an FLV format, the encoded data of the video and the encoded data of the audio are output.

The decoder may receive the encoded data and start a decoding process. Further, the decoder employs an entropy decoding scheme to convert the encoded data into corresponding syntax and video data. The decoder may employ the syntax data from the encoded data to determine partitioning of the frame. Partitioning should match a block partitioning result in the foregoing encoding process.

In an implementation, the decoder (for example, an entropy decoding unit 304, an inverse quantization unit 310, and an inverse transform processing unit 312) decodes the encoded data of the first video to obtain a coding parameter related to the first video (for example, may include the first coding parameter of the first image block), and the decoder decodes the encoded data of the second video to obtain a coding parameter related to the second video (for example, may include the second coding parameter of the second image block).

In an implementation, the decoder decodes the encoded data of the first video to obtain syntax data (for example, the syntax data may include a motion vector of the first image block), and decodes the encoded data of the second video to obtain syntax data (for example, the syntax data may include a motion vector of the first image block).

In an implementation, the decoder may perform block decoding. Further, the decoder employs reverse transform to generate a residual block (for example, the residual block may include a residual of the first image block and a residual of the second image block).

For how to obtain the first coding parameter of the first image block and the second coding parameter of the second image block, refer to the description related to the decoder in the foregoing embodiment. Details are not described herein again.

In some scenarios, a plurality of videos with similar or even repeated content exist. When the videos are stored or transmitted to another device (for example, another terminal device or a server on a cloud side), a large quantity of storage resources are wasted, and a large amount of bandwidth is wasted during transmission.

In a possible implementation, for the encapsulated first video file and the encapsulated second video file, it may be determined, based on comparison between image features of all (or some) image frames in the first video file and the second video file (or comparison between coding parameters of image blocks obtained through decoding), whether the first video and the second video are videos with similar or even repeated content. The coding parameter may be a residual, a motion vector, a DCT coefficient, or the like, to select the first image block and the second image block (or select a first image frame and a second image frame, where the first image frame includes the first image block, and the second image frame includes the second image block).

In a possible implementation, for the encapsulated first video file and the encapsulated second video file, it may be determined, based on comparison between subtitle information and/or audio information in the first video file and the second video file, whether the first video and the second video are videos with similar or even repeated content (then, comparison between image features and/or coding parameters may be performed), and then the first image block and the second image block are selected (or the first image frame and the second image frame are selected, where the first image frame includes the first image block, and the second image frame includes the second image block).

In a possible implementation, for the encapsulated first video file and the encapsulated second video file, preliminary screening of the image frames may be performed based on comparison between the subtitle information and/or the audio information in the first video file and the second video file. An image frame with similar subtitle information and/or audio information may be first selected as a candidate, and then comparison between the image features and/or the coding parameters are performed, to select the first image block and the second image block (or select the first image frame and the second image frame, where the first image frame includes the first image block, and the second image frame includes the second image block). In the foregoing manner, a speed of determining a similar video, a similar image frame, and a similar image block can be accelerated, and further, computing overheads can be reduced.

In a possible implementation, for the encapsulated first video file and the encapsulated second video file, it may be determined, based on sources of the first video file and the second video file (for example, whether the first video file and the second video file are same-source videos is determined, whether the first video file and the second video file are obtained by editing based on a same video file, and in comparison with the second video file, the first video file is only added with a subtitle, special effect, or enables beauty processing), whether the first video file and the second video file are videos with similar or even repeated content, and then the first image block and the second image block are selected based on comparison between the image features and/or the coding parameters (or the first image frame and the second image frame are selected, where the first image frame includes the first image block, and the second image frame includes the second image block).

In a possible implementation, for the encapsulated first video and the encapsulated second video, it may be determined, based on comparison between image features of all (or some) image frames in the first video and the second video, whether the first video and the second video are videos with similar or even repeated content.

In a possible implementation, for the encapsulated first video and the encapsulated second video, it may be determined, based on sources of the first video and the second video (for example, whether the first video and the second video are same-source videos is determined), whether the first video and the second video are videos with similar or even repeated content.

In a possible implementation, for the encapsulated first video and the encapsulated second video, it may be determined, based on comparison between image features of all (or some) image frames in the first video and the second video, whether image frames with similar or even repeated content exist in the first video and the second video.

In a possible implementation, for the encapsulated first video and the encapsulated second video, it may be determined, based on comparison between image features of image blocks in all (or some) image frames in the first video and the second video, whether image blocks with similar or even repeated content exist in the first video and the second video.

In a possible implementation, the first video and the second video may be videos with similar or repeated content. Content similarity may be understood as that image frames with similar pixel values and distribution exist (or pixel values exceeding a specific quantity or proportion exists) in the videos.

It should be understood that the first video and the second video may be different video files, or may be different parts of a same video file (for example, if a large quantity of repeated video clips exist in some videos, the first video and the second video may be two repeated video clips in the videos). This is not limited herein.

It should be understood that the first video and the second video may be videos with same video content but belong to different video encapsulation files.

In a possible implementation, the first video may include a first image frame, the second video may include a second image frame, the first image frame may include a plurality of image blocks (including the first image block), and the second image frame may include a plurality of image blocks (including the second image block). The first image block and the second image block may be block units such as an MB, a prediction block (partition), a CU, a PU, and a TU. This is not limited herein. For description of the image blocks, refer to description in the foregoing embodiments. Details are not described herein again.

A similarity between image features of the first image block and the second image block is high, and the image feature of the image block may be one or more of a color feature, a texture feature, a shape feature, and the like of the image block. The color feature and the texture feature are used to describe a surface property of an object corresponding to the image block. The shape feature includes a contour feature and a region feature. The contour feature includes an outer boundary feature of the object, and the region feature includes a shape region feature of the object.

In this embodiment of this disclosure, the first coding parameter of the first image block and the second coding parameter of the second image block may be obtained. The first coding parameter and the second coding parameter may be motion vectors, the first coding parameter and the second coding parameter may be residuals, or the first coding parameter and the second coding parameter may be motion vectors and residuals.

The residual may be obtained through calculation based on the image block and the prediction block. For example, a sample value of the prediction block may be subtracted from a sample value of the picture image block sample by sample (pixel by pixel), to obtain the residual in a sample domain.

Optionally, the coding parameter may further include syntax information. For example, the syntax information may be but is not limited to any one or all of an inter prediction parameter, an intra prediction parameter, a loop filter parameter, and/or another syntax element (decoded).

Figure 7:
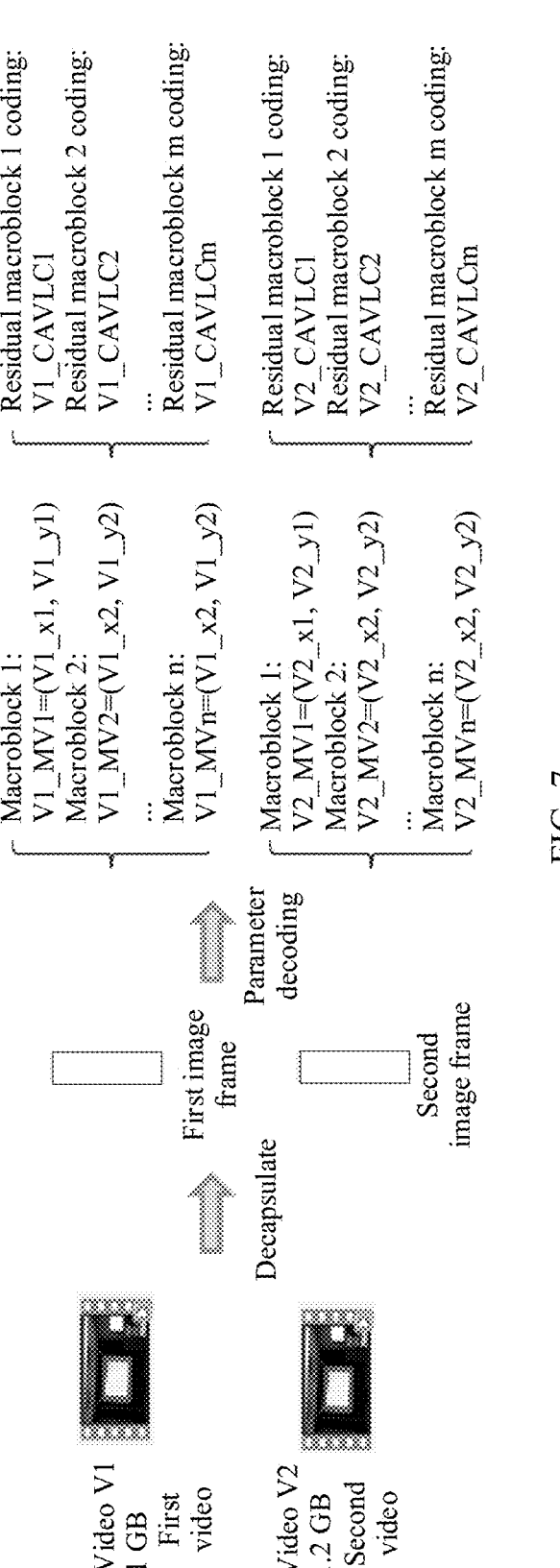
FIG. 7 is a schematic flowchart of a video encoding method according to an embodiment of this disclosure.

For example, the first image block is a macroblock of the first image frame in the first video, and the second image block is a macroblock of the second image frame in the second video. For example, refer to FIG. 7. A standard decoder (for example, H.264) may be invoked based on decoder information obtained through decapsulation, to decode bitstreams of the first video and the second video and obtain a coding parameter (for example, a motion vector and a residual) of each frame in the first video and the second video. V1_MV1, V1_MV2, . . . , and V1_MVn in FIG. 7 are respectively motion vectors of a macroblock 1, a macrob- lock 2, . . . , and a macroblock n of the first image frame obtained by decoding the first video, V2_MV1, V2_ MV2, . . . , and V2_MVn are respectively motion vectors of a macroblock 1, a macroblock 2, . . . , and a macroblock n of the second image frame obtained by decoding the second video, V1_CAVLC1, V1_CAVLC2, . . . , and V1_CAVLCm are respectively residuals of a macroblock 1, a macroblock 2, . . . , and a macroblock m of a P frame obtained by decoding a video file V1, and V2_CAVLC1, V2_CAVLC2, . . . , and V2_CAVLCm are respectively residuals of a macroblock 1, a macroblock 2, . . . , and a macroblock m of a P frame obtained by decoding a video file V2.

It should be understood that the first image block and the second image block may be image blocks with similar image features in the first image frame and the second image frame, and the foregoing processing on the first image block and the second image block may be performed on some or all image blocks in the first image frame and the second image frame.

It should be understood that the first image frame and the second image frame may be image frames with similar image features in the first video and the second video, and the foregoing processing on the first image block and the second image block may be performed on image blocks in some or all the image frames in the first video and the second video.

602: Obtain difference information based on the first coding parameter and the second coding parameter, where the difference information indicates a difference between the first coding parameter and the second coding parameter.

In a possible implementation, the first coding parameter may include a first motion vector, the second coding param- eter includes a second motion vector, the difference infor- mation includes first difference information, and the first difference information indicates a difference between the first motion vector and the second motion vector.

In a possible implementation, the first coding parameter may include a first residual, the second coding parameter includes a second residual, the difference information includes second difference information, and the second difference information indicates a difference between the first residual and the second residual.

In a possible implementation, the first coding parameter may include a first motion vector and a first residual, the second coding parameter includes a second motion vector and a second residual, the difference information includes first difference information and second difference informa- tion, the first difference information indicates a difference between the first motion vector and the second motion vector, and the second difference information indicates a difference between the first residual and the second residual.

In a possible implementation, a subtraction operation may be performed on the first coding parameter and the second coding parameter to obtain the difference information. In addition, the difference information may be obtained through calculation based on another operation used to quantize a difference between the first coding parameter and the second coding parameter. This is not limited herein.

For example, in a possible implementation, the first coding parameter may include a first motion vector, the second coding parameter includes a second motion vector, the difference information includes first difference informa- tion, and the first difference information is a difference between the first motion vector and the second motion vector.

For example, in a possible implementation, the first coding parameter may include a first residual, the second coding parameter includes a second residual, the difference information includes second difference information, and the second difference information is a difference between the first residual and the second residual.

For example, in a possible implementation, the first coding parameter may include a first motion vector and a first residual, the second coding parameter includes a second motion vector and a second residual, the difference infor- mation includes first difference information and second difference information, the first difference information is a difference between the first motion vector and the second motion vector, and the second difference information is a difference between the first residual and the second residual.

Figure 8:
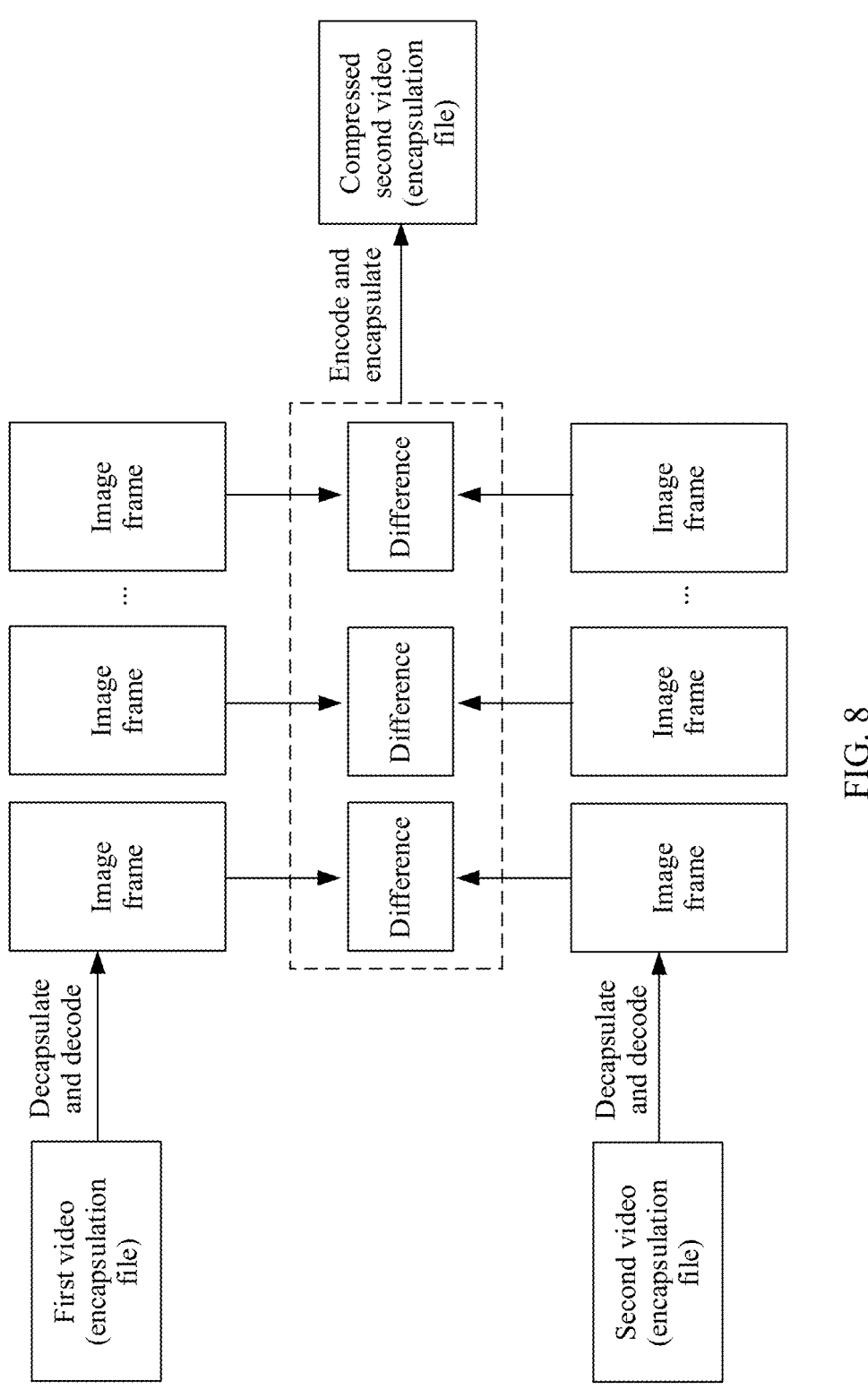
FIG. 8 is a schematic flowchart of a video encoding method according to an embodiment of this disclosure.

FIG. 8 is a schematic diagram of calculating a difference, where the difference may be a difference between coding parameters of image blocks of an image frame.

It should be understood that the first image block and the second image block may be image blocks with similar image features in the first image frame and the second image frame, and the foregoing processing on the first image block and the second image block may be performed on some or all image blocks in the first image frame and the second image frame.

In this way, difference information of a plurality of groups of image blocks can be obtained.

FIG. 9 and FIG. 10 each are a schematic diagram of calculating difference information. FIG. 9 shows a schematic diagram of calculating the difference information based on all image blocks in two image frames. Further, difference information 1 may be obtained through calculation based on an image block 1 in a first image frame and an image block 1 in a second image frame, difference information 2 may be obtained through calculation based on an image block 2 in the first image frame and an image block 2 in the second image frame, and difference information 3 may be obtained through calculation based on an image block 3 in the first image frame and an image block 3 in the second image frame. By analogy, difference information 16 may be obtained through calculation based on an image block 16 in the first image frame and an image block 16 in the second image frame.

FIG. 10 shows a schematic diagram of calculating the difference information based on some image blocks in two image frames. Further, difference information 1 may be obtained through calculation based on an image block 1 in a first image frame and an image block 1 in a second image frame, difference information 2 may be obtained through calculation based on an image block 2 in the first image frame and an image block 2 in the second image frame, difference information 3 may be obtained through calculation based on an image block 3 in the first image frame and an image block 3 in the second image frame, and difference information 4 may be obtained through calculation based on an image block 4 in the first image frame and an image block 4 in the second image frame. In addition, other image blocks in the first image frame and the second image frame do not participate in calculation of the difference information.

603: Encode the difference information to obtain encoded data.

The encoded data may be used by a decoding side to obtain the second coding parameter through restoration.

In a possible implementation, after the difference information is obtained, the difference information may be encoded into the encoded data, where the encoded data may be encoded data of the second video.

In a possible implementation, the first difference information (the first difference information indicates a difference between the first motion vector and the second motion vector) may be encoded through lossless compression coding.

Because the first difference information represents a difference between motion vectors, and the motion vector is used during inter prediction, if lossy compression is employed to compress the first difference information, inter prediction effect is poor (for example, an artifact occurs) during decoding. In this embodiment of this disclosure, lossless compression is employed to compress the first difference information, to improve inter prediction precision and effect.

In a possible implementation, the second difference information (the second difference information indicates a difference between the first residual and the second residual) may be encoded into the encoded data through lossless compression coding or lossy compression coding.

Lossless compression may be lossless compression including transform (reserving all coefficients), scanning, and entropy coding, and lossy compression may be lossy compression including transform (reserving a low frequency coefficient), quantization, scanning, and entropy coding.

In an implementation, the difference information may be used as a coding parameter of the second image block (to replace the original second coding parameter), and data of the second video including the coding parameter of the second image block is encoded, to obtain encoded data of the second video.

For example, transform such as DCT, DST, or conceptually similar transform may be applied to the second difference information, to generate a video block including a coefficient value of the second difference information. Wavelet transform, integer transform, sub-band transform or other types of transform can also be used. Transform may convert the second difference information from a pixel value domain to a transform domain, such as a frequency domain. Scaling transform based on frequency or the like may further be used for the second difference information. Such scaling involves applying a scaling factor to the second difference information, so that different frequency information is quantized at different granularities, which may affect final visual quality of the reconstructed video. The transform coefficient may also be quantized to further reduce a bit rate. The quantization process may reduce a bit depth related to some or all of the coefficients. A quantization degree may be modified by adjusting a quantization parameter. In some examples, a transform scaling and quantization component may then perform scanning on a matrix including the quantized transform coefficient. The quantized transform coefficient is forwarded to an encoding component (for example, header formatting and a CABAC component) for encoding in the encoded data. Further, the first difference information may be sent to an encoding compression component (for example, header formatting and a CABAC component) for encoding in the encoded data. Alternatively, the first difference information and the second difference information may be directly sent to an encoding compression component (for example, header formatting and a CABAC component).

The encoding compression component may receive data from components of a codec system and encode such data into encoded data for transmission to the decoder. Such data may be encoded by employing entropy coding. For example, information may be encoded by employing CAVLC, CABAC, SBAC, PIPE coding, or another entropy coding technique. After entropy coding, the encoded data may be transmitted to another device (for example, a video decoder) or archived for later transmission or retrieval.

In a possible implementation, after a bitstream is obtained, the encoded data and the first coding parameter may be sent to the decoding side, so that the decoding side obtains the second coding parameter based on the encoded data and the first coding parameter, or the encoded data may be locally stored for later transmission or retrieval.

It should be understood that, to enable the decoding side to obtain the second coding parameter based on the encoded data, the encoded data of the first video further needs to be sent to the decoding side, so that the decoding side can decode the encoded data of the first video to obtain the first coding parameter, and obtain the second coding parameter based on the first coding parameter and the difference information.

It should be understood that the encoded data may be encapsulated. Correspondingly, encapsulated encoded data may be sent to the decoding side, so that the decoding side obtains the second coding parameter based on the encapsulated encoded data, or encapsulated encoded data may be locally stored for later transmission or retrieval.

In a possible implementation, when the second video is restored, the first coding parameter of the first image block and the encoded data obtained through encoding based on the difference information may be obtained. In a possible implementation, when the second video needs to be restored, encoded data of the second video and a coding parameter of the first video (for example, including the first coding parameter of the first image block) may be obtained.

In a possible implementation, encoded data of the first video may be decapsulated and decoded, to obtain the coding parameter of the first video (for example, including the first coding parameter of the first image block).

The encoded data is decoded to obtain the difference information, where the difference information indicates a difference between the first coding parameter and the second coding parameter, the second coding parameter is a coding parameter of the second image block, and the first coding parameter and the second coding parameter include a motion vector and/or a residual.

In a possible implementation, the encoded data of the second video may be decapsulated and decoded, to obtain the difference information. For description of the difference information, refer to the description in the foregoing embodiment. Details are not described herein again.

The second coding parameter is obtained based on the first coding parameter and the difference information.

In a possible implementation, a sum operation may be performed on the first coding parameter and the difference information, to obtain the second coding parameter.

For example, the first coding parameter may include a first motion vector, and the second coding parameter includes a second motion vector. The difference information includes first difference information, and the first difference information indicates a difference between the first motion vector and the second motion vector. A sum operation may be performed on the first motion vector and the first difference information to obtain the second motion vector.

For another example, the first coding parameter may include a first residual, and the second coding parameter includes a second residual. The difference information includes second difference information, and the second difference information indicates a difference between the first residual and the second residual. A sum operation may be performed on the first residual and the second difference information to obtain the second residual.

Then, the obtained second coding parameter through restoration may be encoded and encapsulated to obtain the original encoded data of the second video.

Figure 11:
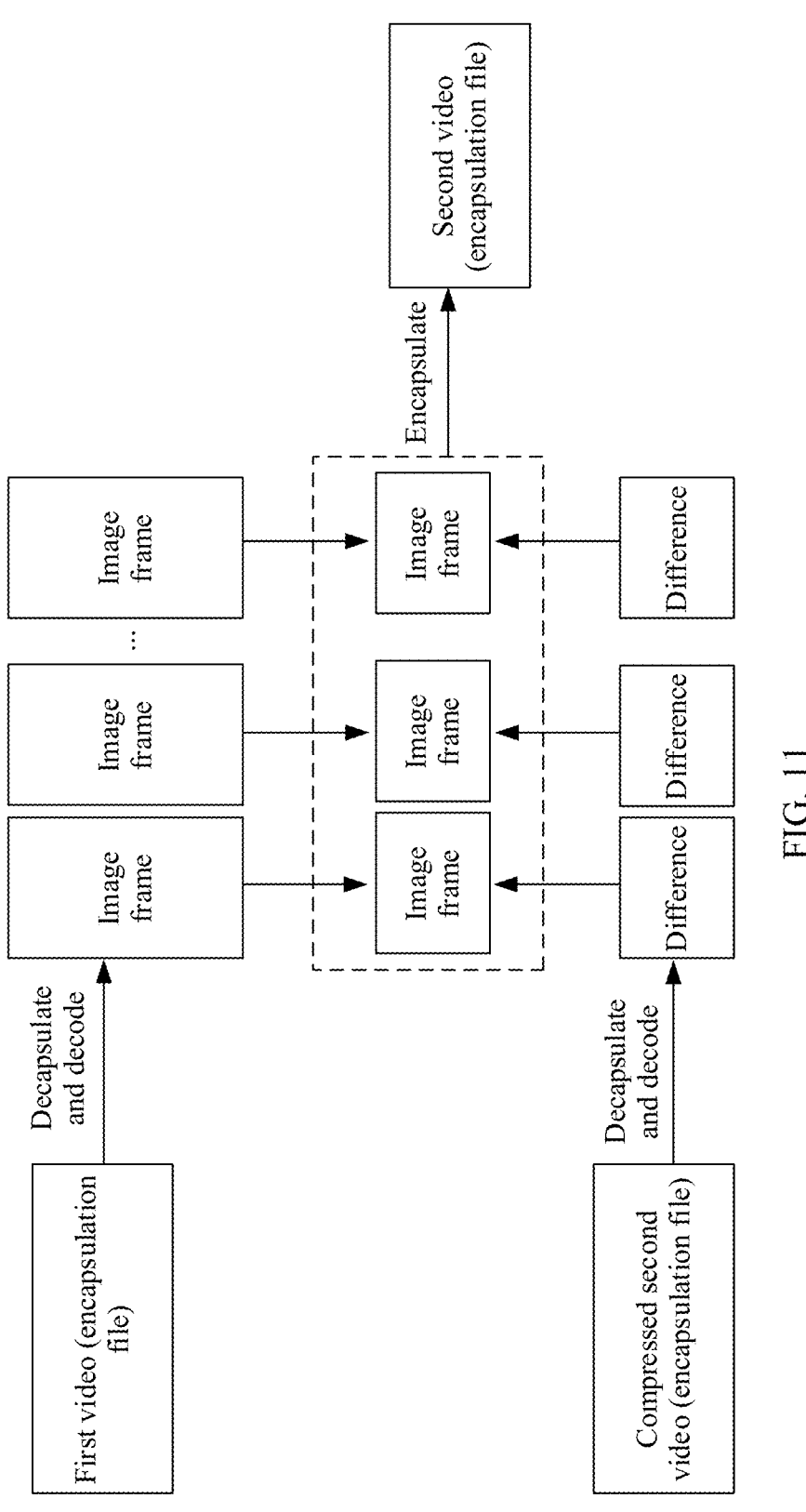
FIG. 11 is a schematic flowchart of a video encoding method according to an embodiment of this disclosure.

FIG. 11 is a schematic diagram of obtaining a second video through restoration, where a difference may be a difference between coding parameters of image blocks in an image frame.

An embodiment of this disclosure provides a video encoding method. The method includes obtaining a first coding parameter of a first image block and a second coding parameter of a second image block, where a similarity between image features of the first image block and the second image block is greater than a threshold, and the first coding parameter and the second coding parameter include a motion vector and/or a residual, obtaining difference information based on the first coding parameter and the second coding parameter, where the difference information indicates a difference between the first coding parameter and the second coding parameter, and encoding the difference information to obtain encoded data. The difference information is used to replace the original second coding parameter. Because the similarity between the image features of the first image block and the second image block is greater than the threshold, a size of bitstream data obtained by encoding the difference information is far less than a size of bitstream data obtained by encoding the second coding parameter, and the second coding parameter can be obtained through restoration based on the difference information and the first coding parameter. This is equivalent to reducing storage resources for video storage and bandwidth for video transmission while ensuring that the complete second image block can be restored.

The foregoing describes the video encoding method provided in embodiments of this disclosure from a perspective of video encoding. The following describes a video decoding method provided in embodiments of this disclosure from a perspective of video decoding. FIG. 12 is a schematic flowchart of a video decoding method according to an embodiment of this disclosure. As shown in FIG. 12, the method includes the following steps.

1201: Obtain encoded data.

In a possible implementation, when a second video needs to be restored, encoded data of the second video may be obtained.

1202: Decode the encoded data to obtain difference information.

It should be understood that step 1201 may be performed after, before, or at the same time as step 1202. This is not limited herein.

In a possible implementation, the encoded data of the second video may be decapsulated and decoded, to obtain the difference information. For description of the difference information, refer to the description in the foregoing embodiment. Details are not described herein again.

In a possible implementation, a similarity between image features of a first image block and a second image block is greater than a threshold, and the image feature includes at least one of the following: a color feature, a texture feature, a shape feature, and a spatial relationship feature.

In a possible implementation, the first image block is included in a first image frame, the second image block is included in a second image frame, and the first image frame and the second image frame are different image frames.

In a possible implementation, the first image block is included in a first image frame in a first video, the second image block is included in a second image frame in a second video, and the first video and the second video are different video files.

1203: Decode a first image block based on indication information to obtain a first coding parameter, where the indication information indicates that an association exists between the first image block and a second image block, the first image block belongs to a first video file, the second image block belongs to a second video file, and the first video file and the second video file are different video files.

1204: Obtain a second coding parameter based on the first coding parameter and the difference information, where the first coding parameter and the second coding parameter include a motion vector and/or a residual.

In a possible implementation, a sum operation may be performed on the first coding parameter and the difference information, to obtain the second coding parameter.

For example, the first coding parameter may include a first motion vector, and the second coding parameter includes a second motion vector. The difference information includes first difference information, and the first difference information indicates a difference between the first motion vector and the second motion vector. A sum operation may be performed on the first motion vector and the first difference information to obtain the second motion vector.

For another example, the first coding parameter may include a first residual, and the second coding parameter includes a second residual. The difference information includes second difference information, and the second difference information indicates a difference between the first residual and the second residual. A sum operation may be performed on the first residual and the second difference information to obtain the second residual.

Then, the obtained second coding parameter through restoration may be encoded and encapsulated to obtain the original encoded data of the second video.

It should be understood that, if lossless coding is employed when the difference information is compressed, the difference information may be an accurate difference between the first coding parameter of the first image block and the second coding parameter of the second image block, if lossy coding is employed when the difference information is compressed, a specific error may exist between the difference information and the accurate difference between the first coding parameter of the first image block and the second coding parameter of the second image block, and further, a specific error exists between a real coding parameter of the second image block and the second coding parameter obtained based on the first coding parameter and the difference information.

FIG. 11 is a schematic diagram of obtaining a second video through restoration, where a difference may be a difference between coding parameters of image blocks in an image frame.

An embodiment of this disclosure provides a video decoding method. The method includes obtaining encoded data, decoding the encoded data to obtain difference information, decoding a first image block based on indication information to obtain a first coding parameter, where the indication information indicates that an association exists between the first image block and a second image block, the first image block belongs to a first video file, the second image block belongs to a second video file, and the first video file and the second video file are different video files, and obtaining a second coding parameter based on the first coding parameter and the difference information, where the first coding parameter and the second coding parameter include a motion vector and/or a residual.

The difference information is used to replace the original second coding parameter. Because a similarity between image features of the first image block and the second image block is greater than a threshold, a size of the encoded data obtained by encoding the difference information is far less than a size of encoded data obtained by encoding the second coding parameter, and the second coding parameter can be obtained through restoration based on the difference information and the first coding parameter. This is equivalent to reducing storage resources for video storage and bandwidth for video transmission while ensuring that the complete second image block can be restored.

FIG. 13 is a schematic flowchart of a video encoding method according to an embodiment of this disclosure. As shown in FIG. 13, the video encoding method provided in this embodiment of this disclosure may include the following steps.

1301: Obtain a first image block in a first video file and a second image block in a second video file, where the first video file and the second video file are different video files.

In a possible implementation, a decoder may decode encoded data of a first video and encoded data of a second video, to obtain a video signal of the first video and a video signal of the second video. The video signal of the first video may include the first image block, and the video signal of the second video may include the second image block.

It should be understood that before decoding the encoded data of the first video and the encoded data of the second video, the decoder may decapsulate a video file of the first video and a video file of the second video.

It should be understood that the first video and the second video may be different videos, or may be different parts of a same video (for example, if a large quantity of repeated video clips exist in some videos, the first video and the second video may be two repeated video clips in the videos). This is not limited herein.

In a possible implementation, a first video may include a first image frame, a second video may include a second image frame, the first image frame may include a plurality of image blocks (including the first image block), and the second image frame may include a plurality of image blocks (including the second image block). The first image block and the second image block may be block units such as an MB, a prediction block (partition), a CU, a PU, and a TU. This is not limited herein. For description of the image blocks, refer to description in the foregoing embodiments. Details are not described herein again.

A similarity between image features of the first image block and the second image block is high, and the image feature of the image block may be one or more of a color feature, a texture feature, a shape feature, and the like of the image block. The color feature and the texture feature are used to describe a surface property of an object corresponding to the image block. The shape feature includes a contour feature and a region feature. The contour feature includes an outer boundary feature of the object, and the region feature includes a shape region feature of the object.

In a possible implementation, the first image block may be an image block in an I frame, and the second image block is an image block in a P frame or a B frame, or the first image block may be an image block in a P frame, and the second image block is an image block in a P frame or a B frame.

1302: Determine difference information by using the first image block as a reference block of the second image block, where the difference information indicates a difference between the first image block and the second image block.

After the video signal of the second video is obtained, the video signal of the second video may be encoded based on the video signal of the first video. Further, a coding parameter of the second image block may be determined by using the first image block as the reference block of the second image block.

In a possible implementation, the first image frame in the first video and the second image frame in the second video may be obtained, where a similarity between image features of the first image frame and the second image frame is greater than a threshold, and the first video and the second video are different videos, and a first coding parameter of the second image frame is determined by using the first image frame as a reference frame of the second image frame.

In a possible implementation, the first image block may be an image block in an I frame of the first video, and the second image block may be an image block in a P frame or a B frame of the second video.

In a possible implementation, the first image block may be an image block in a P frame of the first video, and the second image block may be an image block in a P frame or a B frame of the second video.

The first coding parameter may be a residual, a motion vector, and other syntax information. This is not limited herein.

Optionally, in a process of encoding the second image block (which may also be referred to as a current frame in this embodiment of this disclosure), the first image block may be used as a reference block, and the first image frame having the reference block is used as a reference frame to predict the second image block in the current frame (that is, the second image frame including the second image block). Optionally, the first image frame may be temporally after the current frame, or the current frame is temporally located between a previous reference frame that appears before the current frame in a video sequence and a subsequent reference frame that appears after the current frame in the video sequence (the first image frame may be one of the previous reference frame or the subsequent reference frame).

The current frame is separated from the reference frame by a specific temporal distance (TD). The TD may indicate an amount of time between the current frame and the reference frame in the video sequence, and may be measured in units of frame. Prediction information of a current block may refer to the reference frame and/or reference block by a reference index indicating the direction and temporal distance between the frames. Within a time period represented by the TD, the object in the current block moves from one position in the current frame to another position in the reference frame (for example, a position of the reference block). For example, the object may move along a motion trajectory, and the motion trajectory is a direction of movement of the object over time. The motion vector describes a direction and a magnitude of movement of the object along the motion trajectory within the TD. Therefore, an encoded motion vector and a reference block provide information sufficient to reconstruct a current block and position the current block in the current frame.

The current block is matched to a previous reference block in the previous reference frame and to a subsequent reference block in the subsequent reference frame. Such matching indicates that, over the course of the video sequence, the object moves from a position at the previous reference block to a position at the subsequent reference block along the motion trajectory and via the current block. The current frame is separated from the previous reference frame by a specific previous temporal distance (TD0) and separated from the subsequent reference frame by a specific subsequent temporal distance (TD1). The TD0 indicates an amount of time between the previous reference frame and the current frame in the video sequence in units of frame. The TD1 indicates an amount of time between the current frame and the subsequent reference frame in the video sequence in units of frame. Hence, the object moves from the previous reference block to the current block along the motion trajectory within a time period indicated by the TD0. The object also moves from the current block to the subsequent reference block along the motion trajectory within a time period indicated by the TD1. The prediction information of the current block may refer to the previous reference frame and/or previous reference block and the subsequent reference frame and/or subsequent reference block by a pair of reference indexes indicating the direction and temporal distance between the frames.

A previous motion vector (MV0) describes the direction and the magnitude of movement of the object along the motion trajectory within the TD0 (for example, between the previous reference frame and the current frame). A subsequent motion vector (MV1) describes the direction and the magnitude of movement of the object along the motion trajectory within the TD1 (for example, between the current frame and the subsequent reference frame). Therefore, in bidirectional inter prediction, the current block can be encoded and reconstructed by employing the previous reference block and/or the subsequent reference block, the MV0, and the MV1.

1303: Encode the difference information to obtain encoded data.

In this embodiment of this disclosure, after the encoded data of the second video (including the first coding parameter of the second image block) is obtained, the encoded data of the second video may be encoded into the encoded data. For specific description of encoding into the encoded data, refer to the description of the encoder in the foregoing embodiment. Details are not described herein again.

In some implementations, a high similarity exists between image content of only some image regions of the first image frame and the second image frame, and therefore, an image block, in the first image frame, with a high similarity between image content of the image block and an image block in the second image frame, may be used as a reference block when the image block in the second image frame is encoded.

In some implementations, a high similarity exists between image content of only some image regions of the first image frame and the second image frame, and a region with a high similarity between image content of the region and some regions of the second image frame exists in another image frame in the first video or another video. In this case, an image block, in the other image frame, with a high similarity between image content of the image block and an image block in the second image frame, may be used as a reference block when the image block in the second image frame is encoded.

In a possible implementation, the method further includes obtaining a third image block in a third video and a fourth image block in the second video, where a similarity between image features of the third image block and the fourth image block is greater than a threshold, the third video and the second video are different video files, and the second image block and the fourth image block belong to a same image frame in the second video, determining a second coding parameter of the fourth image block by using the third image block as a reference block of the fourth image block, and encoding the second coding parameter.

In some implementations, a high similarity exists between image content of only some image regions of the first image frame and the second image frame, and a region with a high similarity between image content of the region and some regions of the second image frame exists in another image frame in the third video (that is, a video other than the first video and the second video). In this case, an image block, in the other image frame, with a high similarity between image content of the image block and an image block of the second image frame, may be used as a reference block when the image block in the second image frame is encoded.

Further, the second image frame may further include an image block (for example, the fourth image block) other than the second image block. In a process of encoding the fourth image block, one image block in the third video may be used as the reference block (the third image block) of the fourth image block.

In a possible implementation, the second coding parameter and second indication information may be encoded, and the second indication information indicates that the reference block of the fourth image block is the third image block.

In a possible implementation, a fifth image block in the first video and a sixth image block in the second video may be obtained, where the second image block and the sixth image block belong to a same image frame in the second video, a similarity between image features of the fifth image block and the sixth image block is greater than a threshold, and the first image block and the fifth image block belong to a same image frame or different image frames in the first video, a third coding parameter of the sixth image block is determined by using the fifth image block as a reference block of the sixth image block, and the third coding parameter is encoded.

In some implementations, a high similarity exists between image content of only some image regions of the first image frame and the second image frame, and a region with a high similarity between image content of the region and some regions of the second image frame exists in another image frame in the first video. In this case, an image block, in the other image frame, with a high similarity between image content of the image block and an image block in the second image frame, may be used as a reference block when the image block in the second image frame is encoded.

Further, the second image frame may further include an image block (for example, the sixth image block) other than the second image block. In a process of encoding the sixth image block, one image block in the first video may be used as a reference block (the fifth image block) of the sixth image block. The reference block may be an image block in the first image frame (the image frame in which the first image block is located), or the reference block may be an image block in an image frame other than the first image frame in the first video (the image frame in which the first image block is located). This is not limited herein.

In a possible implementation, the third coding parameter and third indication information may be further encoded, and the third indication information indicates that the reference block of the sixth image block is the fourth image block.

Because the second image block is encoded by using the first image block as the reference block, related information that is in a GOP in which the second image block is located and that is originally used as the reference block of the second image block may not be encoded into the encoded data. This reduces a size of the encoded data, storage space for second video storage, and a size of bandwidth for second video transmission.

It should be understood that, to enable the decoder to obtain a complete and accurate video signal of the second video through decoding, the first indication information further needs to be encoded into the encoded data. The first indication information indicates that the reference block of the second image block is the first image block. Further, when performing decoding, the decoder may learn that the reference block of the second image block is the first image block.

Figure 14:
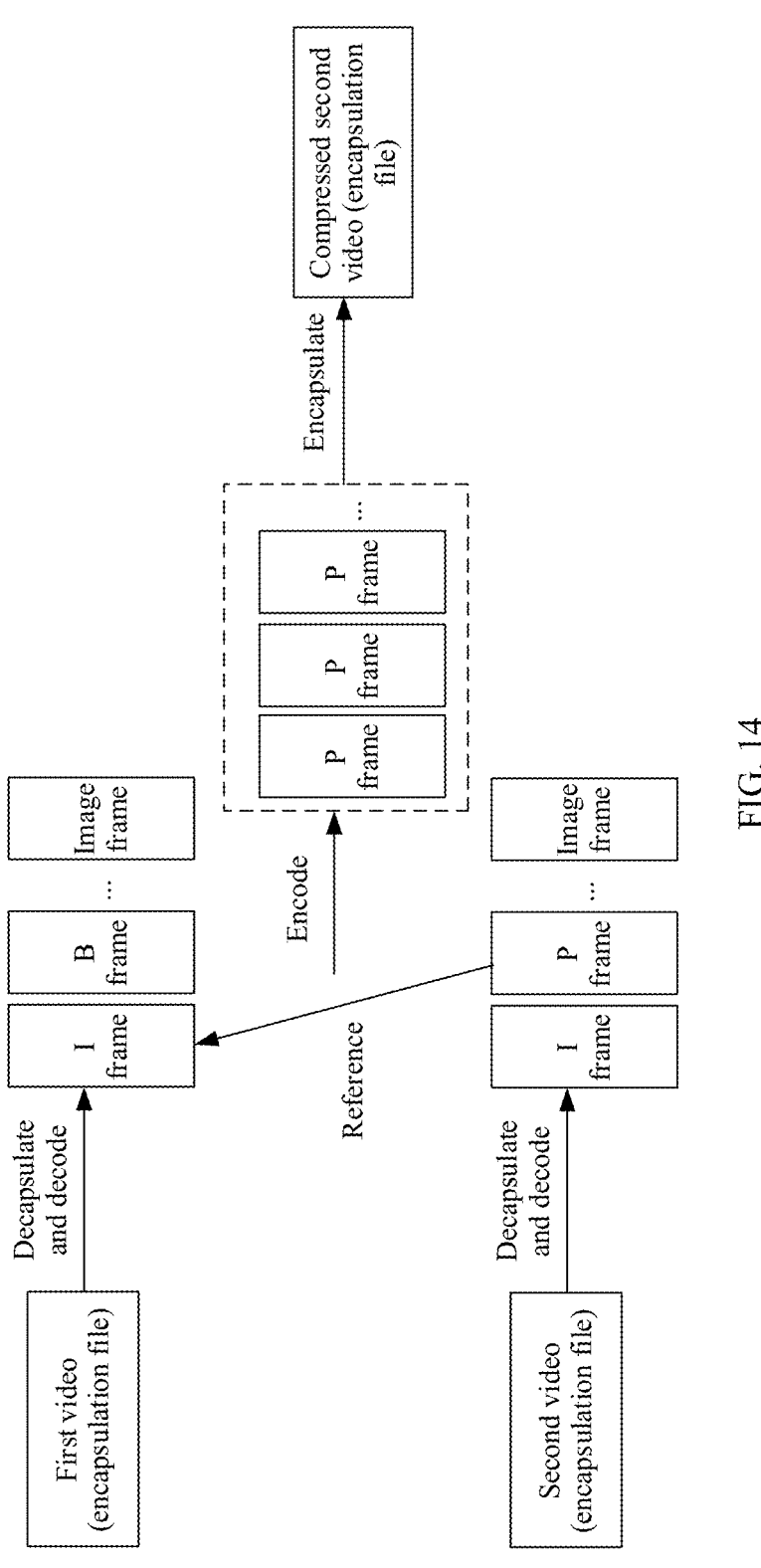
FIG. 14 is a schematic flowchart of a video encoding method according to an embodiment of this disclosure.

FIG. 14 is a schematic diagram of an encoding process. For some frames (belonging to a same GOP) in a second video, refer to an I frame in a first video, that is, an I frame in the first video is used as a reference frame of the some frames in the second video.

To restore a second image block in the second video, encoded data may be obtained, and the encoded data may be decoded to obtain a first coding parameter of the second image block and first indication information, where the first indication information indicates that an association exists between the second image block and a first image block (optionally, the first indication information indicates that the reference block of the second image block is a first image block in the first video), and the first video and the second video are different videos, the first image block is obtained based on the first indication information, and the second image block is reconstructed based on the first coding parameter and the first image block.

It should be understood that if a first image frame is used as a reference frame of a second image frame, the first indication information may indicate that the reference frame of the second image frame is the first image frame. Further, the first image frame may be obtained based on the first indication information, and the second image frame is reconstructed based on a coding parameter of the second image frame and the first image frame.

An embodiment of this disclosure provides a video encoding method. The method includes obtaining a first image block in a first video and a second image block in a second video, where a similarity between image features of the first image block and the second image block is greater than a threshold, and the first video and the second video are different video files, determining a first coding parameter of the second image block by using the first image block as a reference block of the second image block, and encoding the first coding parameter into encoded data. Because the second image block is encoded by using the first image block as the reference block, related information that is in a GOP in which the second image block is located and that is originally used as the reference block of the second image block may not be encoded into the encoded data. This reduces a size of the encoded data, storage space for second video storage, and a size of bandwidth for second video transmission.

In addition, an embodiment of this disclosure further provides a video decoding method. The method includes obtaining encoded data, decoding the encoded data to obtain a first coding parameter of a second image frame in a second video and first indication information, where the first indication information indicates that a reference frame of the second image frame is a first image frame in a first video, and the first video and the second video are different video files, obtaining the first image frame based on the first indication information, and reconstructing the second image frame based on the first coding parameter and the first image frame.

In a possible implementation, the image feature includes at least one of the following: a color feature, a texture feature, a shape feature, and a spatial relationship feature.

In a possible implementation, the first image frame is an I frame, and the second image frame is a P frame or a B frame, or the first image frame is a P frame, and the second image frame is a P frame or a B frame.

The foregoing describes the video encoding method provided in embodiments of this disclosure from a perspective of video encoding. The following describes a video decoding method provided in embodiments of this disclosure from a perspective of video decoding. FIG. 15 is a schematic flowchart of a video decoding method according to an embodiment of this disclosure. As shown in FIG. 15, the method includes the following steps.

1501: Obtain encoded data.

For description of the encoded data, refer to the description of step 1203 in the foregoing embodiment. Details are not described herein again.

1502: Decode the encoded data to obtain difference information.

First indication information indicates that a reference block of a second image block is a first image block. Further, when performing decoding, a decoder may learn that the reference block of the second image block is the first image block.

In a possible implementation, a similarity between image features of the first image block and the second image block is greater than a threshold, and the image feature includes at least one of the following: a color feature, a texture feature, a shape feature, and a spatial relationship feature.

In a possible implementation, the first image block is an image block in an I frame, and the second image block is an image block in a P frame or a B frame, or the first image block is an image block in a P frame, and the second image block is an image block in a P frame or a B frame.

1503: Decode a first video file based on indication information to obtain the first image block, where the indication information indicates that an association exists between the first image block and the second image block, the first image block belongs to the first video file, the second image block belongs to a second video file, and the first video file and the second video file are different video files.

1504: Obtain the second image block based on the first image block and the difference information.

Figure 16A:
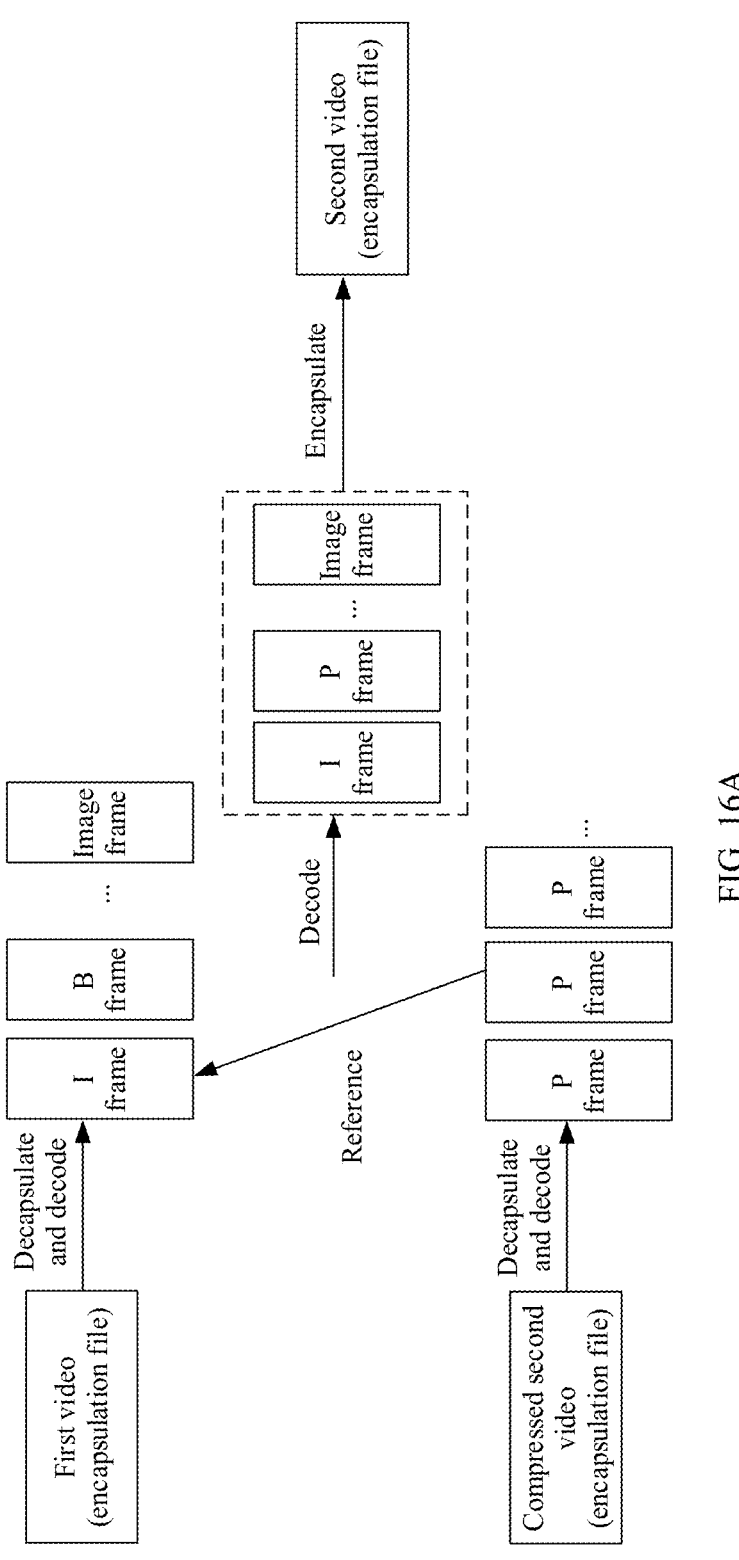
FIG. 16A is a schematic flowchart of a video decoding method according to an embodiment of this disclosure.

Refer to FIG. 16A. It should be understood that if a first image frame is used as a reference frame of a second image frame, first indication information may indicate that the reference frame of the second image frame is the first image frame. Further, the first image frame may be obtained based on the first indication information, and the second image frame is reconstructed based on a coding parameter of the second image frame and the first image frame.

This disclosure provides a video encoding method. The method includes obtaining a first image frame in a first video and a second image frame in a second video, where a similarity between image features of the first image frame and the second image frame is greater than a threshold, and the first video and the second video are different video files, determining a first coding parameter of the second image frame by using the first image frame as a reference frame of the second image frame, and encoding the first coding parameter into encoded data. Because a second image block is encoded by using a first image block as a reference block, related information that is in a GOP in which the second image block is located and that is originally used as the reference block of the second image block may not be encoded into the encoded data. This reduces a size of the encoded data, storage space for second video storage, and a size of bandwidth for second video transmission.

FIG. 16B is a schematic flowchart of a video encoding method according to this disclosure.

In addition, an embodiment of this disclosure further provides a video decoding method. The method includes obtaining encoded data, decoding the encoded data to obtain a first coding parameter of a second image frame in a second video and first indication information, where the first indication information indicates that a reference frame of the second image frame is a first image frame in a first video, and the first video and the second video are different video files, obtaining the first image frame based on the first indication information, and reconstructing the second image frame based on the first coding parameter and the first image frame.

In a possible implementation, the image feature includes at least one of the following: a color feature, a texture feature, a shape feature, and a spatial relationship feature.

In a possible implementation, the first image frame is an I frame, and the second image frame is a P frame or a B frame, or the first image frame is a P frame, and the second image frame is a P frame or a B frame.

Figure 17:
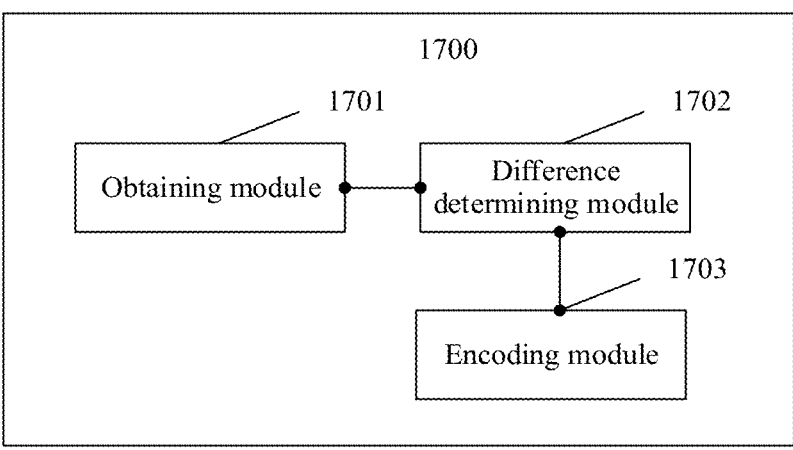
FIG. 17 is a schematic diagram of a structure of a video encoding apparatus according to an embodiment of this disclosure.

The following describes a video encoding apparatus 1700 in embodiments of this disclosure with reference to FIG. 17. It should be understood that the video encoding apparatus shown in FIG. 17 can perform the steps in the video encoding method in embodiments of this disclosure. To avoid unnecessary repetition, the following appropriately omits repeated description when describing the video encoding apparatus in embodiments of this disclosure.

FIG. 17 is a schematic block diagram of a video encoding apparatus according to an embodiment of this disclosure. In an implementation, a video encoding apparatus 1700 shown in FIG. 17 may include an obtaining module 1701 configured to obtain a first coding parameter of a first image block and a second coding parameter of a second image block, where the first image block is an image block in a first video file, the second image block is an image block in a second video file, the first video file and the second video file are different video files, and the first coding parameter and the second coding parameter include a motion vector and/or a residual.

For description of the obtaining module 1701, refer to the description of step 601 in the foregoing embodiment. Details are not described herein again.

A difference determining module 1702 is configured to obtain difference information based on the first coding parameter and the second coding parameter, where the difference information indicates a difference between the first coding parameter and the second coding parameter.

For description of the difference determining module 1702, refer to the description of step 602 in the foregoing embodiment. Details are not described herein again.

An encoding module 1703 is configured to encode the difference information to obtain encoded data.

For description of the encoding module 1703, refer to the description of step 603 in the foregoing embodiment. Details are not described herein again.

In a possible implementation, the obtaining module is further configured to decode the first video file and the second video file to obtain the first coding parameter of the first image block and the second coding parameter of the second image block.

In a possible implementation, the image feature includes at least one of the following: a color feature, a texture feature, a shape feature, and a spatial relationship feature.

In a possible implementation, the first image block is included in a first image frame, the second image block is included in a second image frame, and the first image frame and the second image frame are different image frames.

In a possible implementation, the first image block is included in a first image frame in a first video, the second image block is included in a second image frame in a second video, and the first video and the second video are different video files.

In a possible implementation, the first coding parameter may include a first motion vector, the second coding parameter includes a second motion vector, the difference information includes first difference information, and the first difference information is a difference between the first motion vector and the second motion vector.

For example, in a possible implementation, the first coding parameter may include a first residual, the second coding parameter includes a second residual, the difference information includes second difference information, and the second difference information is a difference between the first residual and the second residual.

In a possible implementation, the first coding parameter may include a first motion vector and a first residual, the second coding parameter includes a second motion vector and a second residual, the difference information includes first difference information and second difference information, the first difference information is a difference between the first motion vector and the second motion vector, and the second difference information is a difference between the first residual and the second residual.

In a possible implementation, the first coding parameter includes a first residual, the second coding parameter includes a second residual, the difference information includes second difference information, and the second difference information indicates a difference between the first residual and the second residual. The encoding module is further configured to encode the second difference information through lossless compression coding or lossy compression coding.

In a possible implementation, the first coding parameter includes a first motion vector, the second coding parameter includes a second motion vector, the difference information includes first difference information, and the first difference information indicates a difference between the first motion vector and the second motion vector. The encoding module is further configured to encode the first difference information through lossless compression coding.

In a possible implementation, the apparatus further includes a sending module configured to send the encoded data and the first coding parameter to a decoding side, so that the decoding side obtains the second coding parameter based on the encoded data and the first coding parameter, or a storage module configured to store the encoded data.

Figure 18:
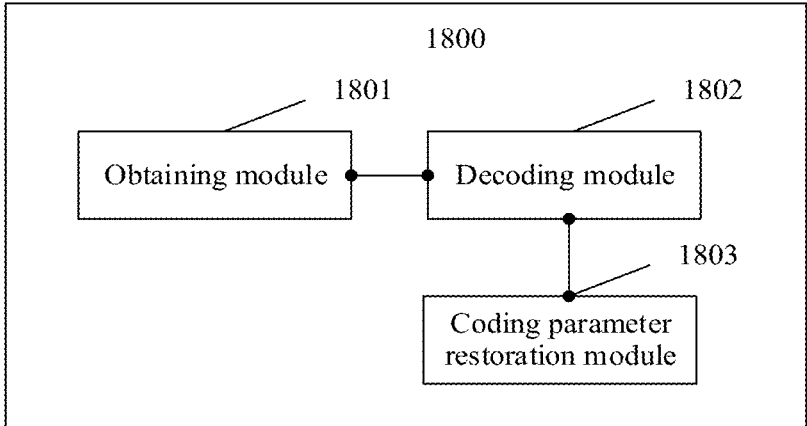
FIG. 18 is a schematic diagram of a structure of a video decoding apparatus according to an embodiment of this disclosure.

FIG. 18 is a schematic block diagram of a video decoding apparatus according to an embodiment of this disclosure. In an implementation, a video decoding apparatus 1800 shown in FIG. 18 may include an obtaining module 1801 configured to obtain encoded data.

For description of the obtaining module 1801, refer to the description of step 1201 in the foregoing embodiment. Details are not described herein again.

A decoding module 1802 is configured to decode the encoded data to obtain difference information.

For description of the decoding module 1802, refer to the description of step 1202 in the foregoing embodiment. Details are not described herein again.

The obtaining module 1801 is further configured to decode a first image block based on indication information to obtain a first coding parameter, where the indication information indicates that the difference information is obtained based on a difference between a first coding parameter of a first image block and a second coding parameter of a second image block, the first image block belongs to a first video file, the second image block belongs to a second video file, the first video file and the second video file are different video files, and the first coding parameter and the second coding parameter include a motion vector and/or a residual.

A coding parameter restoration module 1803 is configured to obtain the second coding parameter based on the first coding parameter and the difference information.

In a possible implementation, a similarity between image features of the first image block and the second image block is greater than a threshold, and the image feature includes at least one of the following: a color feature, a texture feature, a shape feature, and a spatial relationship feature.

In a possible implementation, the first image block is included in a first image frame, the second image block is included in a second image frame, and the first image frame and the second image frame are different image frames.

In a possible implementation, the first image block is included in a first image frame in a first video, the second image block is included in a second image frame in a second video, and the first video and the second video are different video files.

Figure 19:
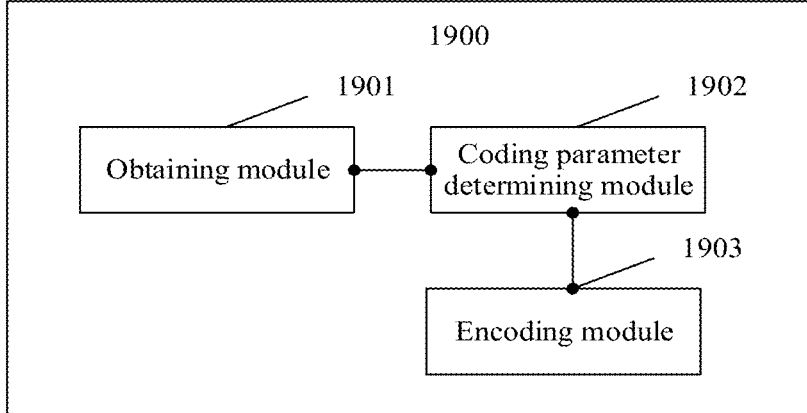
FIG. 19 is a schematic diagram of a structure of a video encoding apparatus according to an embodiment of this disclosure.

FIG. 19 is a schematic block diagram of a video encoding apparatus according to an embodiment of this disclosure. In an implementation, a video encoding apparatus 1900 shown in FIG. 19 may include an obtaining module 1901 configured to obtain a first image block in a first video and a second image block in a second video, where the first video and the second video are different video files.

For description of the obtaining module 1901, refer to the description of step 1301 in the foregoing embodiment. Details are not described herein again.

A coding parameter determining module 1902 is configured to determine a first coding parameter of the second image block by using the first image block as a reference block of the second image block.

For description of the coding parameter determining module 1902, refer to the description of step 1302 in the foregoing embodiment. Details are not described herein again.

An encoding module 1903 is configured to encode the first coding parameter.

For description of the encoding module 1903, refer to the description of step 1303 in the foregoing embodiment. Details are not described herein again.

In a possible implementation, the image feature includes at least one of the following: a color feature, a texture feature, a shape feature, and a spatial relationship feature.

In a possible implementation, the first image block is an image block in an I frame, and the second image block is an image block in a P frame or a B frame, or the first image block is an image block in a P frame, and the second image block is an image block in a P frame or a B frame.

In a possible implementation, the encoding module is further configured to encode first indication information into the encoded data, where the first indication information indicates that the reference block of the second image block is the first image block.

In a possible implementation, the obtaining module is further configured to obtain a third image block in a third video and a fourth image block in the second video, where a similarity between image features of the third image block and the fourth image block is greater than a threshold, the third video and the second video are different video files, and the second image block and the fourth image block belong to a same image frame in the second video, the coding parameter determining module is further configured to determine a second coding parameter of the fourth image block by using the third image block as a reference block of the fourth image block, and the encoding module is further configured to encode the second coding parameter.

In a possible implementation, the encoding module is further configured to encode the second coding parameter and second indication information, and the second indication information indicates that the reference block of the fourth image block is the third image block.

In a possible implementation, the obtaining module is further configured to obtain a fifth image block in the first video and a sixth image block in the second video, where the second image block and the sixth image block belong to a same image frame in the second video, a similarity between image features of the fifth image block and the sixth image block is greater than a threshold, and the first image block and the fifth image block belong to a same image frame or different image frames in the first video, the coding parameter determining module is further configured to determine a third coding parameter of the sixth image block by using the fifth image block as a reference block of the sixth image block, and the encoding module is further configured to encode the third coding parameter.

In a possible implementation, the encoding module is further configured to encode the third coding parameter and third indication information, and the third indication information indicates that the reference block of the sixth image block is the fourth image block.

An embodiment of this disclosure further provides a video encoding apparatus, and the apparatus includes an obtaining module configured to obtain a first image frame in a first video and a second image frame in a second video, where a similarity between image features of the first image frame and the second image frame is greater than a threshold, and the first video and the second video are different video files, a coding parameter determining module configured to determine a first coding parameter of the second image frame by using the first image frame as a reference frame of the second image frame, and an encoding module configured to encode the first coding parameter.

In a possible implementation, the image feature includes at least one of the following: a color feature, a texture feature, a shape feature, and a spatial relationship feature.

In a possible implementation, the first image frame is an I frame, and the second image frame is a P frame or a B frame, or the first image frame is a P frame, and the second image frame is a P frame or a B frame.

In a possible implementation, the encoding module is further configured to encode first indication information, where the first indication information indicates that a reference frame of the second image frame is the first image frame.

Figure 20:
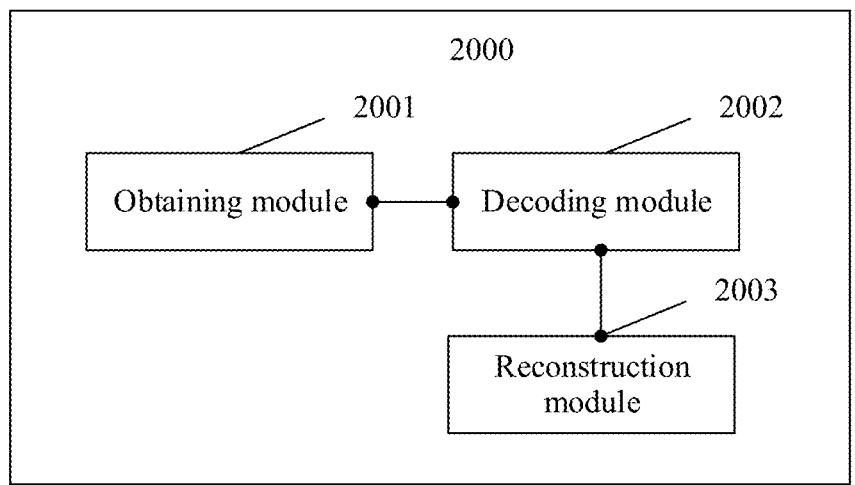
FIG. 20 is a schematic diagram of a structure of a video decoding apparatus according to an embodiment of this disclosure.

FIG. 20 is a schematic block diagram of a video decoding apparatus according to an embodiment of this disclosure. In an implementation, a video decoding apparatus 2000 shown in FIG. 20 may include an obtaining module 2001 configured to obtain encoded data.

For description of the obtaining module 2001, refer to the description of step 1501 and step 1503 in the foregoing embodiment. Details are not described herein again.

A decoding module 2002 is configured to decode the encoded data to obtain difference information.

For description of the decoding module 2002, refer to the description of step 1502 in the foregoing embodiment. Details are not described herein again.

The obtaining module 2001 is further configured to decode a first video file based on indication information to obtain a first image block, where the indication information indicates that the difference information is obtained based on a difference between a first image block and a second image block, the first image block belongs to a first video file, the second image block belongs to a second video file, and the first video file and the second video file are different video files, and a reconstruction module 2003 is configured to reconstruct the second image block based on a first coding parameter and the first image block.

For description of the reconstruction module 2003, refer to the description of step 1505 in the foregoing embodiment. Details are not described herein again.

In a possible implementation, a similarity between image features of the first image block and the second image block is greater than a threshold, and the image feature includes at least one of the following: a color feature, a texture feature, a shape feature, and a spatial relationship feature.

In a possible implementation, the first image block is an image block in an I frame, and the second image block is an image block in a P frame or a B frame, or the first image block is an image block in a P frame, and the second image block is an image block in a P frame or a B frame.

In a possible implementation, the decoding module is further configured to decode the encoded data to obtain a second coding parameter of a fourth image block in a second video and second indication information, where the second indication information indicates that a reference block of the fourth image block is a third image block in a third video, and the third video and the second video are different video files, the obtaining module is further configured to obtain the third image block based on the second indication information, and the reconstruction module is further configured to reconstruct the fourth image block based on the second coding parameter and the third image block.

In a possible implementation, the decoding module is further configured to decode the encoded data to obtain a third coding parameter of a sixth image block in the second video and third indication information, where the third indication information indicates that a reference block of the sixth image block is a fifth image block in a first video, the first image block and the fifth image block belong to a same image frame or different image frames in the first video, the obtaining module is further configured to obtain the fifth image block based on the third indication information, and the reconstruction module is further configured to reconstruct the sixth image block based on the third coding parameter and the fifth image block.

An embodiment of this disclosure further provides a video decoding apparatus, and the apparatus includes an obtaining module configured to obtain encoded data, a decoding module configured to decode the encoded data to obtain a first coding parameter of a second image frame in a second video and first indication information, where the first indication information indicates that a reference frame of the second image frame is a first image frame in a first video, and the first video and the second video are different video files, and obtain the first image frame based on the first indication information, and reconstruct the second image frame based on the first coding parameter and the first image frame.

In a possible implementation, the image feature includes at least one of the following: a color feature, a texture feature, a shape feature, and a spatial relationship feature.

In a possible implementation, the first image frame is an I frame, and the second image frame is a P frame or a B frame, or the first image frame is a P frame, and the second image frame is a P frame or a B frame.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, the procedure or functions according to embodiments of this disclosure are all or partially generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, a computer, a training device, or a data center to another website, computer, training device, or data center in a wired (for example, a coaxial cable, an optical fiber, or a digital subscriber line (DSL)) or wireless (for example, infrared, radio, or microwave) manner. The computer-readable storage medium may be any usable medium that can be stored by a computer, or a data storage device, such as a training device or a data center, integrating one or more usable media. The usable medium may be a magnetic medium (for example, a floppy disk, a hard disk, or a magnetic tape), an optical medium (for example, a DVD), a semiconductor medium (for example, an SSD), or the like.

What is claimed is:

1. A method comprising:
obtaining a first coding parameter of a first image block and a second coding parameter of a second image block, wherein the first image block is in a first video file, wherein the second image block is in a second video file, wherein the first video file and the second video file are different video files, and wherein each of the first coding parameter and the second coding parameter comprises a motion vector or a residual;
obtaining first difference information based on the first coding parameter and the second coding parameter, wherein the first difference information indicates a first difference between the first coding parameter and the second coding parameter;
encoding the first difference information to obtain encoded data; and
encoding indication information indicating the first difference information is based on a second difference between the first image block and the second image block.

2. The method of claim 1, further comprising:
decoding the first video file to obtain the first coding parameter; and
decoding the second video file to obtain the second coding parameter.

3. The method of claim 1, wherein a similarity between image features of the first image block and the second image block is greater than a threshold.

4. The method of claim 3, wherein each of the image features comprises at least one of a color feature, a texture feature, a shape feature, or a spatial relationship feature.

5. The method of claim 1, wherein the first coding parameter comprises a first motion vector, wherein the second coding parameter comprises a second motion vector, wherein the first difference is between the first motion vector and the second motion vector, and wherein encoding the first difference information comprises encoding the first difference information through lossless compression coding.

6. The method of claim 1, wherein the first coding parameter comprises a first residual, wherein the second coding parameter comprises a second residual, wherein the first difference is between the first residual and the second residual, and wherein encoding the first difference information comprises encoding the first difference information through lossless compression coding or lossy compression coding.

7. The method of claim 1, wherein the indication information comprises a first identifier of the first image block and a second identifier of the second image block.

8. The method of claim 1, wherein a similarity between the first coding parameter and the second coding parameter is greater than a threshold.

9. The method of claim 1, wherein a similarity between subtitle information in the first video file and the second video file is greater than a threshold.

10. The method of claim 1, wherein a similarity between audio information in the first video file and the second video file is greater than a threshold.

11. The method of claim 1, wherein a similarity between discrete cosine transform (DCT) coefficients of the first image block and the second image block is greater than a threshold.

12. The method of claim 1, wherein the indication information comprises a first identifier of the first video file and a second identifier of the second video file.

13. A method comprising:
obtaining encoded data;
decoding the encoded data to obtain difference information;
decoding a first image block based on indication information to obtain a first coding parameter, wherein the indication information indicates an existing association between the first image block and a second image block, wherein the indication information further indicates the difference information is based on a difference between the first image block and the second image block, wherein the first image block is of a first video file, wherein the second image block is of a second video file, and wherein the first video file and the second video file are different video files; and
obtaining a second coding parameter based on the first coding parameter and the difference information, wherein each of the first coding parameter and the second coding parameter comprises a motion vector or a residual.

14. The method of claim 13, wherein the indication information comprises a first identifier of the first image block and a second identifier of the second image block.

15. The method of claim 13, wherein the indication information comprises a first identifier of the first image block, a second identifier of the second image block, a third identifier of the first video file, and a fourth identifier of the second video file.

16. An apparatus comprising:
a memory configured to store instructions; and
one or more processors coupled to the memory and configured to execute the instructions to cause the apparatus to:
obtain a first coding parameter of a first image block and a second coding parameter of a second image block, wherein the first image block is in a first video file, wherein the second image block is in a second video file, wherein the first video file and the second video file are different video files, and wherein each of the first coding parameter and the second coding parameter comprise a motion vector or a residual;
obtain difference information based on the first coding parameter and the second coding parameter, wherein the difference information indicates a first difference between the first coding parameter and the second coding parameter;
encode the difference information to obtain encoded data; and encode indication information indicating the difference information is based on a second difference between the first image block and the second image block.

17. The apparatus of claim 16, wherein the one or more processors are further configured to execute the instructions to cause the apparatus to:

decode the first video file to obtain the first coding parameter; and decode the second video file to obtain the second coding parameter.

18. The apparatus of claim 17, wherein:

a first similarity between image features of the first image block and the second image block is greater than a first threshold;

a second similarity between the first coding parameter and the second coding parameter is greater than a second threshold;

a third similarity between subtitle information or audio information in the first video file and the second video file is greater than a third threshold; or a fourth similarity between discrete cosine transform (DCT) coefficients of the first image block and the second image block is greater than a fourth threshold.

19. The apparatus of claim 16, wherein the first coding parameter comprises a first motion vector, wherein the second coding parameter comprises a second motion vector, wherein the first difference is between the first motion vector and the second motion vector, and wherein the one or more processors are further configured to execute the instructions to cause the apparatus to encode the difference information by encoding the difference information through lossless compression coding.

20. The apparatus of claim 16, wherein the first coding parameter comprises a first residual, wherein the second coding parameter comprises a second residual, wherein the first difference is between the first residual and the second residual, and wherein the one or more processors are further configured to execute the instructions to cause the apparatus to encode the difference information by encoding the difference information through lossless compression coding or lossy compression coding.

* * * * *